United States Patent
Hull et al.

(10) Patent No.: US 8,201,076 B2
(45) Date of Patent: Jun. 12, 2012

(54) CAPTURING SYMBOLIC INFORMATION FROM DOCUMENTS UPON PRINTING

(75) Inventors: Jonathan J. Hull, San Carlos, CA (US); Berna Erol, San Jose, CA (US); Jamey Graham, San Jose, CA (US); Jorge Moraleda, Menlo Park, CA (US); Ichiro Sakikawa, Tokyo (JP); Daniel G. Van Olst, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 717 days.

(21) Appl. No.: 12/253,815

(22) Filed: Oct. 17, 2008

(65) Prior Publication Data

US 2009/0100334 A1  Apr. 16, 2009

Related U.S. Application Data

(63) Continuation-in-part of application No. 11/461,017, filed on Jul. 31, 2006, now Pat. No. 7,702,673, and a continuation-in-part of application No. 11/461,279, filed on Jul. 31, 2006, and a continuation-in-part of application No. 11/461,286, filed on Jul. 31, 2006, and a continuation-in-part of application No. 11/461,294, filed on Jul. 31, 2006, and a continuation-in-part of application No. 11/461,300, filed on Jul. 31, 2006, and a continuation-in-part of application No. 11/461,126, filed on Jul. 31, 2006, and a continuation-in-part of application No. 11/461,143, filed on Jul. 31, 2006, and a continuation-in-part of application No. 11/461,268, filed on Jul. 31, 2006, now Pat. No. 7,639,387, and a continuation-in-part of application No. 11/461,272, filed on Jul. 31, 2006, now Pat. No. 8,005,831, and a continuation-in-part of application No. 11/461,064, filed on Jul. 31, 2006, now Pat. No. 7,669,148, and a continuation-in-part of application No. 11/461,075, filed on Jul. 31, 2006, now Pat. No. 7,812,986, and a continuation-in-part of application No. 11/461,090, filed on Jul. 31, 2006, now Pat. No. 7,551,780, and a continuation-in-part of application No. 11/461,037, filed on Jul. 31, 2006, and a continuation-in-part of application No. 11/461,085, filed on Jul. 31, 2006, and a continuation-in-part of application No. 11/461,091, filed on Jul. 31, 2006, now Pat. No. 7,885,955, and a continuation-in-part of application No. 11/461,095, filed on Jul. 31, 2006, now Pat. No. 7,917,554, and a continuation-in-part of application No. 11/466,414, filed on Aug. 22, 2006, now Pat. No. 7,587,412, and a continuation-in-part of application No. 11/461,147, filed on Jul. 31, 2006, and a continuation-in-part of application No. 11/461,164, filed on Jul. 31, 2006, and a continuation-in-part of application No. 11/461,024, filed on Jul. 31, 2006, now Pat. No. 7,991,778, and a continuation-in-part of application No. 11/461,032, filed on Jul. 31, 2006, now Pat. No. 7,672,543, and a continuation-in-part of application No. 11/461,049, filed on Jul. 31, 2006, now Pat. No. 7,920,759, and a continuation-in-part of application No. 11/461,109, filed on Jul. 31, 2006, and a continuation-in-part of application No. 11/827,530, filed on Jul. 11, 2007, and a continuation-in-part of application No. 12/060,194, filed on Mar. 31, 2008, and a continuation-in-part of application No. 12/059,583, filed on Mar. 31, 2008, and a continuation-in-part of application No. 12/060,198, filed on Mar. 31, 2008, and a continuation-in-part of application No. 12/060,200, filed on Mar. 31, 2008, and a continuation-in-part of application No. 12/060,206, filed on Mar. 31, 2008, and a continuation-in-part of application No. 12/121,275, filed on May 15, 2008, and a continuation-in-part of application No. 11/776,510, filed on Jul. 11, 2007, now Pat. No. 8,086,038, and a continuation-in-part of application No. 11/776,520, filed on Jul. 11, 2007, and a continuation-in-part of application No. 11/776,530, filed on Jul. 11, 2007, and a continuation-in-part of application No. 11/777,142, filed on Jul. 12, 2007, and a continuation-in-part of application No. 12/210,511, filed on Sep. 15, 2008, and a continuation-in-part of application No. 12/210,519, filed on Sep. 15, 2008, and a continuation-in-part of application No. 12/210,532, filed on Sep. 15, 2008, and a continuation-in-part of application No. 12/210,540, filed on Sep. 15, 2008, and a continuation-in-part of application No. 11/624,466, filed on Jan. 18, 2007, now Pat. No. 7,970,171.

(51) Int. Cl.
*G06F 17/00* (2006.01)

(52) U.S. Cl. ...................................... 715/205

(58) Field of Classification Search ............. 715/202, 715/205, 207; 358/1.12, 1.18

See application file for complete search history.

(56) References Cited

U.S. PATENT DOCUMENTS

| | | |
|---|---|---|
| 1,915,993 A | 6/1933 | Handel |
| 4,759,075 A | 7/1988 | Lipkie et al. |
| 5,027,421 A | 6/1991 | Kanno |
| 5,035,302 A | 7/1991 | Thangavelu |
| 5,077,805 A | 12/1991 | Tan |
| 5,109,439 A | 4/1992 | Froessl |
| 5,263,100 A | 11/1993 | Kim et al. |
| 5,392,447 A | 2/1995 | Schlack et al. |
| 5,416,892 A | 5/1995 | Loken-Kim |
| 5,432,864 A | 7/1995 | Lu et al. |
| 5,465,353 A | 11/1995 | Hull et al. |
| 5,493,689 A | 2/1996 | Waclawsky et al. |
| 5,546,502 A | 8/1996 | Hart et al. |
| 5,553,217 A | 9/1996 | Hart et al. |
| 5,555,556 A | 9/1996 | Ozaki |
| 5,579,471 A | 11/1996 | Barber et al. |
| 5,706,097 A | 1/1998 | Schelling et al. |
| 5,752,055 A | 5/1998 | Redpath et al. |
| 5,761,344 A | 6/1998 | Al-Hussein |
| 5,764,277 A * | 6/1998 | Loui et al. .................. 348/14.01 |
| 5,806,005 A | 9/1998 | Hull et al. |
| 5,832,474 A | 11/1998 | Lopresti et al. |
| 5,832,530 A | 11/1998 | Paknad et al. |
| 5,842,194 A | 11/1998 | Arbuckle |
| 5,873,077 A | 2/1999 | Kanoh et al. |
| 5,892,843 A | 4/1999 | Zhou et al. |
| 5,899,999 A | 5/1999 | De Bonet |
| 5,905,502 A | 5/1999 | Deering |
| 5,918,012 A | 6/1999 | Astiz et al. |
| 5,956,468 A | 9/1999 | Ancin |
| 5,968,175 A | 10/1999 | Morishita et al. |
| 5,999,915 A | 12/1999 | Nahan et al. |
| 6,035,055 A | 3/2000 | Wang et al. |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,223,171 B1 | 4/2001 | Chaudhuri et al. |
| 6,253,201 B1 | 6/2001 | Abdel-Mottaleb et al. |
| 6,301,386 B1 | 10/2001 | Zhu et al. |
| 6,332,039 B1 | 12/2001 | Bando et al. |
| 6,345,274 B1 | 2/2002 | Zhu et al. |
| 6,353,822 B1 | 3/2002 | Lieberman |
| 6,363,381 B1 | 3/2002 | Lee et al. |
| 6,393,142 B1 | 5/2002 | Swain et al. |
| 6,397,213 B1 | 5/2002 | Cullen et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,448,979 B1 | 9/2002 | Schena et al. |
| 6,457,026 B1 | 9/2002 | Graham et al. |
| 6,460,036 B1 | 10/2002 | Herz |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,611,862 B2 | 8/2003 | Riesman |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,791,605 B1 | 9/2004 | Reele et al. |
| 6,799,201 B1 | 9/2004 | Lee et al. |
| 6,804,332 B1 | 10/2004 | Miner et al. |
| 6,804,659 B1 | 10/2004 | Graham et al. |
| 6,813,381 B2 | 11/2004 | Ohnishi et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,922,699 B2 | 7/2005 | Schuetze et al. |
| 6,929,182 B2 | 8/2005 | Rathus et al. |
| 6,940,491 B2 | 9/2005 | Incertis Carro |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,981,224 B1 | 12/2005 | Gardner et al. |
| 6,993,573 B2 | 1/2006 | Hunter |
| 7,013,309 B2 | 3/2006 | Chakraborty et al. |
| 7,031,965 B1 | 4/2006 | Moriya et al. |
| 7,051,086 B2 | 5/2006 | Rhoads et al. |
| 7,089,487 B2 | 8/2006 | Tsai |
| 7,092,953 B1 | 8/2006 | Haynes |
| 7,134,095 B1 | 11/2006 | Smith et al. |
| 7,150,399 B2 | 12/2006 | Barrus et al. |
| 7,167,574 B2 | 1/2007 | Kim |
| 7,174,031 B2 | 2/2007 | Rhoads et al. |
| 7,185,274 B1 | 2/2007 | Rubin et al. |
| 7,206,820 B1 | 4/2007 | Rhoads et al. |
| 7,232,057 B2 | 6/2007 | Rathus et al. |
| 7,236,632 B2 | 6/2007 | Erol et al. |
| 7,240,279 B1 | 7/2007 | Chartier et al. |
| 7,249,123 B2 | 7/2007 | Elder et al. |
| 7,251,689 B2 | 7/2007 | Wesley |
| 7,263,205 B2 | 8/2007 | Lev |
| 7,305,435 B2 | 12/2007 | Hamynen |
| 7,310,769 B1 * | 12/2007 | Dash ............................ 715/269 |
| 7,310,779 B2 | 12/2007 | Carro |
| 7,337,175 B2 | 2/2008 | Comps et al. |
| 7,359,094 B1 | 4/2008 | Sayuda |
| 7,363,580 B2 | 4/2008 | Tabata et al. |
| 7,366,979 B2 | 4/2008 | Spielberg et al. |
| 7,386,789 B2 | 6/2008 | Chao et al. |
| 7,392,287 B2 | 6/2008 | Ratcliff, III |
| 7,406,214 B2 | 7/2008 | Rhoads et al. |
| 7,421,153 B1 | 9/2008 | Ronca et al. |
| 7,421,155 B2 | 9/2008 | King et al. |
| 7,437,023 B2 | 10/2008 | King et al. |
| 7,450,760 B2 | 11/2008 | Molnar et al. |
| 7,458,014 B1 | 11/2008 | Rubin et al. |
| 7,489,415 B2 | 2/2009 | Furuta et al. |
| 7,509,386 B2 | 3/2009 | Miyashita |
| 7,546,524 B1 | 6/2009 | Bryar et al. |
| 7,567,262 B2 | 7/2009 | Clemens et al. |
| 7,593,605 B2 | 9/2009 | King et al. |
| 7,593,961 B2 | 9/2009 | Eguchi et al. |
| 7,613,686 B2 | 11/2009 | Rui |
| 7,644,078 B2 | 1/2010 | Sastry et al. |
| 7,653,238 B2 | 1/2010 | Stentiford |
| 7,668,405 B2 | 2/2010 | Gallagher |
| 7,680,850 B2 | 3/2010 | Oda |
| 7,684,622 B2 | 3/2010 | Fisher et al. |
| 7,707,039 B2 | 4/2010 | King et al. |
| 7,746,376 B2 | 6/2010 | Mendoza et al. |
| 7,761,436 B2 | 7/2010 | Norton et al. |
| 7,765,231 B2 | 7/2010 | Rathus et al. |
| 7,812,986 B2 | 10/2010 | Graham et al. |
| 7,872,669 B2 | 1/2011 | Darrell et al. |
| 7,882,113 B2 | 2/2011 | Yaeger |
| 7,882,177 B2 | 2/2011 | Wei et al. |
| 7,930,292 B2 | 4/2011 | Nakajima |
| 7,946,491 B2 | 5/2011 | Burian et al. |
| 2001/0011276 A1 | 8/2001 | Durst, Jr. et al. |
| 2001/0013546 A1 | 8/2001 | Ross |
| 2001/0024514 A1 | 9/2001 | Matsunaga |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0049700 A1 | 12/2001 | Ichikura |
| 2002/0038430 A1 | 3/2002 | Edwards et al. |
| 2002/0052872 A1 | 5/2002 | Yada |
| 2002/0054059 A1 | 5/2002 | Schneiderman |
| 2002/0063709 A1 | 5/2002 | Gilbert et al. |
| 2002/0073236 A1 | 6/2002 | Helgeson et al. |
| 2002/0102966 A1 | 8/2002 | Lev et al. |

| | | |
|---|---|---|
| 2002/0118379 A1 | 8/2002 | Chakraborty et al. |
| 2002/0146176 A1 | 10/2002 | Meyers |
| 2002/0154148 A1 | 10/2002 | Inoue et al. |
| 2002/0157028 A1 | 10/2002 | Koue et al. |
| 2002/0159640 A1 | 10/2002 | Vaithilingam et al. |
| 2002/0191003 A1 | 12/2002 | Hobgood et al. |
| 2002/0191848 A1 | 12/2002 | Boose et al. |
| 2002/0194264 A1 | 12/2002 | Uchiyama et al. |
| 2003/0025714 A1 | 2/2003 | Ebersole et al. |
| 2003/0030835 A1 | 2/2003 | Yoshida et al. |
| 2003/0098877 A1 | 5/2003 | Boegelund |
| 2003/0110130 A1 | 6/2003 | Pelletier |
| 2003/0110216 A1 | 6/2003 | Althin et al. |
| 2003/0112930 A1 | 6/2003 | Bosik et al. |
| 2003/0121006 A1 | 6/2003 | Tabata et al. |
| 2003/0122922 A1 | 7/2003 | Saffer et al. |
| 2003/0126147 A1 | 7/2003 | Essafi et al. |
| 2003/0128375 A1 | 7/2003 | Ruhl et al. |
| 2003/0151674 A1 | 8/2003 | Lin |
| 2003/0152293 A1 | 8/2003 | Bresler et al. |
| 2003/0187886 A1 | 10/2003 | Hull et al. |
| 2003/0190094 A1 | 10/2003 | Yokota |
| 2003/0193530 A1 | 10/2003 | Blackman et al. |
| 2003/0212585 A1 | 11/2003 | Kyoya et al. |
| 2003/0229857 A1 | 12/2003 | Sayuda et al. |
| 2004/0017482 A1 | 1/2004 | Weitman |
| 2004/0027604 A1 | 2/2004 | Jeran et al. |
| 2004/0036679 A1 | 2/2004 | Emerson |
| 2004/0042667 A1 | 3/2004 | Lee et al. |
| 2004/0102898 A1 | 5/2004 | Yokota et al. |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0198396 A1 | 10/2004 | Fransioli |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0215689 A1 | 10/2004 | Dooley et al. |
| 2004/0221244 A1 | 11/2004 | Baldino |
| 2004/0233235 A1 | 11/2004 | Rubin et al. |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2005/0012960 A1 | 1/2005 | Eden et al. |
| 2005/0080693 A1 | 4/2005 | Foss et al. |
| 2005/0086188 A1 | 4/2005 | Hillis et al. |
| 2005/0086224 A1 | 4/2005 | Franciosa et al. |
| 2005/0089246 A1 | 4/2005 | Luo |
| 2005/0100219 A1 | 5/2005 | Berkner et al. |
| 2005/0114325 A1 | 5/2005 | Liu et al. |
| 2005/0125390 A1 | 6/2005 | Hurst-Hiller et al. |
| 2005/0129293 A1 | 6/2005 | Acharya et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1 | 7/2005 | Bargeron et al. |
| 2005/0165784 A1 | 7/2005 | Gomez et al. |
| 2005/0169520 A1 | 8/2005 | Chen et al. |
| 2005/0182773 A1 | 8/2005 | Feinsmith et al. |
| 2005/0185060 A1 | 8/2005 | Neven |
| 2005/0185225 A1 | 8/2005 | Brawn et al. |
| 2005/0190273 A1 | 9/2005 | Toyama et al. |
| 2005/0190972 A1 | 9/2005 | Thomas et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0240381 A1 | 10/2005 | Seiler et al. |
| 2005/0261990 A1 | 11/2005 | Gocht et al. |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk et al. |
| 2006/0012677 A1 | 1/2006 | Neven et al. |
| 2006/0020630 A1 | 1/2006 | Stager et al. |
| 2006/0023945 A1 | 2/2006 | King et al. |
| 2006/0026140 A1 | 2/2006 | King et al. |
| 2006/0041605 A1 | 2/2006 | King et al. |
| 2006/0043188 A1 | 3/2006 | Kricorissian |
| 2006/0048059 A1 | 3/2006 | Etkin |
| 2006/0053097 A1 | 3/2006 | King et al. |
| 2006/0056696 A1 | 3/2006 | Jun et al. |
| 2006/0056697 A1 | 3/2006 | Jun et al. |
| 2006/0061806 A1 | 3/2006 | King et al. |
| 2006/0070120 A1 | 3/2006 | Aoki et al. |
| 2006/0074828 A1 | 4/2006 | Heumann et al. |
| 2006/0082438 A1 | 4/2006 | Bazakos et al. |
| 2006/0085477 A1 | 4/2006 | Phillips et al. |
| 2006/0085735 A1 | 4/2006 | Shimizu |
| 2006/0104515 A1 | 5/2006 | King et al. |
| 2006/0112092 A1 | 5/2006 | Ziou et al. |
| 2006/0116555 A1 | 6/2006 | Pavlidis et al. |
| 2006/0119880 A1 | 6/2006 | Dandekar et al. |
| 2006/0122884 A1 | 6/2006 | Graham et al. |
| 2006/0122983 A1 | 6/2006 | King et al. |
| 2006/0123347 A1* | 6/2006 | Hewitt et al. ............... 715/748 |
| 2006/0140475 A1 | 6/2006 | Chin et al. |
| 2006/0140614 A1 | 6/2006 | Kim et al. |
| 2006/0143176 A1 | 6/2006 | Mojsilovic et al. |
| 2006/0150079 A1 | 7/2006 | Albornoz et al. |
| 2006/0190812 A1 | 8/2006 | Ellenby et al. |
| 2006/0200480 A1 | 9/2006 | Harris et al. |
| 2006/0206335 A1 | 9/2006 | Thelen et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1 | 11/2006 | Gokturk et al. |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2007/0003166 A1 | 1/2007 | Berkner |
| 2007/0019261 A1* | 1/2007 | Chu ............................. 358/540 |
| 2007/0036469 A1 | 2/2007 | Kim et al. |
| 2007/0041668 A1 | 2/2007 | Todaka |
| 2007/0047819 A1 | 3/2007 | Hull et al. |
| 2007/0053513 A1 | 3/2007 | Hoffberg |
| 2007/0076922 A1 | 4/2007 | Living et al. |
| 2007/0115373 A1 | 5/2007 | Gallagher et al. |
| 2007/0150466 A1 | 6/2007 | Brave et al. |
| 2007/0165904 A1 | 7/2007 | Nudd et al. |
| 2007/0174269 A1 | 7/2007 | Jing et al. |
| 2007/0175998 A1 | 8/2007 | Lev |
| 2007/0233613 A1 | 10/2007 | Barrus et al. |
| 2007/0271247 A1 | 11/2007 | Best et al. |
| 2007/0276845 A1 | 11/2007 | Geilich |
| 2008/0010605 A1 | 1/2008 | Frank |
| 2008/0037043 A1 | 2/2008 | Hull et al. |
| 2008/0071767 A1 | 3/2008 | Grieselhuber et al. |
| 2008/0078836 A1 | 4/2008 | Tomita |
| 2008/0267504 A1 | 10/2008 | Schloter et al. |
| 2008/0275881 A1* | 11/2008 | Conn et al. ..................... 707/10 |
| 2008/0288476 A1 | 11/2008 | Kim et al. |
| 2008/0296362 A1 | 12/2008 | Lubow |
| 2008/0310717 A1 | 12/2008 | Saathoff et al. |
| 2009/0067726 A1 | 3/2009 | Erol et al. |
| 2009/0152357 A1 | 6/2009 | Lei et al. |
| 2009/0235187 A1 | 9/2009 | Kim et al. |
| 2009/0254643 A1 | 10/2009 | Terheggen et al. |
| 2009/0265761 A1 | 10/2009 | Evanitsky |
| 2010/0013615 A1 | 1/2010 | Hebert et al. |
| 2010/0174783 A1* | 7/2010 | Zarom ........................... 709/205 |
| 2011/0121069 A1 | 5/2011 | Lindahl et al. |

FOREIGN PATENT DOCUMENTS

| | | |
|---|---|---|
| CN | 1245935 | 3/2000 |
| EP | 0706283 A | 4/1996 |
| EP | 1229496 A2 | 8/2002 |

| | | |
|---|---|---|
| EP | 1555626 A2 | 7/2005 |
| EP | 1662064 A1 | 5/2006 |
| EP | 1783681 | 5/2007 |
| JP | 10-228468 A | 8/1998 |
| JP | 2000-165645 A | 6/2000 |
| JP | 200268179 | 9/2000 |
| JP | 2001211359 | 8/2001 |
| JP | 2001230916 | 8/2001 |
| JP | 2002513480 | 5/2002 |
| JP | 2005286395 | 10/2005 |
| JP | 2006053568 | 2/2006 |
| JP | 2006059351 | 3/2006 |
| JP | 2006215756 | 8/2006 |
| WO | WO 99/05658 A1 | 2/1999 |
| WO | WO 2004/072897 A2 | 8/2004 |
| WO | WO 2005/043270 A2 | 5/2005 |
| WO | WO 2007/073347 A1 | 6/2007 |
| WO | 2008129373 | 10/2008 |

OTHER PUBLICATIONS

U.S. Appl. No. 10/813,901, filed Mar. 30, 2004, Erol et al.

Aggarwal, M et al, "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.

Akenine-Moller, T. et al., "Real-Time Rendering," A.K. Peters, Natick, MA, $2^{nd}$ Edition, 2002, pp. 70-84.

Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en.barcodepedia.com/>.

Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.

Baird, H.S., "Document Image Defect Models and Their Uses," Proc., IAPR $2^{nd}$ International Conference on Document Analysis and Recognition, Tsukuba Science City, Japan, Oct. 20-22, 1993, 7 pages.

Baird, H., "Document Image Defect Models," In Proc. Of IAPR Workshop on Syntactic and Structural Pattern Recognition, Murray Hill, NJ, Jun. 1990, Structured Document Image Analysis, Springer-Verlag, pp. 546-556.

Baird, H., "The State of the Art of Document Image Degradation Modeling," In Proc. Of the $4^{th}$ ISPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.

Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.

Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.

Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.

Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.

Brassil, J. et al., "Hiding Information in Document Images," Proc. Conf. Information Sciences and Systems (CISS-95), Mar. 1995, Johns Hopkins University, Baltimore, MD, pp. 482-489.

"Call for Papers: ICAT 2007," $17^{th}$ International Conference on Artificial Reality and Telexistence, 2007, [Online] [Retrieved on Noember 4, 2008] Retrieved from the Internet<URL:http://www.idemployee.id.tue.nl/g.w.m.rauterberg/conferences/ICAT2007-CfP.pdf>.

Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.

Cover, T.M. et al., "Nearest Neighbor Pattern Classification," IEEE Transactions on Information Theory, Jan. 1967, pp. 21-27, vol. IT-13, No. 1.

Davis, M. et al., "Towards Context-Aware Face Recognition," Proceedings of the13th Annual ACM International Conference on Multimedia, Nov. 6-11, 2005, pp. 483-486, vol. 13.

Doermann, D. et al., "Progress in Camera-Based Document Image Analysis," Proceedings of the Seventh International Conference on Document Analysis and Recognition, ICDAR 2003, 11 pages, [online] Retrieved from the Internet<URL:http://www.cse.salford.ac.uk/prima/ICDAR2003/Papers/0111_keynote_111_doermann_d.pdf>.

Erol, B. et al., "Linking Multimedia Presentations with Their Symbolic Source Documents: Algorithm and Applications," Nov. 2-8, 2003, pp. 498-507, [Online] [Retreived on Oct. 15, 2008] Retrieved from the Internet<URL:http://rii.ricoh.com/{hull/pubs/p225_erol.pdf>.

Esposito, F. et al., "Machine Learning Methods for Automatically Processing Historical Documents: from Paper Acquisition to XML Transformation," Proceedings of the First International Workshop on Document Image Analysis for Libraries (Dial '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

Ho, T.K. et al., "Decision Combination in Multiple Classifier Systems," IEEE Transactions on Pattern Analysis and Machine Intelligence, Jan. 1994, pp. 66-75, vol. 16, No. 1.

Ho, T.K. et al., "Evaluation of OCT Accuracy Using Synthetic Data," Proceedings of the $4^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoh.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," $17^{th}$ International Conference on Artificial Reality and Telexistence, Nov. 1, 2007, pp. 205-209.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL:http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Function Word Ident ficat on n Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL:http://www.cs.cmu.edu/afs/cs/usr/andrewt/papers/Validate/journal.ps.gz>.

Liang, J. et al., "Flattening Curved Documents in Images," In Proc. Of the IEEE Conf. On Computer Vision and Pattern Recognition (CVPR), 2005, 8 pages, [online] Retrieved from the Internet<URL:http://www.cfar.umd.edu/~daniel/daniel_papersfordownload/liang-j_cpvr2005.pdf>.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL:http://www.pcworld.com/news/article/0,aid,11016,00.asp>.

Microsoft Computer Dictionary (5$^{th}$ ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL:http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL:http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia, "Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zhang, Z., "A Flexible New Technique for Camera Calibration," IEEE Transactions on Pattern Analysis and Machine Intelligence, Nov. 2000, pp. 1330-1334, vol. 22, No. 11.

Zheng, Q.-F. et al., "Effective and Efficient Object-Based Image Retrieval Using Visual Phases," Proceedings of the 14$^{th}$ Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>=.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL:http://web.archive.org/web/20060619172549/http://www.scanbuy.com/website/solutions_su . . . >.

Canny, J., "A Computational Approach to Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm,", International Conference on Image Analysis and Processing, 1999, pp. 322-327.

Duda, R. O. et al., "Use of the Hough Transformation to Detect Lines and Curves in Pictures," Communications of the ACM, Jan. 1972, pp. 11-15, vol. 15, No. 1.

Erol, B. et al., "Prescient Paper: Multimedia Document Creation with Document Image Matching," 17$^{th}$ International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards a System for Visually Impaired Persons," Proc. of 17th Int. Conf. on Pattern Recognition (ICPR 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7$^{th}$ International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6th British Machine Vision Conference, 1995, 10 pages.
Sezgin, M. et al., "Survey Over Image Thresholding Techniques and Quantitative Performance Evaluation," Journal of Electronic Imaging, Jan. 2004, pp. 146-165, vol. 13, No. 1.
Triantafyllidis, G.A. et al., "Detection of Blocking Artifacts of Compressed Still Images," Proceedings of the 11th International Conference on Image Analysis and Processing (ICIAP '01), IEEE, 2001, pp. 1-5.
U.S. Appl. No. 10/696,735, filed Oct. 28, 2003, Erol, B. et al., "Techniques for Using a Captured Image for the Retrieval of Recorded Information," 58 pages.
Zanibbi, R. et al. "A Survey of Table Recognition," International Journal on Document Analysis and Recognition, 2004, pp. 1-33.
Zhao, W. et al., Face Recognition: A Literature Survey, ACM Computing Surveys (CSUR), 2003, pp. 399-458, vol. 35, No. 4.
Erol, B. et al., "Linking Presentation Documents Using Image Analysis," IEEE, Nov. 9-12, 2003, pp. 97-101, vol. 1
Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.
European Search Report, European Application No. 09156089.6, Jun. 19, 2009, 8 pages.
Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.
European Search Report, European Application No. 09170045.0, Nov. 24, 2009, 4 pages.
Roth, M.T. et al., "The Garlic Project," Proc. of the 1996 ACM SIGMOD International Conference on Management of Data, Montreal, Quebec, Canada, Jun. 4, 1996, pp. 557.
Liu, Y. et al., "Automatic Texture Segmentation for Texture-Based Image Retrieval," IEEE, Jan. 5-7, 2004, pp. 285-288.
Liu, T. et al., "A Fast Image Segmentation Algorithm for Interactive Video Hotspot Retrieval," IEEE, 2001, pp. 3-8.
Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.
Wikipedia Online Encyclopedia, "Waypoint," Last Modified Feb. 13, 2010, pp. 1-4, [Online] Retrieved on Feb. 13, 2010] Retrieved from the Internet<URL:http://en.wikipedia.org/wiki/Waypoint>.
United States Office Action, U.S. Appl. No. 11/624,466, Jun. 8, 2010, 29 pages.
United States Office Action, U.S. Appl. No. 11/827,530, Jun. 9, 2010, 35 pages.
United States Office Action, U.S. Appl. No. 11/461,294, Jun. 11, 2010, 19 pages.
United States Office Action, U.S. Appl. No. 11/461,300, Jun. 11, 2010, 20 pages.
United States Office Action, U.S. Appl. No. 11/461,024, Jul. 14, 2010, 29 pages.
United States Office Action, U.S. Appl. No. 11/461,049, Jul. 28, 2010, 27 pages.
United States Office Action, U.S. Appl. No. 11/461,279, Aug. 5, 2010, 37 pages.
United States Office Action, U.S. Appl. No. 11/461,286, Aug. 5, 2010, 28 pages.
United States Office Action, U.S. Appl. No. 12/240,596, Aug. 6, 2010, 32 pages.
Japanese Office Action, Japanese Application No. 2004-293962, Aug. 24, 2010, 3 pages.
Extended European Search Report, Application No. 09178280.5-2201/2202646, Aug. 31, 2010, 6 pages.
United States Office Action, U.S. Appl. No. 11/461,143, Aug. 18, 2010, 9 pages.
United States Office Action, U.S. Appl. No. 11/461,272, Aug. 23, 2010, 31 pages.
United States Office Action, U.S. Appl. No. 11/461,126, Sep. 3, 2010, 28 pages.
United States Notice of Allowance, U.S. Appl. No. 11/461,095, Sep. 27, 2010, 29 pages.
United States Office Action, U.S. Appl. No. 12/060,194, Oct. 1, 2010, 29 pages.
United States Office Action, U.S. Appl. No. 11/461,294, Oct. 7, 2010, 17 pages.
United States Office Action, U.S. Appl. No. 11/461,300, Oct. 6, 2010, 20 pages.
United States Office Action, U.S. Appl. No. 11/827,530, Oct. 7, 2010, 21 pages.
United States Office Action, U.S. Appl. No. 11/624,466, Oct. 14, 2010, 11 pages.
United States Notice of Allowance, U.S. Appl. No. 11/461,091, Oct. 18, 2010, 31 pages.
United States Notice of Allowance, U.S. Appl. No. 11/461,024, Nov. 15, 2010, 10 pages.
United States Notice of Allowance, U.S. Appl. No. 11/461,049, Nov. 16, 2010, 10 pages.
United States Notice of Allowability, U.S. Appl. No. 11/461,091, Nov. 17, 2010, 22 pages.
United States Office Action, U.S. Appl. No. 11/777,142, Nov. 10, 2010, 17 pages.
U.S. Office Action, U.S. Appl. No. 11/776,520, Dec. 7, 2010, 43 pages.
U.S. Office Action, U.S. Appl. No. 12/719,437, Dec. 9, 2010, 38 pages.
U.S. Office Action, U.S. Appl. No. 11/776,510, Dec. 10, 2010, 39 pages.
U.S. Office Action, U.S. Appl. No. 11/461,126, Dec. 23, 2010, 30 pages.
U.S. Office Action, U.S. Appl. No. 11/461,279, Jan. 7, 2011, 44 pages.
U.S. Office Action, U.S. Appl. No. 12/240,596, Jan. 21, 2011, 21 pages.
U.S. Office Action, U.S. Appl. No. 11/461,286, Jan. 21, 2011, 34 pages.
U.S. Office Action, U.S. Appl. No. 11/461,143, Feb. 4, 2011, 16 pages.
Japanese Office Action, Japanese Patent Application No. 200910138044.X, Jan. 26, 2011, 6 pages.
U.S. Notice of Allowance, U.S. Appl. No. 11/624,466, Feb. 22, 2011, 12 pages.
U.S. Notice of Allowance, U.S. Appl. No. 11/461,272, Feb. 23, 2011, 28 pages.
U.S. Office Action, U.S. Appl. No. 12/060,194, Feb. 25, 2011, 18 pages.
U.S. Office Action, U.S. Appl. No. 12/879,933, Mar. 2, 2011, 7 pages.
U.S. Office Action, U.S. Appl. No. 12/210,519, Mar. 14, 2011, 38 pages.
U.S. Notice of Allowance, U.S. Appl. No. 11/461,024, Mar. 16, 2011, 12 pages.
U.S. Office Action, U.S. Appl. No. 11/461,300, Mar. 18, 2011, 25 pages.
U.S. Office Action, U.S. Appl. No. 11/777,142, Mar. 18, 2011, 21 pages.
U.S. Office Action, U.S. Appl. No. 11/461,037, Mar. 30, 2011, 29 pages.
U.S. Office Action, U.S. Appl. No. 12/210,511, Apr. 4, 2011, 49 pages.
U.S. Office Action, U.S. Appl. No. 12/247,202, Apr. 6, 2011, 37 pages.
U.S. Office Action, U.S. Appl. No. 11/461,126, Apr. 12, 2011, 27 pages.
U.S. Office Action, U.S. Appl. No. 11/461,294, Apr. 12, 2011, 23 pages.
U.S. Office Action, U.S. Appl. No. 12/210,540, Apr. 15, 2011, 45 pages.
U.S. Office Action, U.S. Appl. No. 12/340,124, Apr. 15, 2011, 48 pages.
Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.
Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.
Rademacher, "View-Dependent Geometry", Computer Graphics Proceedings, Annual Conference Series, SIGGRAPH 99, Los Angeles, California Aug. 8-13, 1999, pp. 439-446, XP001024743.
U.S. Patent Office Action, U.S. Appl. No. 12/121,275, Apr. 20, 2011, 44 pages.
U.S. Patent Office Action, U.S. Appl. No. 11/776,520, Apr. 28, 2011, 10 pages.
Extended European Search Report, European Patent Application No. 082523770, May 2, 2011, 6 pages.
U.S. Patent Office Action, U.S. Appl. No. 11/776,510, May 12, 2011, 20 pages.
U.S. Patent Office Action, U.S. Appl. No. 12/210,519, Jun. 16, 2011, 22 pages.
U.S. Patent Office Action, U.S. Appl. No. 12/060,194, Jun. 27, 2011, 18 pages.
United States Office Action, U.S. Appl. No. 11/461,279, Jul. 8, 2011, 46 pages.
United States Office Action, U.S. Appl. No. 11/461,286, Jul. 15, 2011, 37 pages.
United States Office Action, U.S. Appl. No. 11/461,126, Jul. 22, 2011, 35 pages.
United States Notice of Allowance, U.S. Appl. No. 12/247,202, Jul. 28, 2011, 16 pages.
United States Office Action, U.S. Appl. No. 11/461,143, Aug. 11, 2011, 20 pages.
United States Office Action, U.S. Appl. No. 11/776,530, Aug. 19, 2011, 54 pages.
United States Office Action, U.S. Appl. No. 12/253,715, Aug. 31, 2011, 58 pages.
United States Office Action, U.S. Appl. No. 12/060,198, Sep. 1, 2011, 87 pages.
United States Office Action, U.S. Appl. No. 12/060,200, Sep. 2, 2011, 65 pages.
United States Notice of Allowance, U.S. Appl. No. 11/776,510, Sep. 22, 2011, 11 pages.
United States Office Action, U.S. Appl. No. 11/777,142, Sep. 23, 2011, 22 pages.
United States Office Action, U.S. Appl. No. 12/210,511, Sep. 28, 2011, 25 pages.
United States Office Action, U.S. Appl. No. 12/247,205, Oct. 6, 2011, 56 pages.
United States Office Action, U.S. Appl. No. 12/342,330, Oct. 7, 2011, 47 pages.
Adobe Acrobat Advanced Elements (for both PC and Mac Computers), 2002, pp. 1-19.
EPO Summons for Oral Proceedings, European Patent Application No. 07015093.3, Sep. 16, 2011, 4 pages.
Japanese Office Action, Japanese Patent Application No. 2008-008112, Oct. 25, 2011, 3 pages.
Mae et al., "Object Recognition Using Appearance Models Accumulated into Enviornment", Proc. 15-th Intl. Conf. on Pattern Recognition, 2000, vol. 4, pp. 845-848.
U.S. Office Action, U.S. Appl. No. 12/210,540, Oct. 14, 2011, 22 pages.
U.S. Office Action, U.S. Appl. No. 12/265,502, Oct. 14, 2011, 61 pages.
U.S. Office Action, U.S. Appl. No. 11/776,520, Oct. 17, 2011, 19 pages.
U.S. Office Action, U.S. Appl. No. 12/121,275, Oct. 19, 2011, 24 pages.
U.S. Office Action, U.S. Appl. No. 12/340,124, Oct. 24, 2011, 31 pages.
U.S. Office Action, U.S. Appl. No. 11/827,530, Oct. 28, 2011, 43 pages.
U.S. Office Action, U.S. Appl. No. 12/879,933, Oct. 28, 2011, 36 pages.
U.S. Office Action, U.S. Appl. No. 12/210,532, Oct. 31, 2011, 61 pages.
U.S. Office Action, U.S. Appl. No. 11/461,037, Nov. 23, 2011, 33 pages.
U.S. Notice of Allowance, U.S. Appl. No. 12/060,194, Nov. 28, 2011, 23 pages.
U.S. Office Action, U.S. Appl. No. 11/461,126, Dec. 1, 2011, 53 pages.
U.S. Notice of Allowance, U.S. Appl. No. 11/461,143, Dec. 5, 2011, 15 pages.
United States Office Action, U.S. Appl. No. 12/060,206, Dec. 15, 2011, 55 pages.
United States Notice of Allowance, U.S. Appl. No. 11/776,530, Dec. 21, 2011, 17 pages.
United States Office Action, U.S. Appl. No. 12/210,519, Jan. 5, 2012, 29 pages.
United States Notice of Allowance, U.S. Appl. No. 11/776,520, Jan. 5, 2012, 28 pages.
United States Office Action, U.S. Appl. No. 11/461,294, Jan. 18, 2012, 38 pages.
United States Office Action, U.S. Appl. No. 11/461,286, Jan. 20, 2012, 27 pages.
United States Notice of Allowance, U.S. Appl. No. 11/777,142, Jan. 20, 2012, 29 pages.
United States Notice of Allowance, U.S. Appl. No. 12/342,330, Jan. 23, 2012, 21 pages.
United States Office Action, U.S. Appl. No. 12/059,583, Jan. 26, 2012, 78 pages.
United States Office Action, U.S. Appl. No. 12/240,596, Feb. 2, 2012, 44 pages.
United States Office Action, U.S. Appl. No. 11/461,300, Feb. 23, 2012, 38 pages.

* cited by examiner

*Primary Examiner* — Adam M Queler
(74) *Attorney, Agent, or Firm* — Patent Law Works LLP

(57) ABSTRACT

An MMR system for publishing comprises a plurality of mobile devices, an MMR gateway, an MMR matching unit, and an MMR publisher. A computer includes a document authoring application, plug-in, and printer driver. The MMR matching unit receives an image query from the MMR gateway and sends it to one or more of the recognition units to identify a result including a document, the page and the location on the page. The list of results and links are sent back to the MMR gateway for presentation on the mobile device. The present invention also includes a number of novel methods including a method for capturing symbolic information from documents and for capturing printer dll functions.

12 Claims, 33 Drawing Sheets

```
<SPAN style="
    width: auto;
    height: auto;
    display: inline;
    font-family: 'ExportToPaper 1210
    Courier New';
    text-decoration: none;      1208
    position:absolute;    1206
    color: black;
    line-height=1;
    font-size=1;
    \">
t0</SPAN>    1204
```

```
<A href="http://www.ricoh.com">
     Ricoh!
     <IMG        src="../images/
ricoh_sm.gif">
     PostImage
  </A>
```

Figure 14A

```
<A href="http://www.ricoh.com">

<SPAN>
        <SPAN ...>t0</SPAN>
            Ric
        <SPAN ...>t0</SPAN>
            oh!
        <SPAN ...>t0</SPAN>
    </SPAN>

<SPAN>
        <SPAN ...>i0</SPAN>
            <IMG src="../images/ricoh_sm.gif">
        <SPAN ...>i0</SPAN>
    </SPAN>

<SPAN>
        <SPAN ...>t0</SPAN>
            Post
        <SPAN ...>t0</SPAN>
            Imag
        <SPAN ...>t0</SPAN>
            e
        <SPAN ...>t0</SPAN>
    </SPAN>
 </A>
```

Figure 14B

```
<?xml version="1.0" encoding="UTF-16" ?>
<hotspotlist>
    <hotspot>
        <id>0</id>
        <url><![CDATA[http://www.ricoh.com/
]]></url>
        <title><![CDATA[Ricoh!  PostImage
]]></title>
    </hotspot>
</hotspotlist>
```

```
<?xml version="1.0" encoding="UTF-16" ?>
<rcprintc>
    <setup>
        <documentname>file://C:\hull\patents\mmr_doog\printing_example\
export_to_pape</documentname>
        <version>1.19</version>
        <date>Thu Sep 11 18:35:24 2008</date>
        <dpix>600</dpix>
        <dpiy>600</dpiy>
        <resx>5100</resx>
        <resy>6600</resy>
        <offx>150</offx>
        <offy>100</offy>
        <width>8.5</width>
        <height>11.0</height>
        <imagescale>1.00</imagescale>
    </setup>

<sequence>
            <font>
                <face>Times New Roman</face>
                <height>111</height>
                <spaceadvance>25</spaceadvance>
            </font>
            <is_unicode>1</is_unicode>
            <text>R</text>
            <char box="302 495 66 67">0x52</char>
        </sequence>
        <sequence>
            <font>
                <face>Times New Roman</face>
                <height>111</height>
                <spaceadvance>25</spaceadvance>
            </font>
            <is_unicode>1</is_unicode>
            <text>icoh</text>
            <char box="370 492 22 70">0x69</char>
            <char box="397 516 38 47">0x63</char>
            <char box="442 516 43 47">0x6f</char>
            <char box="490 492 49 70">0x68</char>
        </sequence>
        <sequence>
            <font>
                <face>Times New Roman</face>
                <height>111</height>
                <spaceadvance>25</spaceadvance>
            </font>
            <is_unicode>1</is_unicode>
            <text>!</text>
            <char box="550 494 11 69">0x21</char>
        </sequence>
```

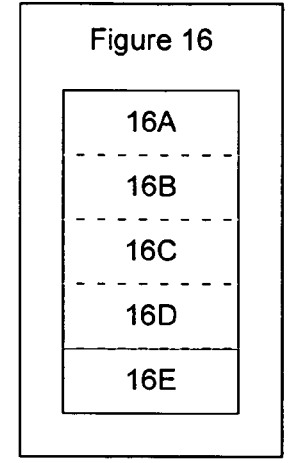

```
<sequence>
        <font>
                <face>Times New Roman</face>
                <height>111</height>
                <spaceadvance>25</spaceadvance>
        </font>
        <is_unicode>1</is_unicode>
        <text> </text>
        <char box="572 562 1 1">0x20</char>
</sequence>
<sequence>
        <font>
                <face>Times New Roman</face>
                <height>111</height>
                <spaceadvance>25</spaceadvance>
        </font>
        <is_unicode>1</is_unicode>
        <text> </text>
        <char box="1303 562 1 1">0x20</char>
</sequence>
<sequence>
        <font>
                <face>Times New Roman</face>
                <height>111</height>
                <spaceadvance>25</spaceadvance>
        </font>
        <is_unicode>1</is_unicode>
        <text>Post</text>
        <char box="1331 495 50 67">0x50</char>
        <char box="1387 516 43 47">0x6f</char>
        <char box="1439 516 31 47">0x73</char>
        <char box="1473 502 28 61">0x74</char>
</sequence>
<sequence>
        <font>
                <face>Times New Roman</face>
                <height>111</height>
                <spaceadvance>25</spaceadvance>
        </font>
        <is_unicode>1</is_unicode>
        <text>Imag</text>
        <char box="1503 495 27 67">0x49</char>
        <char box="1535 516 76 46">0x6d</char>
        <char box="1615 516 42 47">0x61</char>
        <char box="1659 516 44 67">0x67</char>
</sequence>
```

Figure 16B

```
<sequence>
        <font>
                <face>Times New Roman</face>
                <height>111</height>
                <spaceadvance>25</spaceadvance>
        </font>
        <is_unicode>1</is_unicode>
        <text>e</text>
        <char box="1709 516 38 47">0x65</char>
</sequence>
<sequence>
        <font>
                <face>Times New Roman</face>
                <height>111</height>
                <spaceadvance>25</spaceadvance>
        </font>
        <is_unicode>1</is_unicode>
        <text> </text>
        <char box="1751 562 1 1">0x20</char>
</sequence>
<sequence>
        <font>
                <face>ExportToPaper Courier New</face>
                <height>6</height>
                <spaceadvance>3</spaceadvance>
        </font>
        <is_unicode>1</is_unicode>
        <text>t0</text>
        <char box="367 355 1 1">0x74</char>
        <char box="370 355 1 1">0x30</char>
</sequence>
<sequence>
        <font>
                <face>ExportToPaper Courier New</face>
                <height>6</height>
                <spaceadvance>3</spaceadvance>
        </font>
        <is_unicode>1</is_unicode>
        <text>t0</text>
        <char box="539 355 1 1">0x74</char>
        <char box="542 355 1 1">0x30</char>
</sequence>
```

Figure 16C

```
<sequence>
    <font>
        <face>ExportToPaper Courier New</face>
        <height>6</height>
        <spaceadvance>3</spaceadvance>
    </font>
    <is_unicode>1</is_unicode>
    <text>t0</text>
    <char box="572 355 1 1">0x74</char>
    <char box="575 355 1 1">0x30</char>
</sequence>
<sequence>
    <font>
        <face>ExportToPaper Courier New</face>
        <height>6</height>
        <spaceadvance>3</spaceadvance>
    </font>
    <is_unicode>1</is_unicode>
    <text>i0</text>
    <char box="597 355 1 1">0x69</char>
    <char box="600 355 1 1">0x30</char>
</sequence>
<sequence>
    <font>
        <face>ExportToPaper Courier New</face>
        <height>6</height>
        <spaceadvance>3</spaceadvance>
    </font>
    <is_unicode>1</is_unicode>
    <text>i0</text>
    <char box="1303 355 1 1">0x69</char>
    <char box="1306 355 1 1">0x30</char>
</sequence>
<sequence>
    <font>
        <face>ExportToPaper Courier New</face>
        <height>6</height>
        <spaceadvance>3</spaceadvance>
    </font>
    <is_unicode>1</is_unicode>
    <text>t0</text>
    <char box="1329 355 1 1">0x74</char>
    <char box="1332 355 1 1">0x30</char>
</sequence>
```

Figure 16D

```
        <sequence>
                <font>
                        <face>ExportToPaper Courier New</face>
                        <height>6</height>
                        <spaceadvance>3</spaceadvance>
                </font>
                <is_unicode>1</is_unicode>
                <text>t0</text>
                <char box="1501 355 1 1">0x74</char>
                <char box="1504 355 1 1">0x30</char>
        </sequence>
        <sequence>
                <font>
                        <face>ExportToPaper Courier New</face>
                        <height>6</height>
                        <spaceadvance>3</spaceadvance>
                </font>
                <is_unicode>1</is_unicode>
                <text>t0</text>
                <char box="1706 355 1 1">0x74</char>
                <char box="1709 355 1 1">0x30</char>
        </sequence>
        <sequence>
                <font>
                        <face>ExportToPaper Courier New</face>
                        <height>6</height>
                        <spaceadvance>3</spaceadvance>
                </font>
                <is_unicode>1</is_unicode>
                <text>t0</text>
                <char box="1751 355 1 1">0x74</char>
                <char box="1754 355 1 1">0x30</char>
        </sequence>

</rcprintc>
```

Figure 16E

```
<?xml version="1.0" encoding="UTF-8" ?>
<hotspotlayout>
    <setup>
        <printcapfile>01220822674_rcprintc.xml</printcapfile>
        <printername></printername>
        <documentname><![CDATA[file://C:\
export_to_paper.htm]]></documentname>
        <prfile></prfile>
        <textfile></textfile>
        <app></app>
        <date>Sun Sep 07 14:24:38 2008</date>
        <dpix>600</dpix>
        <dpiy>600</dpiy>
        <resx>5100</resx>
        <resy>6600</resy>
        <width>8.5</width>
        <height>11</height>
        <imagescale>1</imagescale>
        <title><![CDATA[]]></title>
    </setup>

<hotspot box="372 355 2478 60">
            <id>0</id>
            <url><![CDATA[http://www.ricoh.com/]]></url>
            <title><![CDATA[Ricoh!  PostImage ]]></title>
        </hotspot>

</hotspotlayout>
```

Figure 17

CAPTURING SYMBOLIC INFORMATION FROM DOCUMENTS UPON PRINTING

CROSS REFERENCE TO RELATED APPLICATIONS

This application is a continuation in part of U.S. patent application Ser. No. 11/461,017, titled "System And Methods For Creation And Use Of A Mixed Media Environment," filed Jul. 31, 2006, now U.S. Pat. No. 7,702,673; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,126, titled "Integration And Use Of Mixed Media Documents," filed Jul. 31, 2006; U.S. patent application Ser. No. 11/461,143, titled "User Interface For Mixed Media Reality," filed Jul. 31, 2006; U.S. patent application Ser. No. 11/461,268, titled "Authoring Tools Using A Mixed Media Environment," filed Jul. 31, 2006, now U.S. Pat. No. 7,639,387; U.S. patent application Ser. No. 11/461,272, titled "System And Methods For Creation And Use Of A Mixed Media Environment With Geographic Location Information," filed Jul. 31, 2006; now U.S. Pat. No. 8,005,831; U.S. patent application Ser. No. 11/461,064, titled "System And Methods For Portable Device For Mixed Media System," filed Jul. 31, 2006, now U.S. Pat. No. 7,669,148; U.S. patent application Ser. No. 11/461,075, titled "System And Methods For Use Of Voice Mail And Email In A Mixed Media Environment," filed Jul. 31, 2006, now U.S. Pat. No. 7,812,986; U.S. patent application Ser. No. 11/461,090, titled "System And Method For Using Individualized Mixed Document," filed Jul. 31, 2006, now U.S. Pat. No. 7,551,780; U.S. patent application Ser. No. 11/461,037, titled "Embedding Hot Spots In Electronic Documents," filed Jul. 31, 2006; U.S. patent application Ser. No. 11/461,085, titled "Embedding Hot Spots In Imaged Documents," filed Jul. 31, 2006; U.S. patent application Ser. No. 11/461,091, titled "Shared Document Annotation," filed Jul. 31, 2006, now U.S. Pat. No. 7,885,955; U.S. patent application Ser. No. 11/461,095, titled "Visibly-Perceptible Hot Spots In Documents," filed Jul. 31, 2006, now U.S. Pat. No. 7,917,554; U.S. patent application Ser. No. 11/466,414, titled "Mixed Media Reality Brokerage Network and Methods of Use," filed Aug. 22, 2006, now U.S. Pat. No. 7,587,412; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,024, titled "Triggering Actions With Captured Input In A Mixed Media Environment," filed Jul. 31, 2006, now U.S. Pat. No. 7,991,778; U.S. patent application Ser. No. 11/461,032, titled "Triggering Applications Based On A Captured Text In A Mixed Media Environment," filed Jul. 31, 2006, now U.S. Pat. No. 7,672,543; U.S. patent application Ser. No. 11/461,049, titled "Triggering Applications For Distributed Action Execution And Use Of Mixed Media Recognition As A Control Input," filed Jul. 31, 2006, now U.S. Pat. No. 7,920,759; U.S. patent application Ser. No. 11/461,109, titled "Searching Media Content For Objects Specified Using Identifiers," filed Jul. 31, 2006; U.S. patent application Ser. No. 11/827,530, titled "User Interface For Three-Dimensional Navigation," filed Jul. 11, 2007; U.S. patent application Ser. No. 12/060,194, titled "Document-Based Networking With Mixed Media Reality," filed Mar. 31, 2008; U.S. patent application Ser. No. 12/059,583, titled "Invisible Junction Feature Recognition For Document Security Or Annotation," filed Mar. 31, 2008; U.S. patent application Ser. No. 12/060,198, titled "Document Annotation Sharing," filed Mar. 31, 2008; U.S. patent application Ser. No. 12/060,200, titled "Ad Hoc Paper-Based Networking With Mixed Media Reality," filed Mar. 31, 2008; U.S. patent application Ser. No. 12/060,206, titled "Indexed Document Modification Sharing With Mixed Media Reality," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007, now U.S. Pat. No. 8,086,038; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; U.S. patent application Ser. No. 11/777,142, titled "Retrieving Documents By Converting Them to Synthetic Text," filed Jul. 12, 2007; U.S. patent application Ser. No. 11/624,466, titled "Synthetic Image and Video Generation From Ground Truth Data," filed Jan. 18, 2007, now U.S. Pat. No. 7,970,171; U.S. patent application Ser. No. 12/210,511, titled "Architecture For Mixed Media Reality Retrieval Of Locations And Registration Of Images," filed Sep. 15, 2008; U.S. patent application Ser. No. 12/210,519, titled "Automatic Adaption Of An Image Recognition System To Image Capture Devices," filed Sep. 15, 2008; U.S. patent application Ser. No. 12/210,532, titled "Computation Of A Recognizability Score (Quality Predictor) For Image Retrieval," filed Sep. 15, 2008; and U.S. patent application Ser. No. 12/210,540, titled "Combining Results Of Image Retrieval Processes" filed Sep. 15, 2008; all of which are incorporated by reference herein in their entirety.

BACKGROUND OF THE INVENTION

1. Field of the Invention

The invention relates to techniques for creating a mixed media document that is formed from at least two media types, and more particularly, to registering an image and other data in a Mixed Media Reality (MMR) system that uses printed media in combination with electronic media to retrieve mixed media documents and associated advertisements.

2. Background of the Invention

Document printing and copying technology has been used for many years in many contexts. By way of example, printers and copiers are used in commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment and electronic commerce.

Printed media has been the primary source of communicating information, such as newspapers and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the electronic multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

One particular problem is that a publisher cannot allow access to electronic versions of content using printed versions of the content. For example, for the publisher of a newspaper there is no mechanism that allows its users who receive the printed newspaper on a daily basis to use images of the newspaper to access the same online electronic content as well as augmented content. Moreover, while the publisher typically has the content for the daily newspaper in electronic form prior to printing, there currently does not exist a mechanism to easily migrate that content into an electronic form with augmented content.

A second problem is that there currently does not exist mechanisms for capturing symbolic information from documents upon printing.

SUMMARY OF THE INVENTION

The present invention overcomes the deficiencies of the prior art with an MMR system that is particularly advantageous because it provides an automatic mechanism for capturing symbolic information from documents upon printing. The MMR system is also advantageous because it has a unique architecture adapted to respond to image queries formed of image portions or pages of a printed publication.

In one embodiment, the MMR system comprises a plurality of mobile devices, a computer, an MMR gateway, an MMR matching unit, and an MMR publisher, as well as a computer with a document authoring application, a plug-in, and a printer driver. The mobile devices are communicatively coupled to the MMR gateway to send retrieval requests including image queries and other contextual information. The MMR gateway is able to couple to hundreds if not millions of mobile computing devices and service their retrieval requests. In one embodiment, the MMR gateway processes retrieval requests from mobile devices and performs user authentication, accounting, analytics and other communication and then generates an image query that is passed on to the MMR matching unit. The MMR matching unit includes a dispatcher, a plurality of recognition units, and index tables as well as an image registration unit. The MMR matching unit receives an image query from the MMR gateway and sends it to one or more of the recognition units to identify a result including a document, the page and the location on the page corresponding to the image query. The image registration unit of the MMR matching unit is also coupled to the MMR publisher to receive new content.

The present invention also includes a number of novel methods including a method for capturing symbolic information from documents and for capturing printer dll functions.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 12 shows an example of a fiducial mark in accordance with one embodiment of the present invention.

FIG. 14A shows an original HTML page is shown, FIG. 14B shows the same HTML after the fiducial marks have been added.

FIGS. 16A-16E illustrate an example of a page_desc.xml for the HTML file of FIG. 14A.

FIG. 17 shows an example of a hotspot.xml file in accordance with one embodiment of the present invention.

DETAILED DESCRIPTION OF PREFERRED EMBODIMENTS

Figure 1:
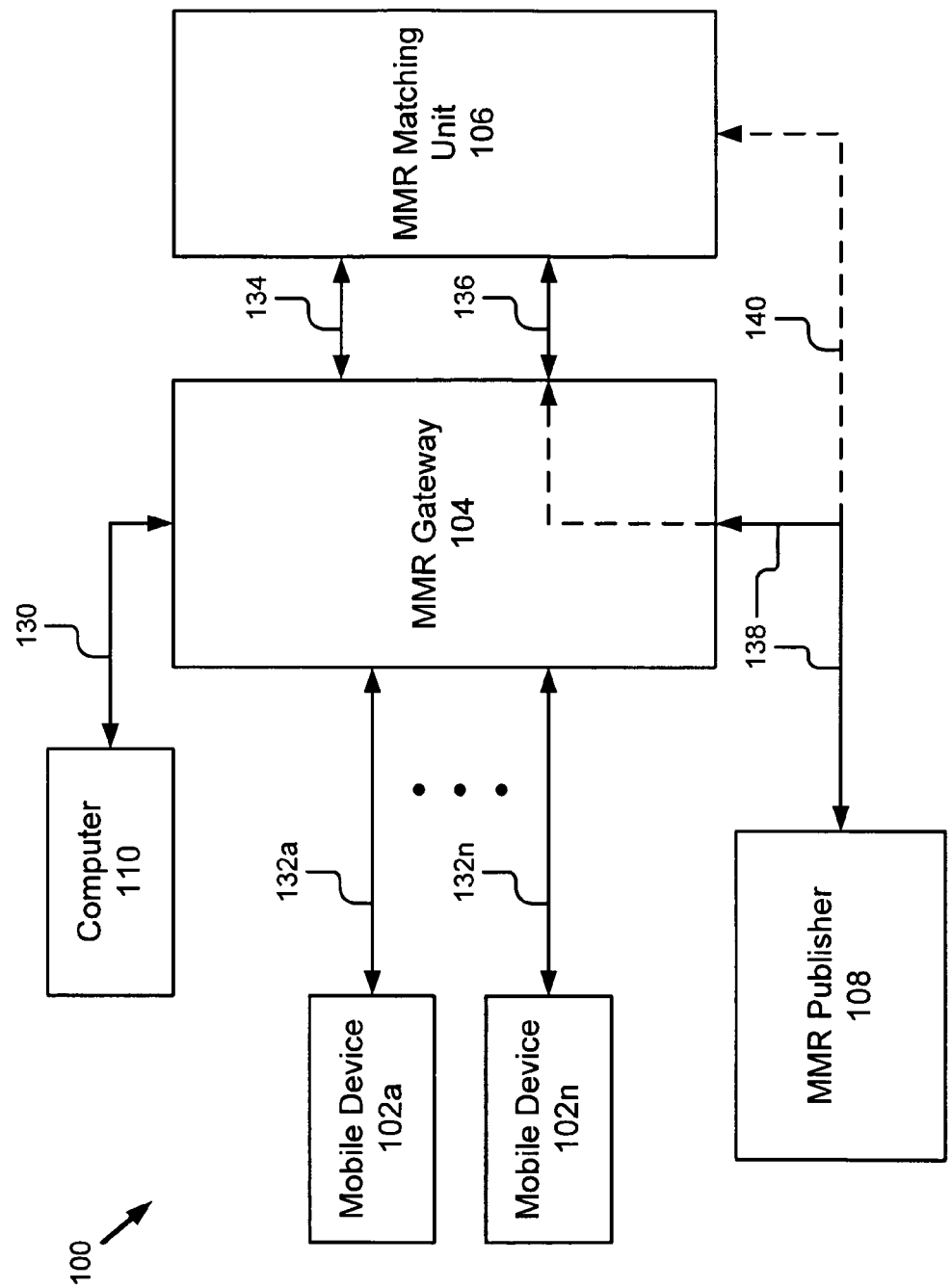
FIG. 1 is a block diagram of one embodiment of system mixed media reality system in accordance with the present invention.

An architecture for a mixed media reality (MMR) system 100 capable of receiving the query images and returning document pages and location as well as receiving images, hot spots and other data and adding such information to the MMR system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to use with a conventional mass media publisher, in particular a newspaper publisher. However, the present invention applies to any type of computing system and data processing in which multiple types of media including electronic media and print media are used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1 shows an embodiment of a MMR system 100 in accordance with the present invention. The MMR system 100 comprises a plurality of mobile devices 102a-102n, an MMR gateway 104, an MMR matching unit 106, an MMR publisher 108, and a computer 110. The present invention provides an MMR system 100 for use in publishing, e.g., of newspapers, magazines, books, or other publications. The MMR system 100 is particularly advantageous because it provides an automatic mechanism for capturing symbolic information from documents upon printing. The MMR system 100 is also advantageous because it has a unique architecture adapted to respond to image queries formed of image portions or pages of a printed publication.

The mobile devices 102a-102n are communicatively coupled by signal lines 132a-132n, respectively, to the MMR gateway 104 to send a "retrieval request." A retrieval request includes one or more of "image queries," other contextual information, and metadata. In one embodiment, an image query is an image in any format, or one or more features of an image. Examples of image queries include still images, video frames, and sequences of video frames. The mobile devices 102a-102n are mobile phones including a camera to capture images. It should be understood that the MMR system 100 will be utilized by hundreds or even millions of users that receive a traditional publication such as a daily newspaper. Thus, even though only two mobile devices 102a, 102n are shown, those skilled in the art will appreciate that the MMR gateway 104 may be simultaneously coupled to, receive and respond to retrieval requests from numerous mobile devices 102a-102n. Alternate embodiments for the mobile devices 102a-102n are described in more detail below with reference to FIGS. 2A and 2B.

As noted above, the MMR gateway 104 is able to couple to hundreds if not millions of mobile computing devices 102a-102n and service their retrieval requests. The MMR gateway 104 also is communicatively coupled to the computer 110 by signal line 130 for administration and maintenance of the MMR gateway 104 and running business applications. In one embodiment, the MMR gateway 104 creates and presents a web portal for access by the computer 110 to run business applications as well as access logs of use of the MMR system 100. The computer 110 can be any conventional computing device such as a personal computer, including a processor and other standard components known in the art. The main function of the MMR gateway 104 is processing retrieval requests from the mobile devices 102a-102n and returning recognition results back to the mobile devices 102a-102n. In one embodiment, the recognition results include one or more of a Boolean value (true/false) and if true, a page ID and a location on the page. In other embodiments, the recognition results also include one or more from the group of actions, a message acknowledging that the recognition was successful (or not), and consequences of that decision, such as the sending of an email message, a document, actions defined within a portable document file, addresses such as URLs, binary data such as video, information capable of being rendered on the mobile device 102, menus with additional actions, raster images, image features, etc. The MMR gateway 104 processes received retrieval requests by performing user authentication, accounting, analytics, and other communication. The MMR gateway 104 also generates image query and recognition parameters from the retrieval request, and passes them on to the MMR matching unit 106 via signal line 134. Embodiments and operation of the MMR gateway 104 are described in greater detail below with reference to FIG. 3.

The MMR matching unit 106 receives the image query from the MMR gateway 104 on signal line 134 and sends it to one or more of recognition units to identify a result including a document, page, and location on the page corresponding to the image query, referred to generally throughout this application as the "retrieval process." The result is returned from the MMR matching unit 106 to the MMR gateway 104 on signal line 134. In addition to the result, the MMR matching unit 106 may also return other related information such as hotspot data, including advertising content. The MMR matching unit 106 also includes components for receiving new content and updating and reorganizing index tables used in the retrieval process. The process of adding new content to the MMR matching unit 106 is referred to generally throughout this application as the "registration process." In one embodiment, the MMR matching unit 106 is coupled to the output of the MMR publisher 108 via signal lines 138 and 140 to provide new content used to update index tables of the MMR matching unit 106. In alternate embodiment, the MMR publisher 108 is coupled to the MMR gateway 104 by signal line 138 and the MMR gateway 104 is in turn coupled by signal line 136 to the MMR matching unit 106. In this alternate environment, MMR gateway 104 extracts augmented data such as hotspot information, stores it and passes the images, page references and other information to the MMR matching unit 106 for updating of the index tables. Various embodiments of the MMR matching unit 106 and its components are described in more detail below with reference to FIG. 4A-7.

The MMR publisher 108 includes a conventional publishing system used to generate newspapers or other types of periodicals. In one embodiment, the MMR publisher 108 also includes components for generating additional information needed to register images of printed documents with the MMR system 100. The information provided by the MMR publisher 108 to the MMR matching unit 106 includes an image file, bounding box data, hotspot data, and a unique page identification number. In one exemplary embodiment, this is a document in portable document format by Adobe Corp. of San Jose, Calif. and bounding box information. The publisher 108 also may provide information about the hierarchical structure associated with a publication, e.g., what documents are in the collection, what pages are in each document, and what zones are on each page, as well as a neighborhood preference function for pages and/or documents for publications typically read in a specific order. An embodiment for the MMR publisher 108 is described in more detail below with reference to FIG. 8.

Mobile Device 102

Figure 2A:
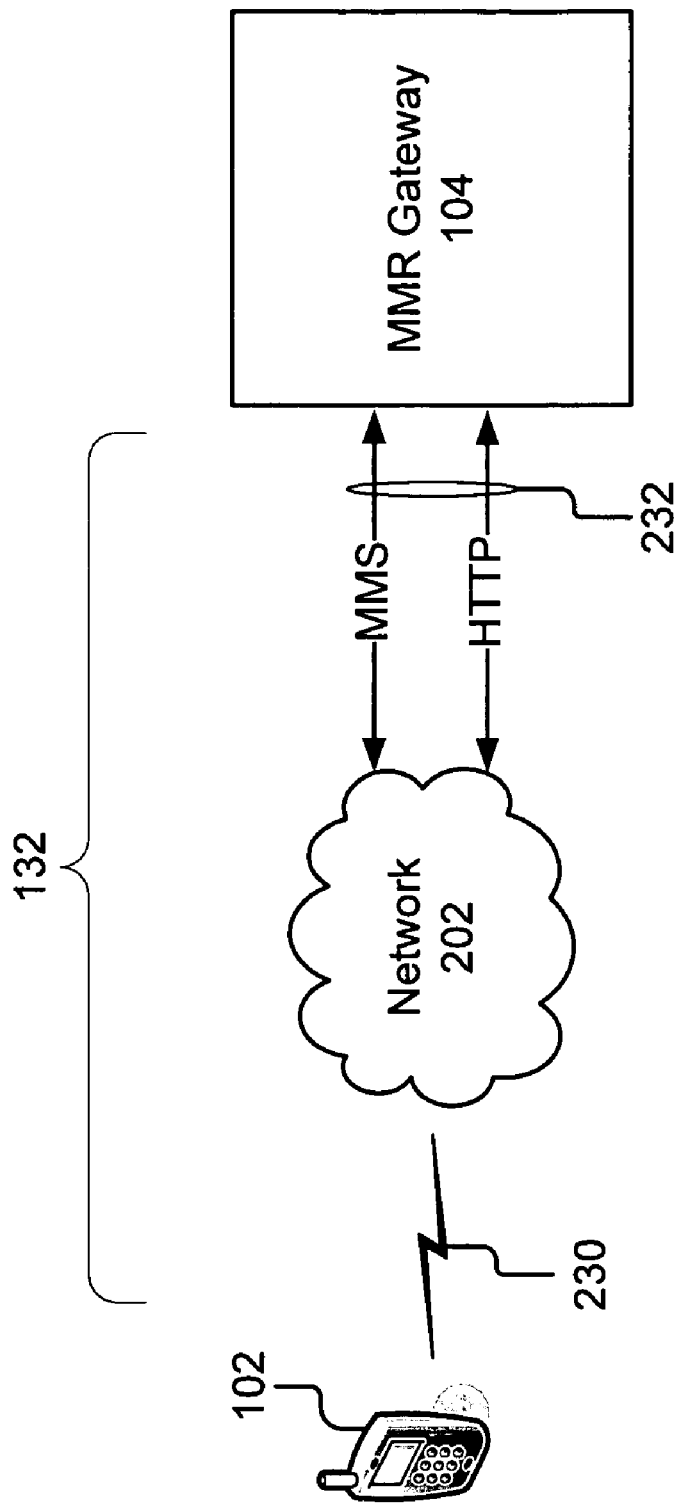
FIG. 2A is a block diagram of a first embodiment of a mobile device, network and MMR gateway configured in accordance with the present invention.
Figure 2B:
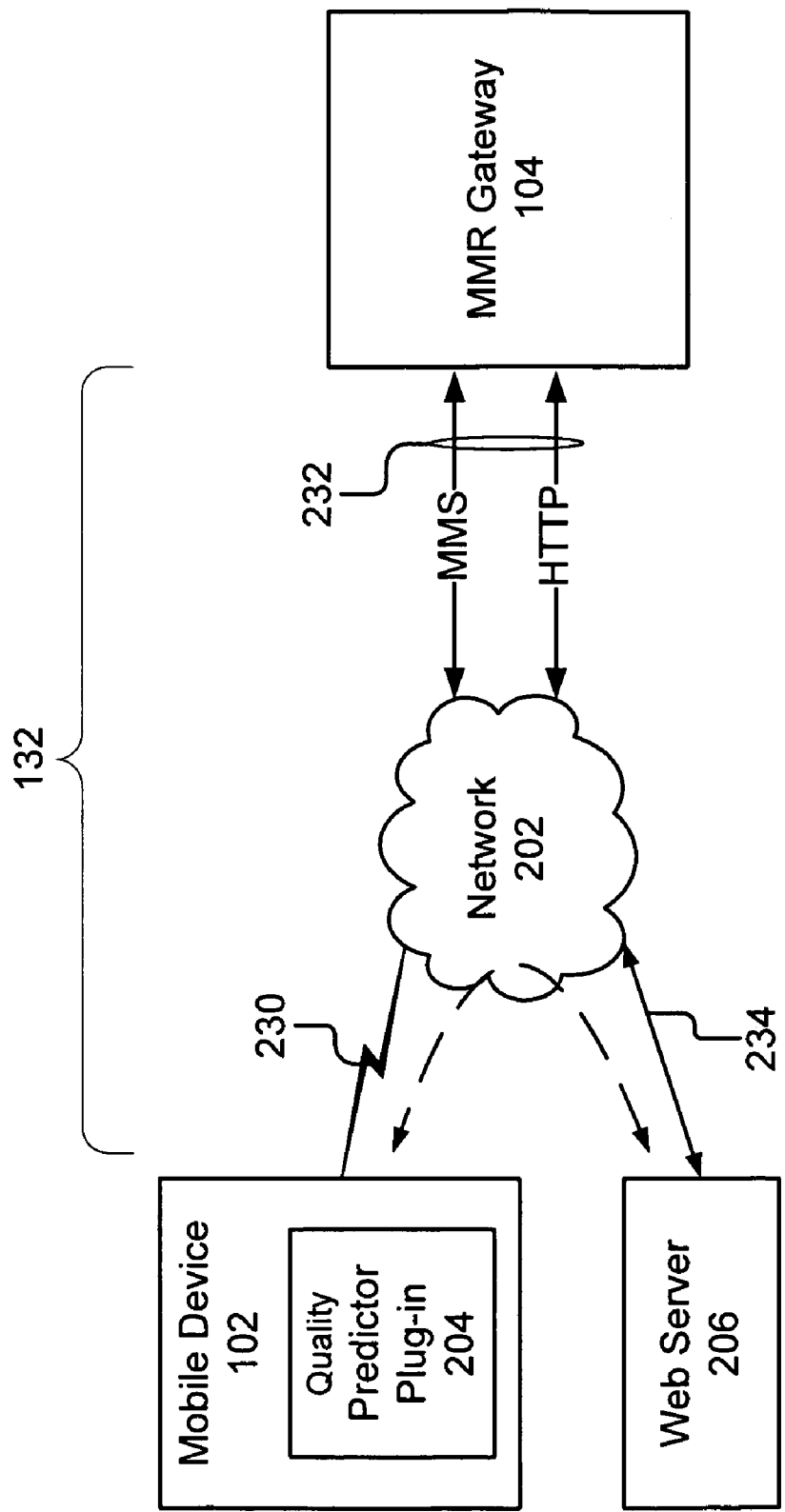
FIG. 2B is a block diagram of a second embodiment of a mobile device, network and MMR gateway configured in accordance with the present invention.

Referring now to FIGS. 2A and 2B, the first and second embodiment for the mobile device 102 will be described.

FIG. 2A shows a first embodiment of the coupling 132 between the mobile device 102 and the MMR gateway 104. In this embodiment, the mobile device 102 is any mobile phone (or other portable computing device with communication capability) that includes a camera. For example, the mobile device 102 may be a smart phone such as the Blackberry® manufactured and sold by Research In Motion. The mobile device 102 is adapted for wireless communication with the network 202 by a communication channel 230. The network 202 is a conventional type such as a cellular network maintained by wireless carrier and may include a server. In this embodiment, the mobile device 102 captures an image and sends the image to the network 202 over communications channel 230 such as by using a multimedia messaging service (MMS). The network 202 can also use the communication channel 230 to return results such as using MMS or using a short message service (SMS). As illustrated, the network 202 is in turn coupled to the MMR gateway 104 by signal lines 232. Signal lines 232 represent a channel for sending MMS or SMS messages as well as a channel for receiving hypertext transfer protocol (HTTP) requests and sending HTTP responses. Those skilled in the art will recognize that this is just one example of the coupling between the mobile device 102 and the MMR gateway 104. In an alternate embodiment for example, Bluetooth®, WiFi or any other wireless communication protocol may be used as part of communication coupling between the mobile device 102 and the MMR gateway 104. The mobile device 102 and the MMR gateway 104 could be coupled in any other ways understood by those skilled in the art (e.g., direct data connection, SMS, WAP, email) so long as the mobile device 102 is able to transmit images to the MMR gateway 104 and the MMR gateway 104 is able to respond by sending document identification, page number and location information.

Referring now to FIG. 2B, a second embodiment of the mobile device 102 is shown. In this second embodiment, the mobile device 102 is a smart phone such as the iPhone™ manufactured and sold by Apple Computer Inc. of Cupertino Calif. The second embodiment has a number of components similar to those of the first embodiment, and therefore, like reference numbers are used to reference like components with the same or similar functionality. Notable differences between the first embodiment and the second embodiment include a quality predictor plug-in 204 that is installed on the mobile device 102, and a Web server 206 coupled by signal line 234 to the network 202. The quality predictor plug-in 204 analyzes the images captured by the mobile device 102. The quality predictor plug-in 204 provides additional information produced by its analysis and includes that information as part of the retrieval request sent to the MMR gateway 104 to improve the accuracy of recognition. In an alternate embodiment, the output of the quality predictor plug-in 204 is used to select which images are transmitted from the mobile device 102 to the MMR gateway 104. For example, only those images that have a predicted quality above a predetermined threshold (e.g., images capable of being recognized) are transmitted from the mobile device 102 to the MMR gateway 104. Since transmission of images requires significant bandwidth and the communication channel 230 between the mobile device 102 and the network 202 may have limited bandwidth, using the quality predictor plug-in 204 to select which images to transmit is particularly advantageous. The second embodiment shown in FIG. 2B also illustrates how the results returned from the MMR gateway 104 or other information provided by the quality predictor plug-in 204 can be used by the mobile device 102 to access hotspot or augmented information available on a web server 206. In such a case, the results from the MMR gateway 104 or output of the quality predictor plug-in 204 would include information that can be used to access Web server 206 such as with a conventional HTTP request and using web access capabilities of the mobile device 102.

It should be noted that regardless of whether the first embodiment or the second embodiment of the mobile device 102 is used, the mobile device 102 generates the retrieval request that includes: a query image, a user or device ID, a command and other contact information such as device type, software, plug-ins, location (for example if the mobile device includes a GPS capability), device and status information (e.g., device model, macro lens on/off status, autofocus on/off, vibration on/off, tilt angle, etc), context-related information (weather at the phone's location, time, date, applications currently running on the phone), user-related information (e.g., id number, preferences, user subscriptions, user groups and social structures, action and action-related meta data such as email actions and emails waiting to be sent), etc.

Referring now to FIGS. 2C-2H, various embodiments are shown of a plug-in (client 250) for the mobile device 102, the MMR gateway 104 and MMR matching unit 106 represented generally as including a server 252 that has various possible configurations in accordance with the present invention. More particularly, FIGS. 2C-2H illustrate how the components of the plug-in or client 250 can have varying levels of functionality and the server 252 can also have varying levels of functionality that parallel or match with the functionality of the client 250. In the various embodiments of FIGS. 2C-2H, either the client 250 or the server 252 includes: an MMR database 254; a capture module 260 for capturing an image or video; a preprocessing module 262 for processing the image before feature extraction for improved recognition such as quality prediction; a feature extraction module 264 for extracting image features; a retrieval module 266 for using features to retrieve information from the MMR database 254; a send message module 268 for sending messages from the server 252 to the client 250; an action module 270 for performing an action; a preprocessing and prediction module 272 for processing the image prior to feature extraction; a feedback module 274 for presenting information to the user and receiving input; a sending module 276 for sending information from the client 250 to the server 252; and a streaming module 278 for streaming video from the client 250 to the server 252.

Figure 2C:
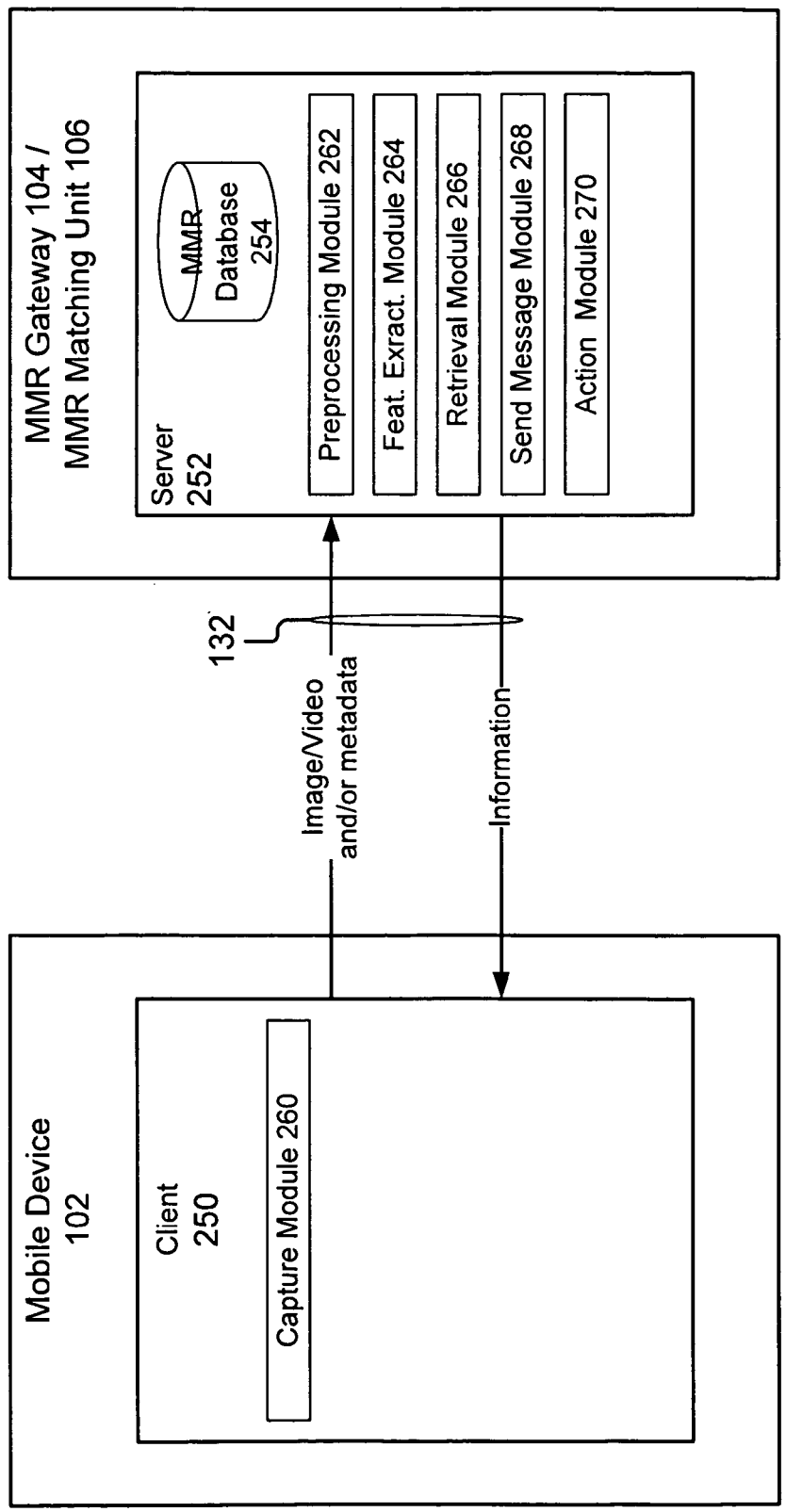
FIGS. 2C-2H are block diagrams of various embodiments of a mobile device plug-in, MMR gateway and MMR matching unit showing various possible configurations in accordance with the present invention.

FIG. 2C illustrates one embodiment for the client 250 and the server 252 in which the client 250 sends an image or video and/or metadata to the server 252 for processing. In this embodiment, the client 250 includes the capture module 260. The server 252 includes: the MMR database 254, the preprocessing module 262, the feature extraction module 264, the retrieval module 266, the send message module 268 and the action module 270.

Figure 2D:
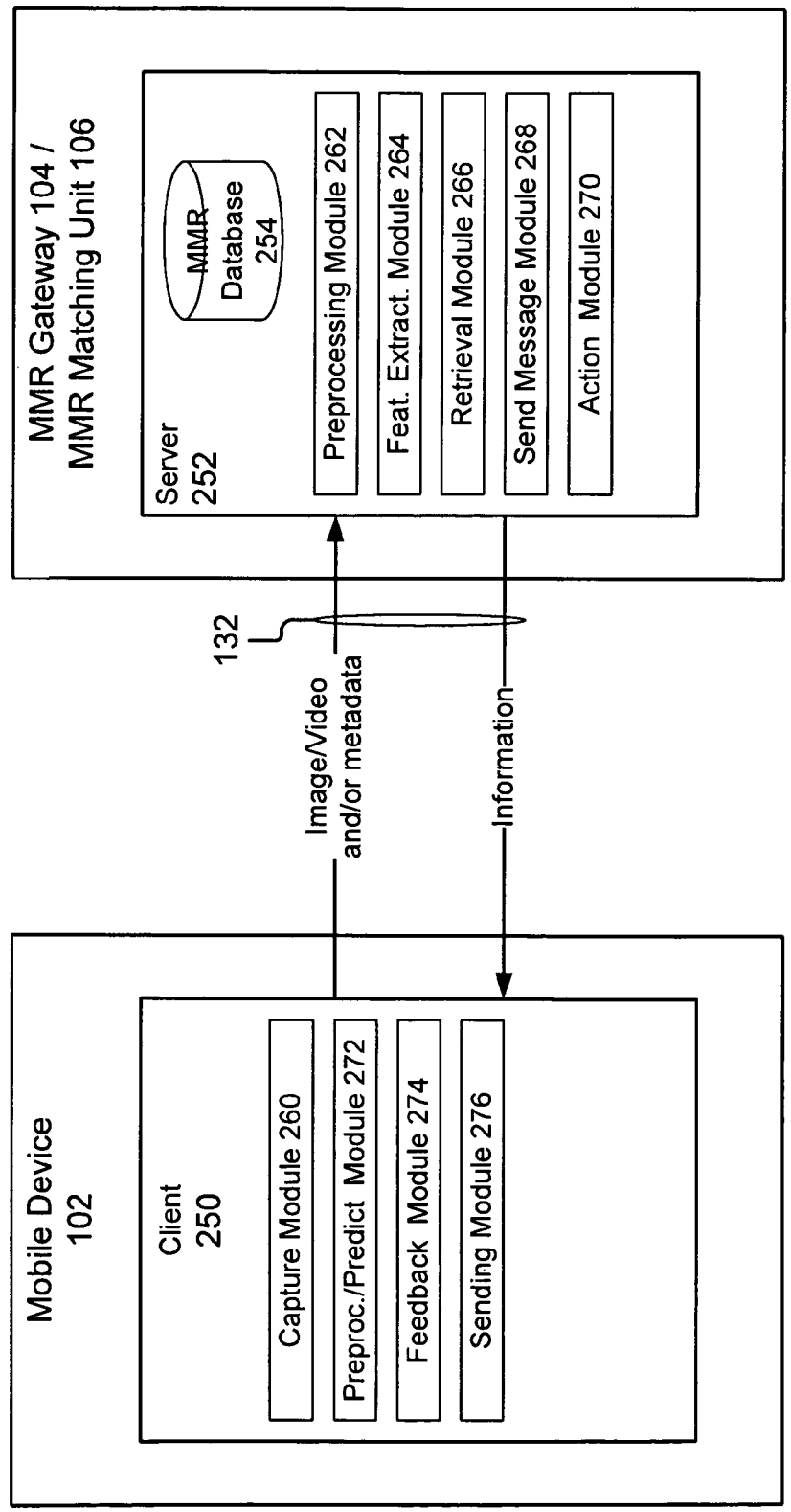

FIG. 2D illustrates another embodiment for the client 250 and the server 252 in which the client 250 captures an image or video, runs quality prediction, and sends an image or video and/or metadata to the server 252 for processing. In this embodiment, the client 250 includes: the capture module 260, the preprocessing and prediction module 272, the feedback module 274 and the sending module 276. The server 252 includes: the MMR database 254, the preprocessing module 262, the feature extraction module 264, the retrieval module 266, the send message module 268 and the action module 270. It should be noted that in this embodiment the image sent to the server 252 may be different than the captured image. For example, it may be digitally enhanced, sharpened, or may be just binary data.

Figure 2E:
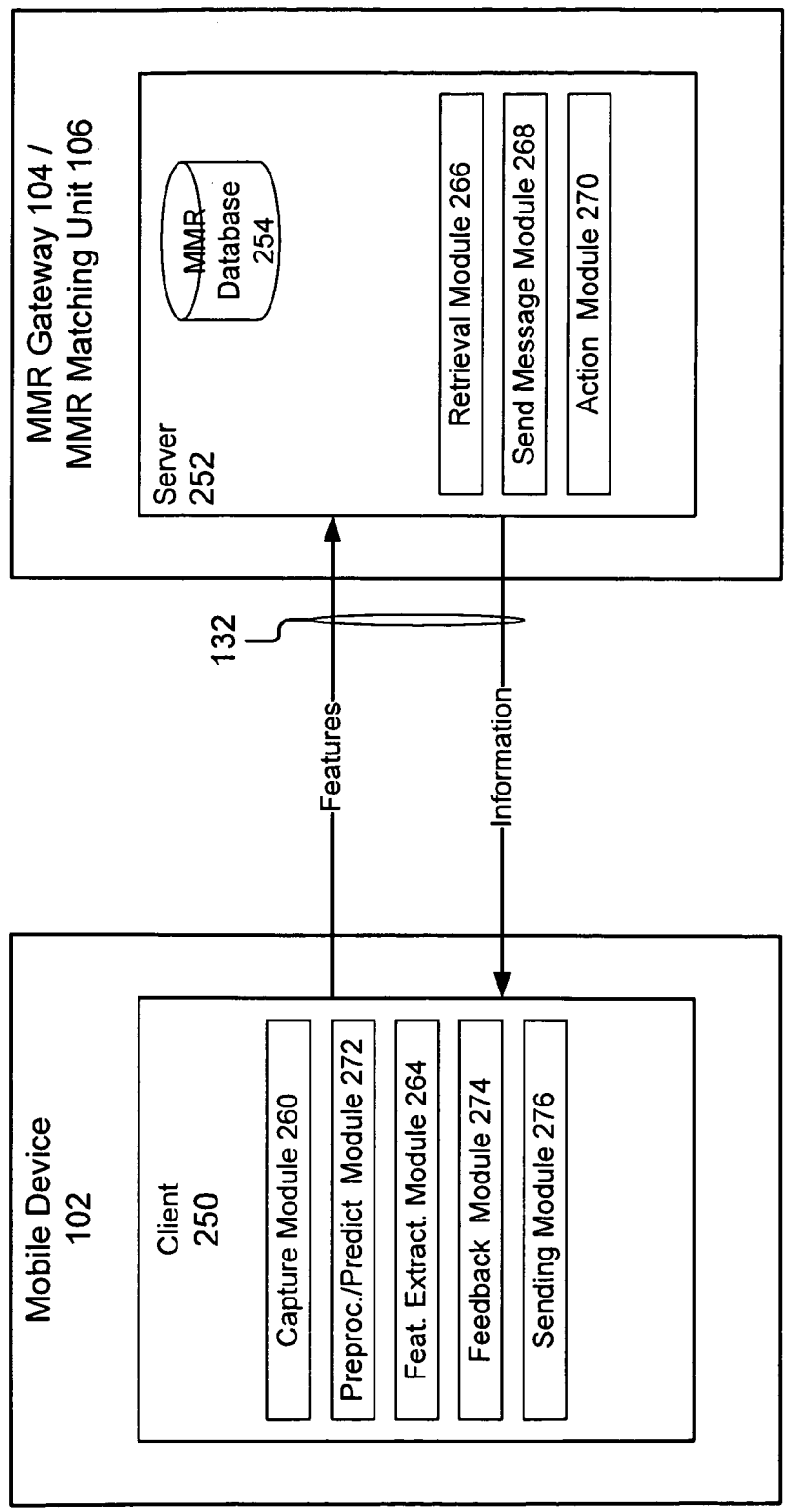

FIG. 2E illustrates another embodiment for the client 250 and the server 252 in which the client 250 captures an image or video, performs feature extraction and sends image features to the server 252 for processing. In this embodiment, the client 250 includes: the capture module 260, the feature extraction module 264, the preprocessing and prediction module 272, the feedback module 274 and the sending module 276. The server 252 includes: the MMR database 254, the retrieval module 266, the send message module 268 and the action module 270. It should be noted that in this embodiment feature extraction may include preprocessing. After features are extracted, the preprocessing and prediction module 272 may run on these features and if the quality of the features is not satisfactory, the user may be asked to capture another image.

Figure 2F:
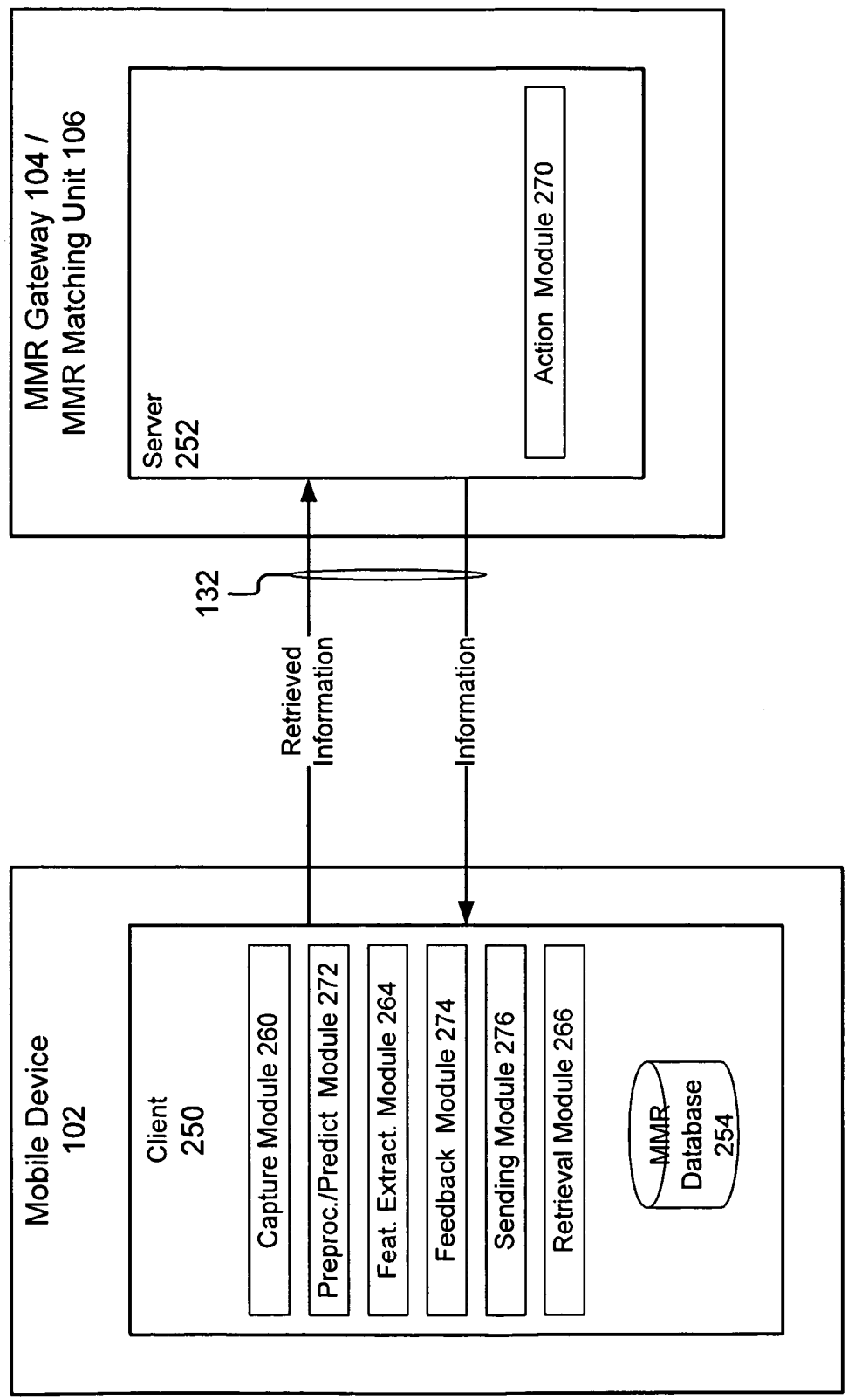

FIG. 2F illustrates another embodiment for the client 250 and the server 252 in which the entire retrieval process is performed at the client 250. In this embodiment, the client 250 includes: the capture module 260, the feature extraction module 264, the preprocessing and prediction module 272, the feedback module 274 and the sending module 276, the MMR database 254, and the retrieval module 266. The server 252 need only have the action module 270.

Figure 2G:
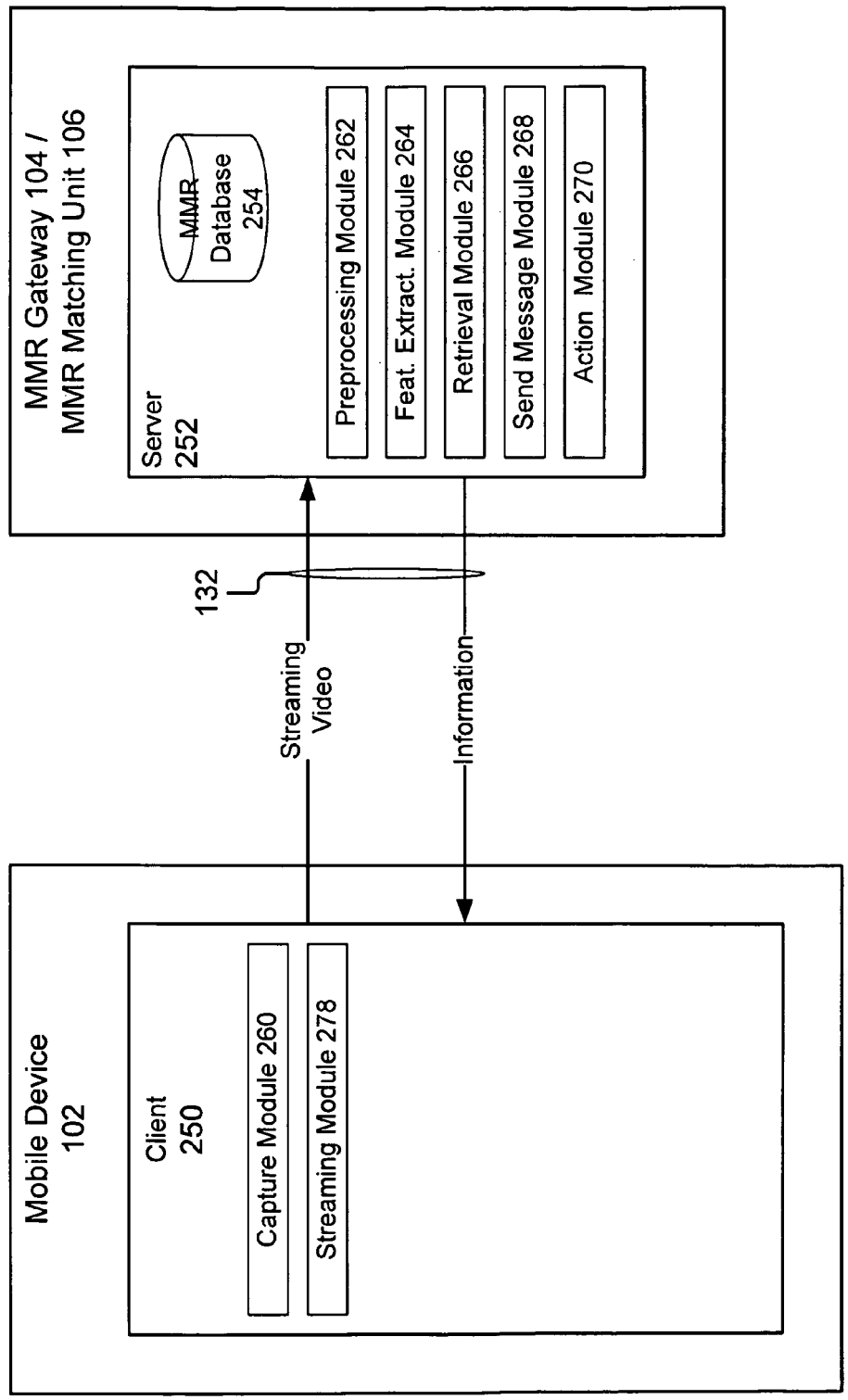

FIG. 2G illustrates another embodiment for the client 250 and the server 252 in which the client 250 streams video to the server 252. In this embodiment, the client 250 includes the capture module 260 and a streaming module 278. The server 252 includes the MMR database 254, the preprocessing module 262, the feature extraction module 264, the retrieval module 266, the send message module 268 and the action module 270. Although not shown, the client 250 can run a predictor in the captured video stream and provide user feedback on where to point the camera or how to capture better video for retrieval. In a modification of this embodiment, the server 252 streams back information related to the captured video and the client 250 can overlay that information on a video preview screen.

Figure 2H:
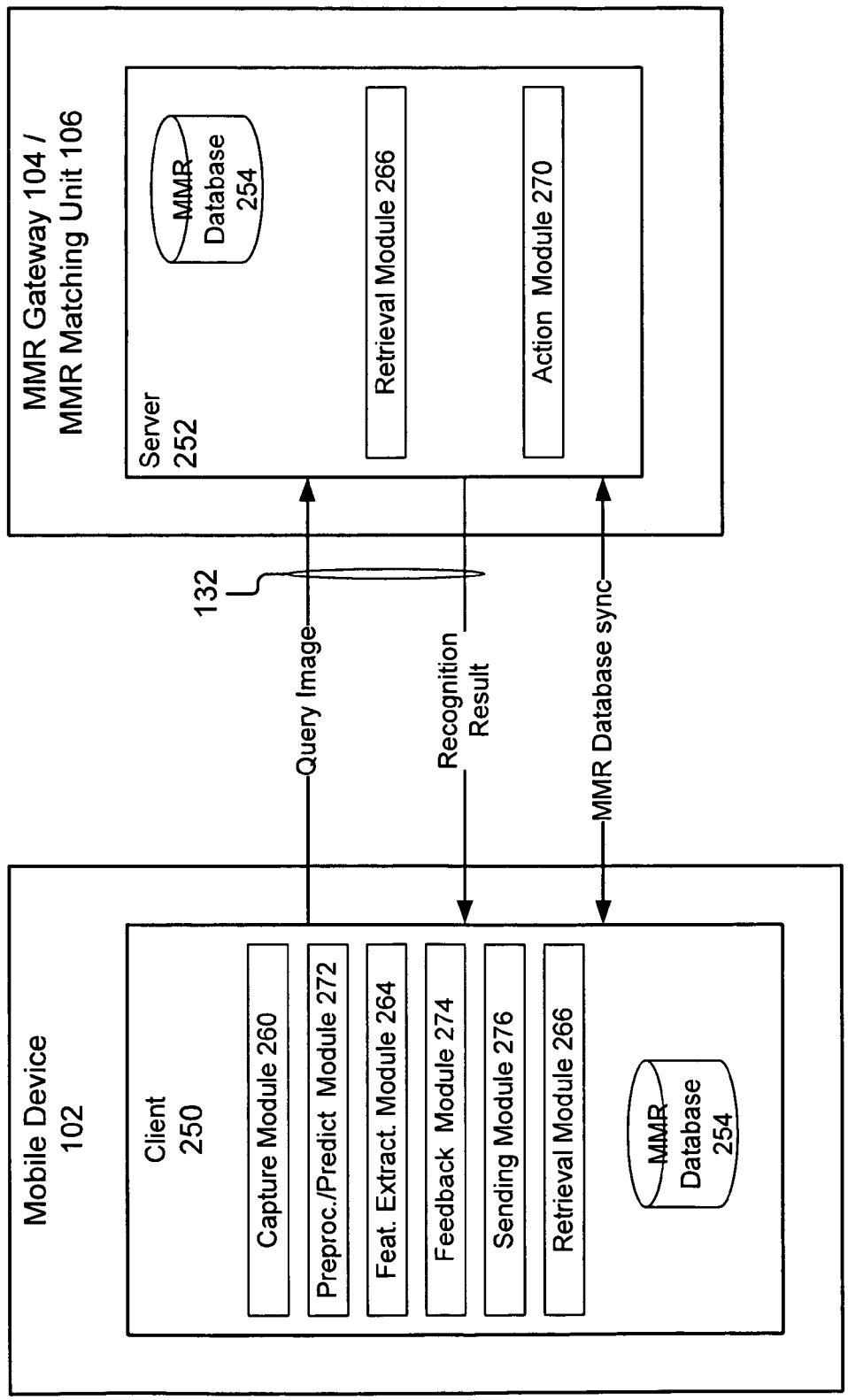

FIG. 2H illustrates another embodiment for the client 250 and the server 252 in which the client 250 runs a recognizer and the server 252 streams MMR database information to a local database operable with the client 250 based upon a first recognition result. This embodiment is similar to that described above with reference to FIG. 2F. For example, the entire retrieval process for one recognition algorithm is run at the client 250. If the recognition algorithm fails, the query is handed to the server 252 for running more complex retrieval algorithm. In this embodiment, the client 250 includes: the capture module 260, the feature extraction module 264, the preprocessing and prediction module 272, the feedback module 274, the sending module 276, the MMR database 254 (a local version), and the retrieval module 266. The server 252 includes another retrieval module 266, the action module 270 and the MMR database 254 (a complete and more complex version). In one embodiment, if the query image cannot be recognized with the local MMR database 254, the client 250 sends an image for retrieval to the server 252 and that initiates an update of the local MMR database 254. Alternatively, the client 250 may contain an updated version of a database for one recognizer, but if the query image cannot be retrieved from the local MMR database 254, then a database for another retrieval algorithm may be streamed to the local MMR database 254.

MMR Gateway 104

Figure 3:
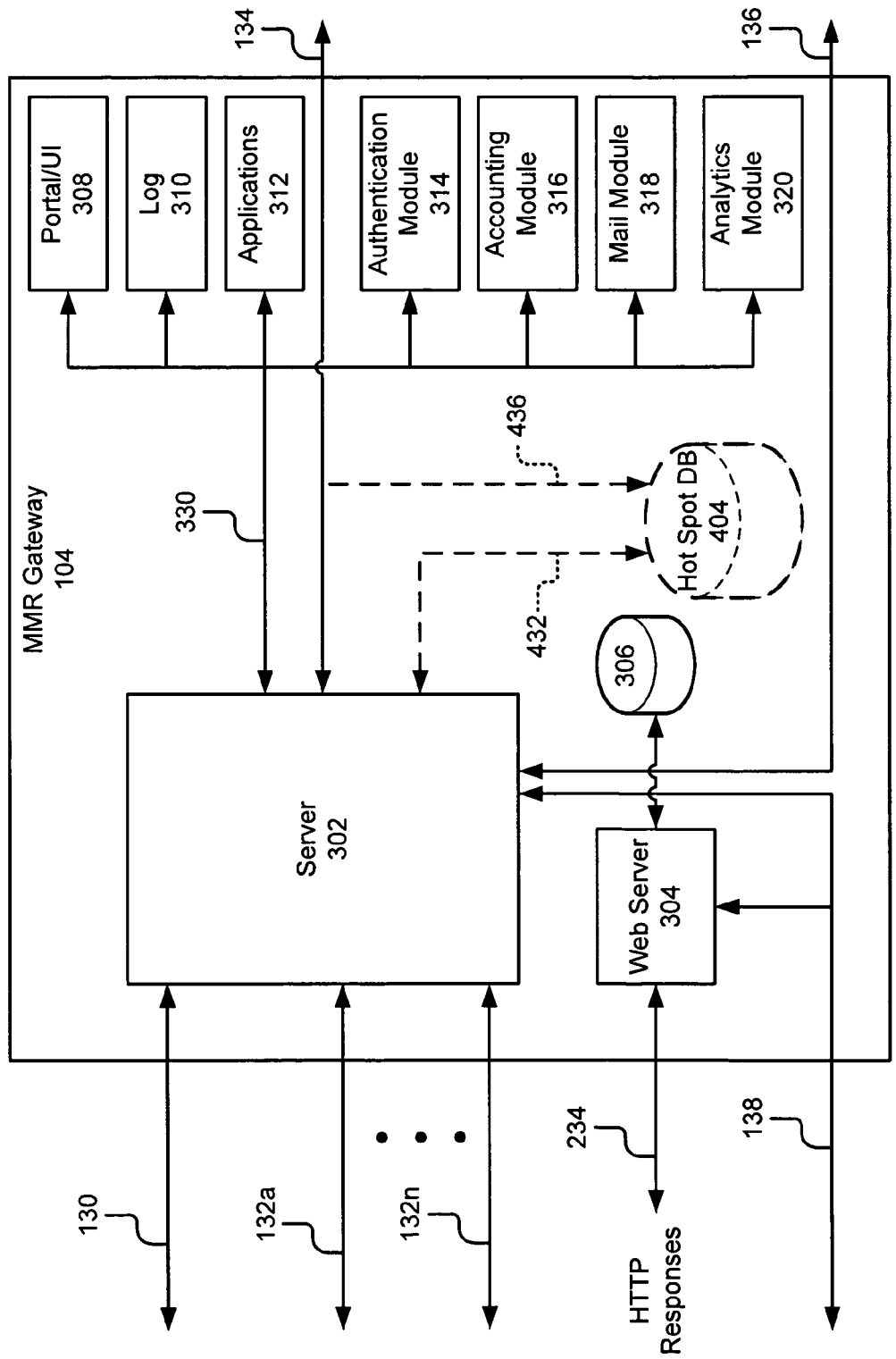
FIG. 3 is a block diagram of an embodiment of an MMR gateway in accordance with the present invention.

Referring now to FIG. 3, one embodiment of the MMR gateway 104 is shown. This embodiment of the MMR gateway 104 comprises a server 302, a Web server 304, a data store 306, a portal module 308, a log 310, one or more applications 312, an authentication module 314, an accounting module 316, a mail module 318 and an analytics module 320.

As noted above, one of the primary functions of the MMR gateway 104 is to communicate with many mobile devices 102 to receive retrieval requests and send responses including a status indicator (true=recognized/false=not recognized), a page identification number, a location on the page and other information such as hotspot data. A single MMR gateway 104 can respond to hundreds or millions of retrieval requests. For convenience and ease of understanding only a single MMR gateway 104 is shown in FIGS. 1 and 3, however, those skilled in the art will recognize that in other embodiments any number of MMR gateways 104 may be utilized to service the needs of a multitude of mobile devices 102. More particularly, the server 302 of the MMR gateway 104 is coupled to signal lines 132 for communication with various mobile devices 102. The server 302 receives retrieval requests from the mobile devices 102 via signal lines 132 and sends responses back to the mobile devices 102 using the same signal lines 132. In one embodiment, the retrieval request includes: a command, a user identification number, an image and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt and jitter.

The server 302 is also coupled to signal line 130 for communication with the computer 110. Again, for convenience and ease of understanding only a single computer 110 and signal line 130 are shown in FIGS. 1A, 1B, and 3, but any number of computing devices may be adapted for communication with the server 302. The server 302 facilitates communication between the computer 110 and the portal module 308, the log module 310 and the applications 312. The server 302 is coupled to the portal module 308, the log module 310 and the applications 312 by signal line 330. As will be described in more detail below, the modules cooperate with the server 302 to present a web portal that provides a user experience for exchanging information. The Web portal 308 can also be used for system monitoring, maintenance and administration.

The server 302 processes the retrieval request and generates an image query and recognition parameters that are sent via signal line 134 to the MMR matching unit 106 for recognition. The server 302 also receives recognition responses from the MMR matching unit 106 via signal line 134. The server 302 also processes the retrieval request and sends information via signal line 330 to the other components of the MMR gateway 104 as will be described below. The server 302 is also adapted for communication with the MMR publisher 108 by signal line 138 and the MMR matching unit 106 via signal line 136. The signal line 138 provides a path for the MMR publisher 108 to send Web content for hotspots to the Web server 304 and to provide other information to the server 302. In one embodiment, the server 302 receives information from the MMR publisher 108 and sends that information via signal line 136 for registration with the MMR matching unit 106.

The web server 304 is a conventional type and is responsible for accepting requests from clients and sending responses along with data contents, such as web pages, documents and linked objects (images, etc.) The Web server 304 is coupled to data store 306 such as a conventional database. The Web server 304 is adapted for communication via signal line 234 to receive HTTP requests from any communication device across a network such as the Internet. The Web server 304 is also coupled to signal line 138 as described above to receive Web content associated with hotspots for storage in the data store 306 and then for later retrieval and transmission in response to HTTP requests. Those skilled in the art will understand that inclusion of the Web server 304 and data store 306 as part of the MMR gateway 104 is merely one embodiment and that the Web server 304 and the data store 306 may be operational in any number of alternate locations or configuration so long as the Web server 304 is accessible to mobile devices 102 and computers 110 via the Internet.

In one embodiment, the portal module 308 is software or routines operational on the server 302 for creation and presentation of the Web portal. The portal module 308 is coupled to signal line 330 for communication with the server 302. In one embodiment, the web portal provides an access point for functionality including administration and maintenance of other components of the MMR gateway 104. In another embodiment, the web portal provides an area where users can share experiences related to MMR documents. In yet another embodiment, the web portal is an area where users can access business applications and the log 310 of usage.

The log 310 is a memory or storage area for storing a list of the retrieval requests received by the server 302 from mobile devices 102 and all corresponding responses sent by the server 302 to the mobile devices. In another embodiment, the log 310 also stores a list of the image queries generated and sent to the MMR matching unit 106 and the recognition responses received from the MMR matching unit 106. The log 310 is coupled to signal line 330 for access by the server 302.

The one or more business applications 312 are software and routines for providing functionality related to the processing of MMR documents. In one embodiment the one or more business applications 312 are executable on the server 302. The business applications 312 can be any one of a variety of types of business applications adapted to utilize information related to the processing of retrieval quests and delivery of recognition responses such as but not limited to accounting, groupware, customer relationship management, human resources, outsourcing, loan origination, customer care, service relationships, etc.

The authentication module 314 is software and routines for maintaining a list of authorized users and granting access to the MMR system 110. In one embodiment, the authentication module 314 maintains a list of user IDs and passwords corresponding to individuals who have created an account in the system 100, and therefore, are authorized to use MMR gateway 104 and the MMR matching unit 106 to process retrieval requests. The authentication module 314 is communicatively coupled by signal line 330 to the server 302. But as the server 302 receives retrieval requests they can be processed and compared against information in the authentication module 314 before generating and sending the corresponding image query on signal line 134. In one embodiment, the authentication module 314 also generates messages for the server 302 to return to the mobile device 102 instances when the mobile device is not authorized, the mobile device has not established an account, or the account for the mobile device 102 is locked such as due to abuse or lack of payment.

The accounting module 316 is software and routines for performing accounting related to user accounts and use of the MMR system 100. In one embodiment, the retrieval services are provided under a variety of different economic models such as but not limited to use of the MMR system 100 under a subscription model, a charge per retrieval request model or various other pricing models. In one embodiment, the MMR system 100 provides a variety of different pricing models and is similar to those currently offered for cell phones and data networks. The accounting module 316 is coupled to the server 302 by signal line 330 to receive an indication of any retrieval request received by the server 302. In one embodiment, the accounting module 316 maintains a record of transactions (retrieval request/recognition responses) processed by the server 302 for each mobile device 102. Although not shown, the accounting module 316 can be coupled to a traditional billing system for the generation of an electronic or paper bill.

The mail module 318 is software and routines for generating e-mail and other types of communication. The mail module 318 is coupled by signal at 330 to the server 302. In one embodiment, the mobile device 102 can issue retrieval requests that include a command to deliver a document or a portion of a document or other information via e-mail, facsimile or other traditional electronic communication means. The mail module 318 is adapted to generate and send such information from the MMR gateway 104 to an addressee as prescribed by the user. In one embodiment, each user profile has associated addressees which are potential recipients of information retrieved.

The analytics module 320 is software and routines for measuring the behavior of users of the MMR system 100 according to one embodiment. The analytics module 320 is also software and routines for measuring the effectiveness and accuracy of feature extractors and recognition performed by the MMR matching unit 106. The analytics module 320 measures use of the MMR system 100 including which images are most frequently included as part of retrieval requests, which hotspot data is most often accessed, the order in which images are retrieved, the first image in the retrieval process, and other key performance indicators used to improve the MMR experience and/or a marketing campaign's audience response. In one embodiment, the analytics module 320 measures metrics of the MMR system 100 and analyzes the metrics used to measure the effectiveness of hotspots and hotspot data. The analytics module 320 is coupled to the server 302, the authentication module 314 and the accounting module 316 by signal line 330. The analytics module 320 is also coupled by the server 302 to signal line 134 and thus can access the components of the MMR matching unit 106 to retrieve recognition parameters, images features, quality recognition scores and any other information generated or used by the MMR matching unit 106. The analytics module 320 can also perform a variety of data retrieval and segmentation based upon parameters or criteria of users, mobile devices 102, page IDs, locations, etc.

In one embodiment, the MMR gateway 104 also includes a hotspot database 404. The hotspot database 404 is shown in FIG. 3 with dashed lines to reflect that inclusion in the MMR gateway 104 is an alternate embodiment. The hotspot database 404 is coupled by signal line 436 to receive the recognition responses via line 134. The hotspot database 404 uses these recognition responses to query the database and output via line 432 the hotspot content, e.g., such as advertisements, corresponding to the recognition responses. This hotspot content is sent to the server 302 so that it can be included with the recognition responses and sent to the requesting mobile device 102.

MMR Matching Unit 106

Figure 4A:
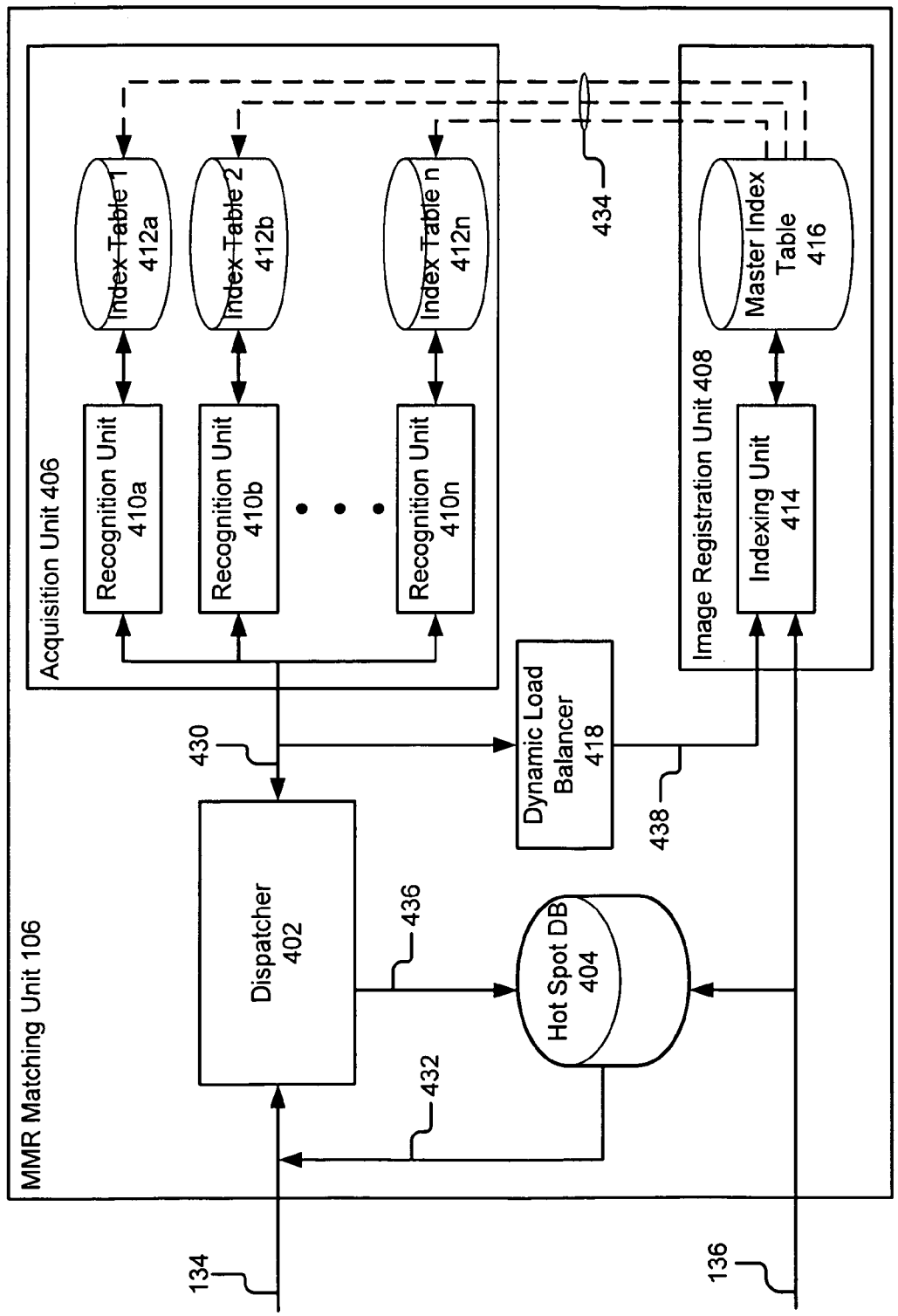
FIG. 4A is a block diagram of a first embodiment of a MMR matching unit in accordance with the present invention.
Figure 4B:
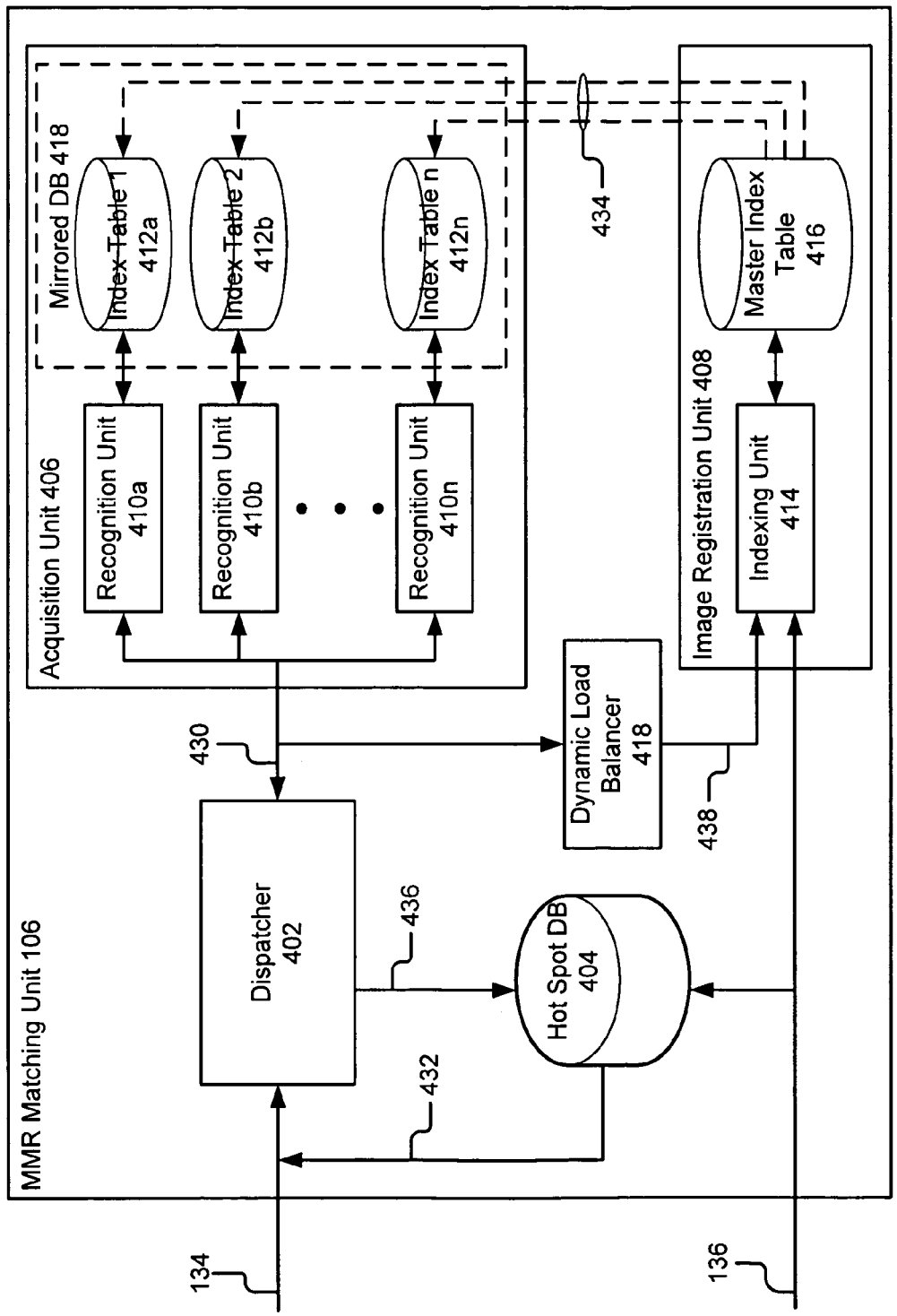
FIG. 4B is a block diagram of a second embodiment of the MMR matching unit in accordance with the present invention.

Referring now to FIGS. 4A and 4B, two embodiments for the MMR matching unit 106 will be described. The basic function of the MMR matching unit 106 is to receive an image query, send the image query for recognition, perform recognition on the images in the image query, retrieve hotspot information, combine the recognition result with hotspot information and send it back to the MMR gateway 104.

FIG. 4A illustrates a first embodiment of the MMR matching unit 106. The first embodiment of the MMR matching unit 106 comprises a dispatcher 402, a hotspot database 404, an acquisition unit 406, an image registration unit 408, and a dynamic load balancer 418. The acquisition unit 406 further comprises a plurality of the recognition units 410a-410n and a plurality of index tables 412a-412n. The image registration unit 408 further comprises an indexing unit 414 and a master index table 416.

The dispatcher 402 is coupled to signal line 134 for receiving an image query from and sending recognition results to the MMR gateway 104. The dispatcher 402 is responsible for assigning and sending an image query to respective recognition units 410a-410n. In one embodiment, the dispatcher 402 receives an image query, generates a recognition unit identification number and sends the recognition unit identification number and the image query to the acquisition unit 406 for further processing. The dispatcher 402 is coupled to signal line 430 to send the recognition unit identification number and the image query to the recognition units 410a-410n. The dispatcher 402 also receives the recognition results from the acquisition unit 406 via signal line 430. The dispatcher 402 also retrieves hotspot content from hotspot database 404 corresponding to the recognition results. One embodiment for the dispatcher 402 will be described in more detail below with reference to FIG. 5.

An alternate embodiment for the hotspot database 404 has been described above with reference to FIG. 3 where the hotspot database is part of the MMR gateway 104. However, the preferred embodiment for the hotspot database 404 is part of the MMR matching unit 106 as shown in FIG. 4A. Regardless of the embodiment, the hotspot database 404 has a similar functionality. The hotspot database 404 is used to store hotspot information, such as links, link preference information, and neighbor preference information for pages and documents. Once an image query has been recognized and recognition results are produced, these recognition results are used as part of a query of the hotspot database 404 to retrieve hotspot information associated with the recognition results. The retrieved hotspot information is then output on signal line 134 to the MMR gateway 104 for packaging and delivery to the mobile device 102. As shown in FIG. 4A, the hotspot database 404 is coupled to the dispatcher 402 by signal line 436 to receive queries including recognition results. The hotspot database 404 is also coupled by signal line 432 and signal line 134 to the MMR gateway 104 for delivery of query results. The hotspot database 404 is also coupled to signal line 136 to receive new hotspot information for storage from the MMR publisher 108.

Referring again to FIG. 4A, the acquisition unit 406 comprises the plurality of the recognition units 410a-410n and a plurality of index tables 412a-412n. Each of the recognition units 410a-410n has and is coupled to a corresponding index table 412a-412n. In one embodiment, each recognition unit 410/index table 412 pair is on the same server. The dispatcher 402 sends the image query to one or more recognition units 410a-410n. In one embodiment that includes redundancy, the image query is sent from the dispatcher 402 to a plurality of recognition units 410 for recognition and retrieval and the index tables 412a-n index the same data. In the serial embodiment, the image query is sent from the dispatcher 402 to a first recognition unit 410a. If recognition is not successful on the first recognition unit 410a, the image query is passed on to a second recognition unit 410b, and so on. In yet another embodiment, the dispatcher 402 performs some preliminary analysis of the image query and then selects a recognition unit 410a-410n best adapted and most likely to be successful at recognizing the image query. In another embodiment, one or more of the recognition unit 410 index table 412 pairs include a segmented page index, which includes a segmented version of ever object in the master index table 416, wherein the segmentation defines polygon-shaped zones on a page.

Those skilled in the art will understand that there are a variety of configurations for the plurality of recognition units 410a-410n and the plurality of index tables 412a-412n. Example embodiments for the acquisition unit 406 will be described in more detail below with reference to FIGS. 6A and 6B. It should be understood that the index tables 412a-412n can be updated at various times as depicted by the dashed lines 434 from the master index table 416.

The image registration unit 408 comprises the indexing unit 414 and the master index table 416. The image registration unit 408 has an input coupled to signal on 136 to receive updated information from the MMR publisher 108 and broker 112 and an input coupled to signal line 438 to receive updated information from the dynamic load balancer 418. The image registration unit 408 is responsible for maintaining the master index table 416 and migrating all or portions of the master index table 416 to the index tables 412a-412n (slave tables) of the acquisition unit 406. In one embodiment, the indexing unit 414 receives images, unique page IDs, and other information, and converts it into index table information that is stored in the master index table 416. The indexing unit 414 also cooperates with the MMR publisher 108 to maintain a unique page identification numbering system that is consistent across image pages generated by the MMR publisher 108, the image pages stored in the master index table 416, and the page numbers used in referencing data in the hotspot database 404.

One embodiment for the image registration unit 408 is shown and described in more detail below with reference to FIG. 7.

The dynamic load balancer 418 has an input coupled to signal line 430 to receive the query image from the dispatcher 402 and the corresponding recognition results from the acquisition unit 406. The output of the dynamic load balancer 418 is coupled by signal line 438 to an input of the image registration unit 408. The dynamic load balancer 418 provides input to the image registration unit 408 that is used to dynamically adjust the index tables 412a-412n of the acquisition unit 406. In particular, the dynamic load balancer 418 monitors and evaluates the image queries that are sent from the dispatcher 402 to the acquisition unit 406 for a given period of time. Based on the usage, the dynamic load balancer 418 provides input to adjust the index tables 412a-412n. For example, the dynamic load balancer 418 may measure the image queries for a day. Based on the measured usage for that day, the index tables are modified and configured in the acquisition unit 406 to match the usage measured by the dynamic load balancer 418.

FIG. 4B illustrates a second embodiment of the MMR matching unit 106. In the second embodiment, many of the components of the MMR matching unit 106 have the same or a similar function to corresponding elements of the first embodiment. Thus, like reference numbers have been used to refer to like components with the same or similar functionality. The second embodiment of the MMR matching unit 106 includes the dispatcher 402, the hotspot database 404, and the dynamic load balancer 418 similar to the first embodiment of the MMR matching unit 106. However, the acquisition unit 406 and the image registration unit 408 are different than that described above with reference to FIG. 4A. In particular, the acquisition unit 406 and the image registration unit 408 utilize a shared SQL database for the index tables and the master table. More specifically, there is the master index table 416 and a mirrored database 418 that includes the local index tables 412a-n. Moreover, a conventional functionality of SQL database replication is used to generate the mirror images of the master index table 416 stored in the index tables 412a-n for use in recognition. The image registration unit 408 is configured so that when new images are added to the master index table 416 they are immediately available to all the recognition units 410. This is done by mirroring the master index table 416 across all the local index tables 412a-n using large RAM (not shown) and database mirroring technology. Dispatcher 402

Figure 5:
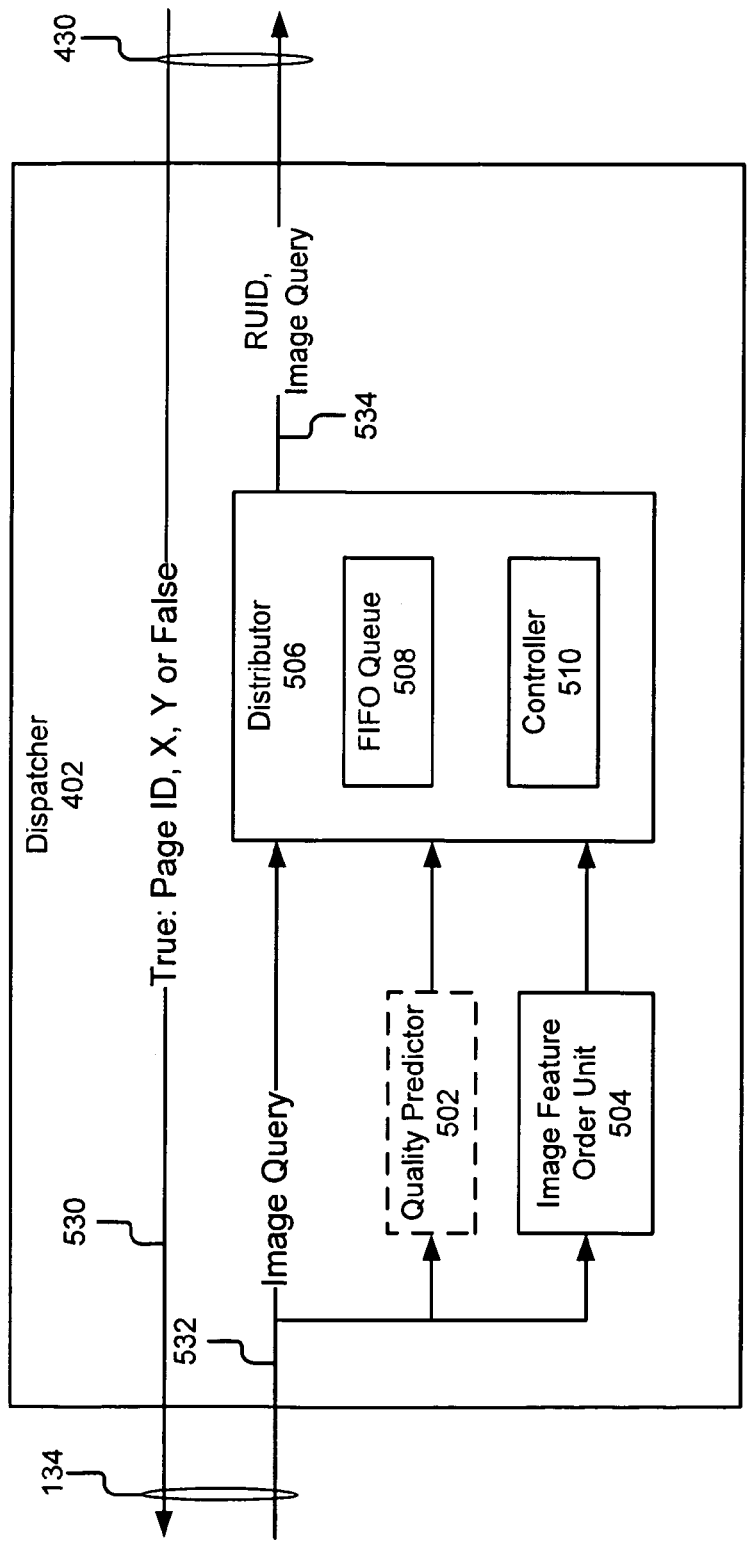
FIG. 5 is a block diagram of an embodiment of a dispatcher in accordance with the present invention.

Referring now to FIG. 5, an embodiment of the dispatcher 402 shown. The dispatcher 402 comprises a quality predictor 502, an image feature order unit 504, and a distributor 506. The quality predictor 502, the image feature order unit 504, and the distributor 506 are coupled to signal line 532 to receive image queries from the MMR gateway 104. The distributor 506 is also coupled to receive the output of the quality predictor 502 and the image feature order unit 504. The distributor 506 includes a FIFO queue 508 and a controller 510. The distributor 506 generates an output on signal line 534 that includes the image query and a recognition unit identification number (RUID). Those skilled in the art will understand that in other embodiments the image query may be directed to any particular recognition unit using a variety of means other than the RUID. As image queries are received on the signal line 532, the distributor 506 receives the image queries and places them in the order in which they are received into the FIFO queue 508. The controller 510 receives a recognizability score for each image query from the quality predictor 502 and also receives an ordering signal from the image feature order unit 504. Using this information from the quality predictor 502 and the image feature order unit 504, the controller 510 selects image queries from the FIFO queue 508, assigns them to particular recognition units 410 and sends the image query to the assigned recognition unit 410 for processing. The controller 510 maintains a list of image queries assigned to each recognition unit 410 and the expected time to completion for each image (as predicted by the image feature order unit 504). The total expected time to empty the queue for each recognition unit 410 is the sum of the expected times for the images assigned to it. The controller 510 can execute several queue management strategies. In a simple assignment strategy, image queries are removed from the FIFO queue 508 in the order they arrived and assigned to the first available recognition unit 410. In a balanced response strategy, the total expected response time to each query is maintained at a uniform level and query images are removed from the FIFO queue 508 in the order they arrived, and assigned to the FIFO queue 508 for a recognition unit so that its total expected response time is as close as possible to the other recognition units. In an easy-first strategy, images are removed from the FIFO queue 508 in an order determined by their expected completion times—images with the smallest expected completion times are assigned to the first available recognition unit. In this way, users are rewarded with faster response time when they submit an image that's easy to recognize. This could incentivize users to carefully select the images they submit. Other queue management strategies are possible.

The dispatcher 402 also receives the recognition results from the recognition units 410 on signal line 530. The recognition results include a Boolean value (true/false) and if true, a page ID and a location on the page. In one embodiment, the dispatcher 402 merely receives and retransmits the data to the MMR gateway 104.

Referring again to FIG. 5, the quality predictor 502 receives image queries and generates a recognizability score used by the dispatcher 402 to route the image query to one of the plurality of recognition units 410. In one embodiment, the quality predictor 502 also receives as inputs context information and device parameters. In one embodiment, the recognizability score includes information specifying the type of recognition algorithm most likely to produce a valid recognition result.

The image feature order unit 504 receives image queries and outputs an ordering signal. The image feature order unit 504 analyzes an input image query and predicts the time required to recognize an image by analyzing the image features it contains. The difference between the actual recognition time and the predicted time is used to adjust future predictions thereby improving accuracy. In the simplest of embodiments, simple images with few features are assigned to lightly loaded recognition units 410 so that they will be recognized quickly and the user will see the answer immediately. In one embodiment, the features used by the image order feature unit 504 to predict the time are different than the features used by recognition units 410 for actual recognition. For example, the number of corners detected in an image is used to predict the time required to analyze the image. The feature set used for prediction need only be correlated with the actual recognition time. In one embodiment, several different features sets are used and the correlations to recognition time measured over some period. Eventually, the feature set that is the best predictor and lowest cost (most efficient) would be determined and the other feature sets could be discarded.

Acquisition Unit 406

Figure 6A:
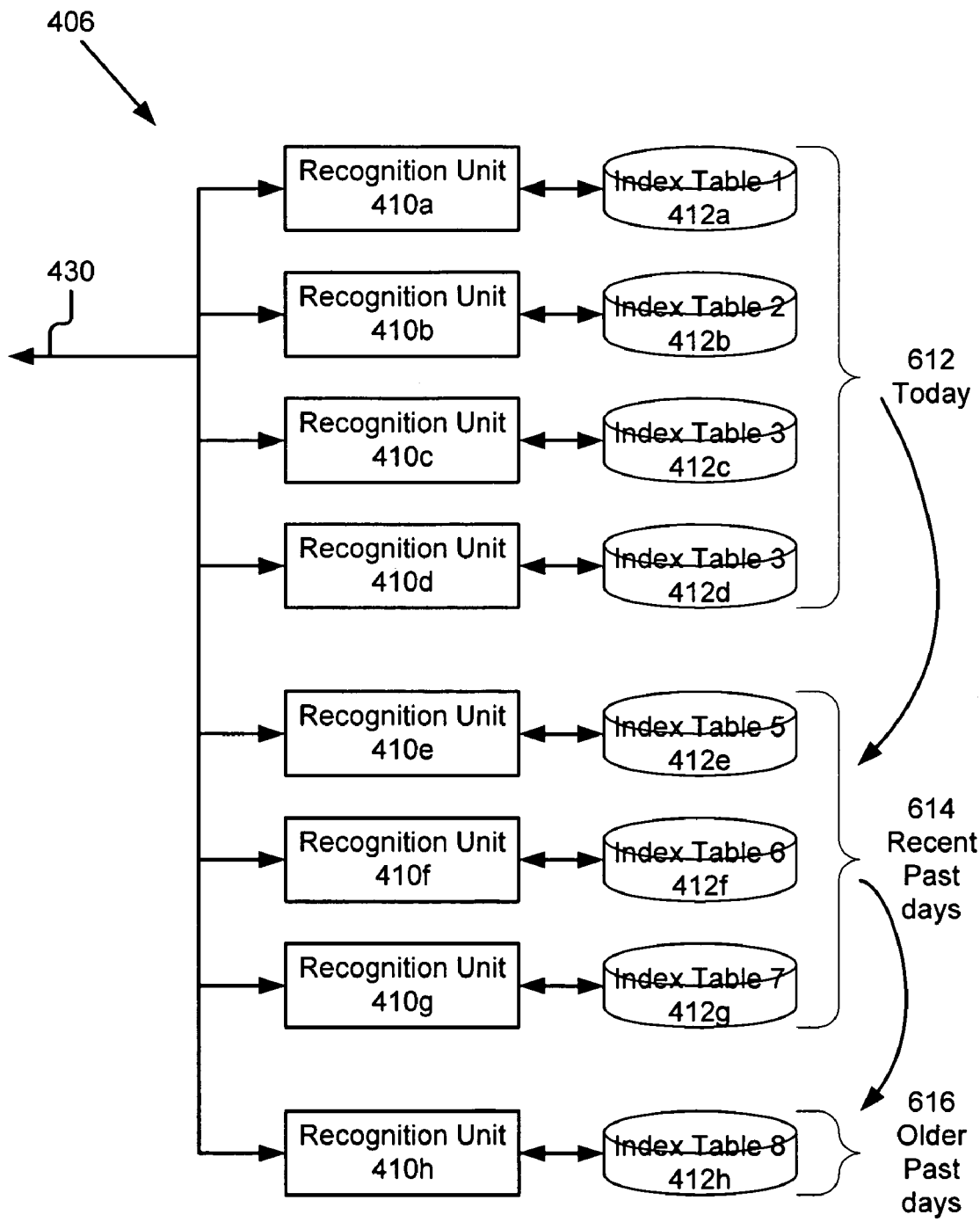
FIG. 6A is a block diagram of a first embodiment of an image retrieval unit in accordance with the present invention.
Figure 6B:
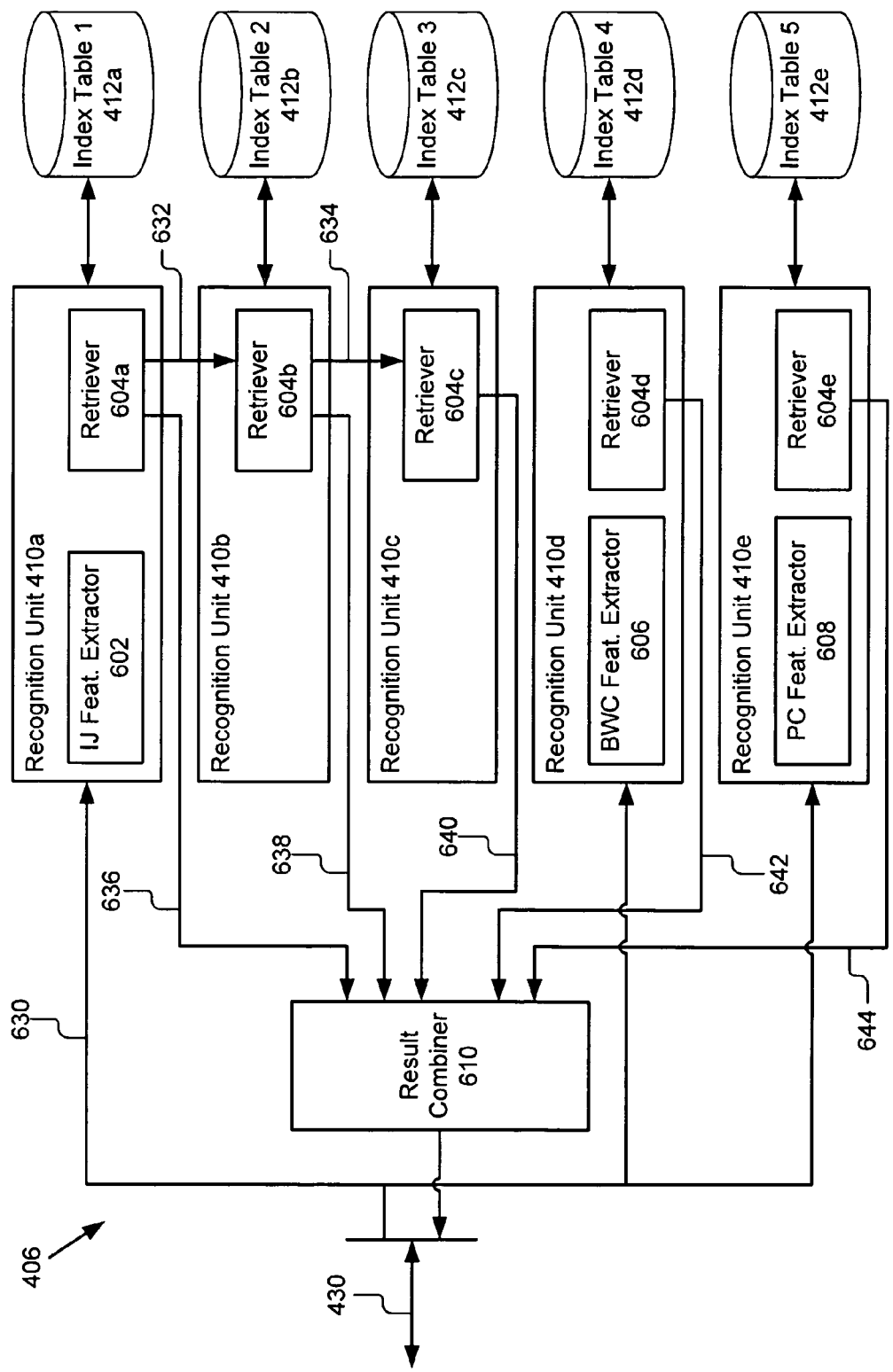
FIG. 6B is a block diagram of a second embodiment of the image retrieval unit in accordance with the present invention.

Referring now to FIGS. 6A and 6B, embodiments of the acquisition unit 406 will be described.

FIG. 6A illustrates one embodiment for the acquisition unit 406 where the recognition unit 410 and index table 412 pairs are partitioned based on the content or images that they index. This configuration is particularly advantageous for mass media publishers that provide content on a periodic basis. The organization of the content in the index tables 412 can be partitioned such that the content most likely to be accessed will be available on the greatest number of recognition unit 410 and index table 412 pairs. Those skilled in the art will recognize that the partition described below is merely one example and that various other partitions based on actual usage statistics measured over time can be employed. As shown in FIG. 6A, the acquisition unit 406 comprises a plurality of recognition units 410a-h and a plurality of index tables 412a-h. The plurality of recognition units 410a-h is coupled to signal line 430 to receive image queries from the dispatcher 402. Each of the plurality of recognition units 410a-h is coupled to a corresponding index table 412a-h. The recognition units 410 extract features from the image query and compare those image features to the features stored in the index table to identify a matching page and location on that page. Example recognition and retrieval systems and methods are disclosed in U.S. patent application Ser. No. 11/461,017, titled "System And Methods For Creation And Use Of A Mixed Media Environment," filed Jul. 31, 2006; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; and U.S. patent application Ser. No. 11/777,142, titled "Retrieving Documents By Converting Them to Synthetic Text," filed Jul. 12, 2007; and U.S. patent application Ser. No. 11/624,466, titled "Synthetic Image and Video Generation From Ground Truth Data," filed Jan. 18, 2007; which are incorporated by reference in their entirety.

As shown in FIG. 6A, the recognition unit 410/index table 412 pairs are grouped according to the content that in the index tables 412. In particular, the first group 612 of recognition units 410a-d and index tables 412a-d is used to index the pages of a publication such as a newspaper for a current day. For example, four of the eight recognition units 410 are used to index content from the current day's newspaper because most of the retrieval requests are likely to be related to the newspaper that was published in the last 24 hours. A second group 614 of recognition units 410e-g and corresponding index tables 412e-g are used to store pages of the newspaper from recent past days, for example the past week. A third group 606 of recognition unit 410h and index table 412h is used to store pages of the newspaper from older past days, for example for the past year. This allows the organizational structure of the acquisition unit 406 to be optimized to match the profile of retrieval requests received. Moreover, the operation of the acquisition unit 406 can be modified such that a given image query is first sent to the first group 612 for recognition, and if the first group 612 is unable to recognize the image query, it is sent to the second group 614 for recognition and so on.

It should be noted that the use of four recognition units 410 and index tables 412 as the first group 612 is merely be by way example and used demonstrate a relative proportion as compared with the number of recognition units 410 and index tables 412 in the second group 614 and the third group 616. The number of recognition units 410 and index tables 412 in any particular group 612, 614 and 616 may be scaled the modified based on the total number of recognition units 410 and index tables 412. Furthermore, the number of recognition units 410 and index tables 412 in any particular group 612, 614 and 616 may be adapted so that it matches the profile of all users sending retrieval request to the acquisition unit 406 for a given publication.

FIG. 6B illustrates a second embodiment for the acquisition unit 406 where the recognition units 410 and index tables 412 are partitioned based upon the type of recognition algorithm they implement. In the second embodiment, the recognition units 410 are also coupled such that the failure of a particular recognition unit to generate a registration result causes the input image query to be sent to another recognition unit for processing. Furthermore, in the second embodiment, the index tables 412 include feature sets that are varied according to different device and environmental factors of image capture devices (e.g., blur).

The second embodiment of the acquisition unit 406 includes a plurality of recognition units 410*a*-410*e*, a plurality of the index tables 412*a*-412*e* and a result combiner 610. In this embodiment, the recognition units 410*a*-410*e* each utilizes a different type of recognition algorithm. For example, recognition units 410*a*, 410*b* and 410*c* use an invisible junction algorithm; recognition unit 410*d* uses a brick wall coding algorithm; and recognition unit 410*e* uses a path coding algorithm for recognition and retrieval of page numbers and locations. Recognition units 410*a*, 410*d* and 410*e* each have an input coupled signal line 430 by signal line 630 for receiving the image query. The recognition results from each of the plurality of recognition units 410*a*-410*e* are sent via signal lines 636, 638, 640, 642 and 644 to the result combiner 610. The output of the result combiner 610 is coupled to signal line 430.

In one embodiment, the recognition units 410*a*, 410*b* and 410*c* cooperate together with index tables 1, 2 and 3, 412*a*-412*c* each storing image features corresponding to the same pages but with differing levels of blur caused by device and environmental factors. For example, index table 1 412*a* may store image features for pristine images of pages such as from a PDF document, while index table 2 412*b* stores images of the same pages but with a first level of blur and index table 3 412*c* stores images of the same pages but with the second level of blur. In one embodiment, the index tables 1, 2 and 3, 412*a*-412*c* are quantization trees. The first recognition unit 410*a* receives the image query via signal line 630. The first recognition unit 410*a* comprises an invisible junction feature extractor 602 and a retriever 604*a*. The invisible junction feature extractor 602 receives the image query, extracts the invisible junction features and provides them to the retriever 604*a*. The retriever 604*a* uses the extracted invisible junction features and compares them to the index table 1 412*a*. If the retriever 604*a* identifies a match, the retriever 604*a* sends the recognition results via signal line 636 to the result combiner 610. If however, the retriever 604*a* was unable to identify a match or identifies a match with low confidence, the retriever 604*a* sends the extracted invisible junction features to the retriever 604*b* of the second recognition unit 410*b* via signal line 632. It should be noted that since the invisible junction features have already been extracted, the second recognition unit 410*b* does not require an invisible junction feature extractor 602. The second recognition unit 410*b* performs retrieval functions similar to the first recognition unit 410*a*, but cooperates with index table 2 412*b* that has invisible junction features for slightly blurry images. If the retriever 604*b* identifies a match, the retriever 604*b* sends the recognition results via signal line 638 to the result combiner 610. If the retriever 604*b* of the second recognition unit 410*b* is unable to identify a match or identifies a match with low confidence, the retriever 604*b* sends the extracted invisible junction features to the retriever 604*c* of the third recognition unit 410*c* via signal line 634. The retriever 604*c* then performs a similar retrieval function but on index table 3 412*c*. Those skilled in the art will understand that while one pristine set of images and two levels of blur are provided, this is only by way of example and that any number of additional levels of blur from 0 to n may be used.

The recognition units 410*d* and 410*e* operate in parallel with the other recognition units 410*a*-*c*. The fourth recognition unit 410*d* comprises a brick wall coding feature extractor 606 and a retriever 604*d*. The brick wall coding feature extractor 606 receives the image query and bounding boxes, parses the bounding boxes and generates brick wall coding features. These brick wall coding features are provided to the retriever 604*d* and the retriever 604*d* compares them to the features stored in index table 4 412*d*. In one embodiment, index table 4 412*d* is a hash table. The retriever 604*d* identifies any matching pages and returns the recognition results to the result combiner 610 via signal line 642. The fifth recognition unit 410*e* operates in a similar manner but for path coding. The fifth recognition unit 410*e* comprises a path coding feature extractor 608 and a retriever 604*e*. The path coding feature extractor 608 receives the image query and bounding boxes, parses the image and generates path coding features that are provided to the retriever 604*e* and the retriever 604*e* compares them to features stored in the index table 5 412*e*. In one embodiment, the index table 5 412*e* is a SQL database of character strings. The retriever 604*e* identifies any matching strings and returns the recognition results to the result combiner 610 via signal line 644.

The result combiner 610 receives recognition results from the plurality of recognition units 410*a*-*e* and produces one or a small list of matching results. In one embodiment, each of the recognition results includes an associated confidence factor. In another embodiment, context information such as date, time, location, personal profile or retrieval history are provided to the result combiner 610. These confidence factors along with other information are used by the result combiner 610 to select the recognition results most likely to match the input image query.

Image Registration Unit 408

Figure 7:
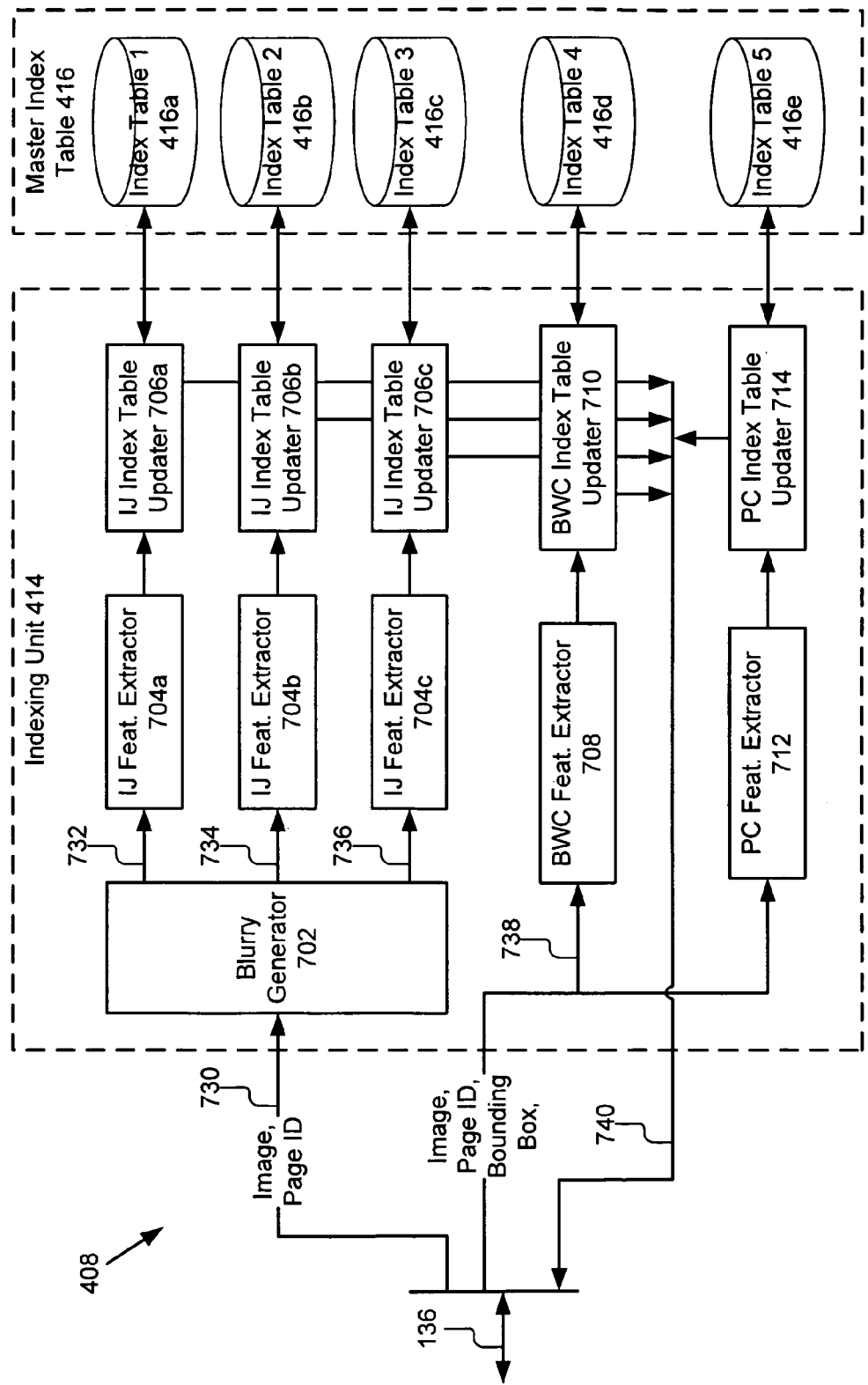
FIG. 7 is a block diagram of an embodiment of a registration unit in accordance with the present invention.

FIG. 7 shows an embodiment of the image registration unit 408. The image registration unit 408 comprises a blurry generator 702, a plurality of invisible junction feature extractors 704*a*-*c*, a plurality of invisible junction index table updaters 706*a*-*c*, a brick wall coding feature extractor 708, a brick wall coding index table updater 710, a path coding feature extractor 712, a path coding index table updater 714 and a plurality of master index tables 416*a*-*e*. The image registration unit 408 also includes other control logic (not shown) that controls the updating of the working index tables 412 from the master index table 416. The image registration unit 408 can update the index tables 412 of the acquisition unit 406 in a variety of different ways based on various criteria such performing updates on a periodic basis, performing updates when new content is added, performing updates based on usage, performing updates for storage efficiency, etc.

The blurry generator 702 has an input coupled in signal line 730 to receive an image and a page identification number. The blurry generator 702 has a plurality of outputs and each output is coupled by signal lines 732, 734 and 736 to invisible junction feature extractors 704*a-c*, respectively. The blurry generator 702 passes a pristine image and the page identification number to the output and signal line 732. The blurry generator 702 then generates an image with a first level of blurriness and outputs it and the page identification number on signal line 734 to invisible junction feature extractor 704*b*, and another image with a second level of blurriness and outputs it and page identification number on signal line 736 to invisible junction feature extractor 704*c*.

The invisible junction feature extractors 704 receive the image and page ID, extract the invisible junction features from the image and send them along with the page ID to a respective invisible junction index table updater 706. The outputs of the plurality of invisible junction feature extractors 704*a-c* are coupled to input of the plurality of invisible junction index table updaters 706*a-c*. For example, the output of invisible junction feature extractor 704*a* is coupled to an input of invisible junction index table updater 706*a*. The remaining invisible junction feature extractors 704*b-c* are similarly coupled to respective invisible junction index table updaters 706*b-c*. The invisible junction index table updaters 706 are responsible for formatting the extracted features and storing them in a corresponding master index table 416. While the master index table 416 is shown as five separate master index tables 416*a-e*, those skilled in the art will recognize that all the master index tables could be combined into a single master index table or into a few master index tables. Once the invisible junction index table updaters 706 have stored the extracted features in the index table 416, they issue a confirmation signal that is sent via signal lines 740 and 136 back to the MMR publisher 108.

The brick wall coding feature extractor 708 and the path coding feature extractor 712 operate in a similar fashion and are coupled to signal line 738 to receive the image, a page identification number and bounding box information. The brick wall coding feature extractor 708 extracts information from the input needed to update its associated index table 416*d*. The brick wall coding index table updater 710 receives the extracted information from the brick wall coding feature extractor 708 and stores it in the index table 416*d*. The path coding feature extractor 712 and the path coding index table updater 714 operate in a like manner but for path coding. The path coding feature extractor 712 also receives the image, a page number and bounding box information via signal line 738. The path coding feature extractor 712 extracts path coding information and passes it to the path coding index table updater 714. The path coding index table updater 714 stores the information in index table 5 416*e*. The architecture of the registration unit 408 is particularly advantageous because it provides an environment in which the MMR publisher 108 can automatically update the index tables simply by providing images and page numbers to the image registration unit 408 and the index tables are updated automatically.

MMR Publisher 108

Figure 8:
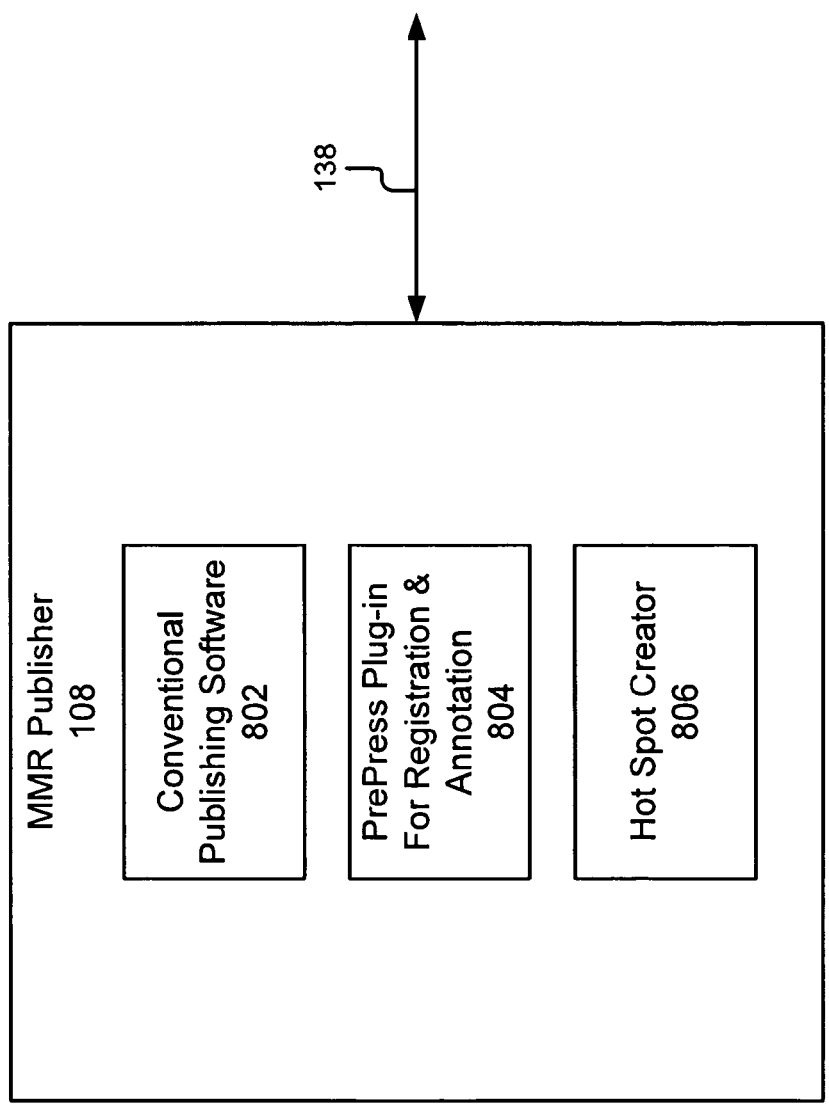
FIG. 8 is a block diagram of an embodiment of an MMR publisher in accordance with the present invention.

An embodiment of the MMR publisher 108 is shown in FIG. 8. The MMR publisher 108 comprises conventional publishing software 802, a pre-press software plug-in for registration and annotation 804, and a hotspot creator 806. The MMR publisher 108 is coupled to signal line 138 to connect with the image registration unit 408 and the hotspot database 404 (such as via server 302).

The conventional publishing software 802 is software for creating digital content including text, graphics, and pictures. Examples of the conventional publishing software used in the production and distribution of newspapers include ADOBE ACROBAT manufactured and sold by Adobe Inc, of San Jose, Calif., or QUARKXPRESS manufactured and sold by Quark, Inc, of Denver, Colo. The conventional publishing software 802 may be other types of proprietary software owned by large publishing companies.

The pre-press plug-in for registration and annotation 804 is software and routines for interfacing with the conventional publishing software 802 and generating additional information used by the image registration unit 408 so that the content can be automatically uploaded to the acquisition unit 406. For example, the prepress plug-in for registration and annotation communicates and interfaces with the image registration unit 408 to maintain a unique page identification numbering system that is consistent across image pages generated by the conventional publishing software 802, the image pages stored in the master index table 416, and the page numbers used in referencing data in the hotspot database 404. The prepress plug-in for registration 804 also generates bounding boxes for image pages generated by the conventional publishing software 802; the bounding boxes are subsequently used by the image registration unit 408 for certain types of encoding. The pre-press plug-in for registration and annotation 804 also analyzes the images provided by the conventional publishing software 802 and ensures that the files are of a type usable by the feature extractors 704, 708, 712.

The hotspot creator 806 is an authoring tool for creating hotspots. Hotspots identify the (x,y) coordinates of polygons on a document image and links to electronic data such as URLs that are associated with each polygon. In one embodiment, hotspots are annotations in ACROBAT PDF files that include the (x,y) coordinates of polygons on a document and links to electronic data such as URLs. The hotspot creator 806 can be used to create a hotspot (a "hotspot" is a polygon on an image), associate the hotspot with a particular page in a document, and a particular location on the page, associate zero or more links with each hotspot, and generate and send the hotspot files to the server 302 for storage in the hotspot database 404. A hotspot file lists each hotspot, the coordinates of its polygon, and any links associated with it. The hotspot file can be saved as a separate file or equivalently the same data can be embedded in the document source file. The hotspot creator 806 can be a stand-alone software application that reads a source document such as WORD, PDF, or an image format such as tiff, and provides a user interface that lets the user draw polygons on the document, add links to each of the hotspots, and save the hotspot files. The hotspot creator 806 can also be packaged as a plug-in for existing document authoring applications such as WORD, ACROBAT, Quark Express, etc, and can be designed so that the user can define polygons on the document, add links, and save the hotspot files (or, equivalently the source file with the hotspot data embedded in it). The hotspot creator 806 can also be packaged as a software application that extracts links from existing documents and saves them in the hotspot file. For example, annotations in PDF files that include polygon coordinates and links to electronic data can be removed from the PDF and saved separately in a hotspot file. The hotspot creator 806 also allows the publisher 108 to allow preferences to be associated with the hotspot locations.

Methods

Figure 9:
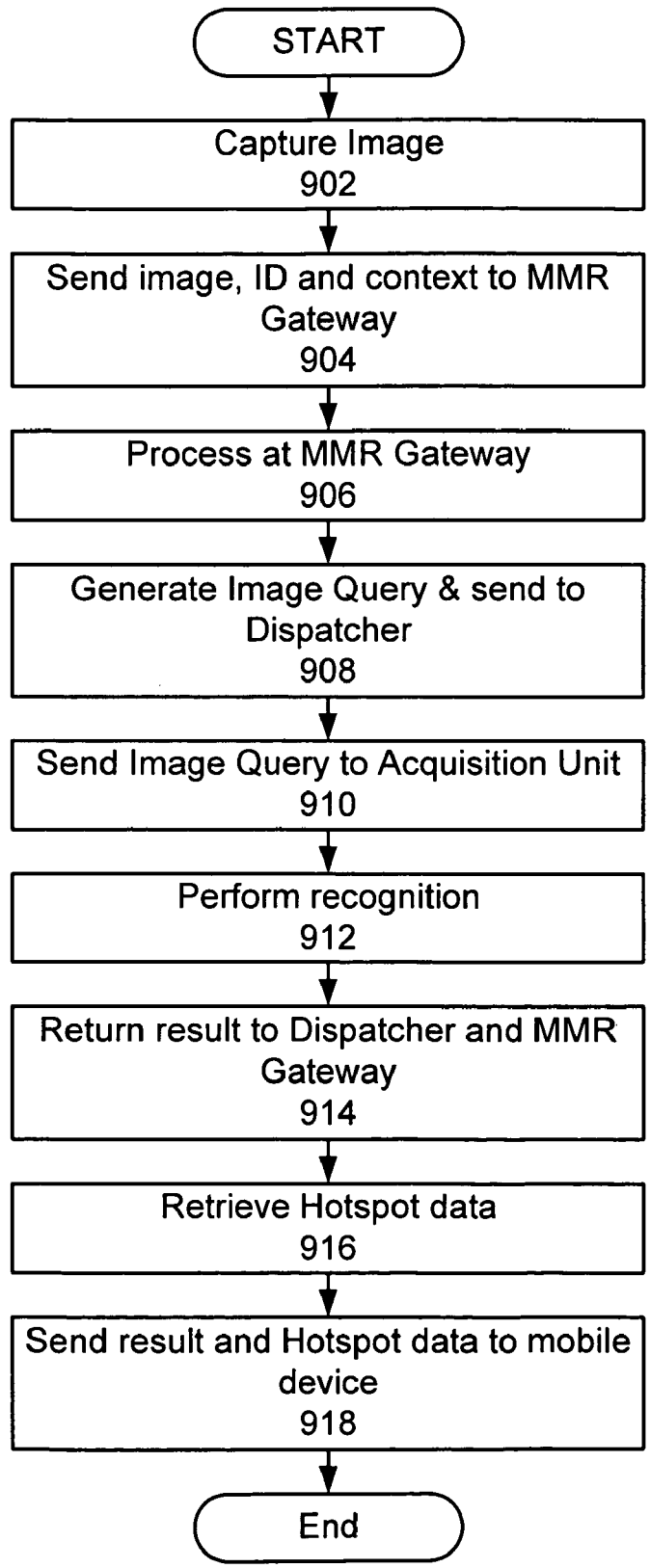
FIG. 9 is a flowchart of an embodiment of a method for retrieving a document and location from an input image in accordance with the present invention.

FIG. 9 is a flowchart of a general method for generating and sending a retrieval request and processing the retrieval request with an MMR system 100. The method begins with the mobile device 102 capturing 902 an image. A retrieval request that includes the image, a user identifier, and other context information is generated by the mobile device 102 and sent 904 to the MMR gateway 104. The MMR gateway 104 processes 906 the retrieval request by extracting the user identifier from the retrieval request and verifying that it is associated with a valid user. The MMR gateway 104 also performs other processing such as recording the retrieval request in the log 310, performing any necessary accounting associated with the retrieval request and analyzing any MMR analytics metrics. Next, the MMR gateway 104 generates 908 an image query and sends it to the dispatcher 402. The dispatcher 402 performs load-balancing and sends the image query to the acquisition unit 406. In one embodiment, the dispatcher 402 specifies the particular recognition unit 410 of the acquisition unit 406 that should process the image query. Then the acquisition unit 406 performs 912 image recognition to produce recognition results. The recognition results are returned 914 to the dispatcher 402 and in turn the MMR gateway 104. The recognition results are also used to retrieve 916 hotspot data corresponding to the page and location identified in the recognition results. Finally, the hotspot data and the recognition results are sent 918 from the MMR gateway 104 to the mobile device 102.

Figure 10:
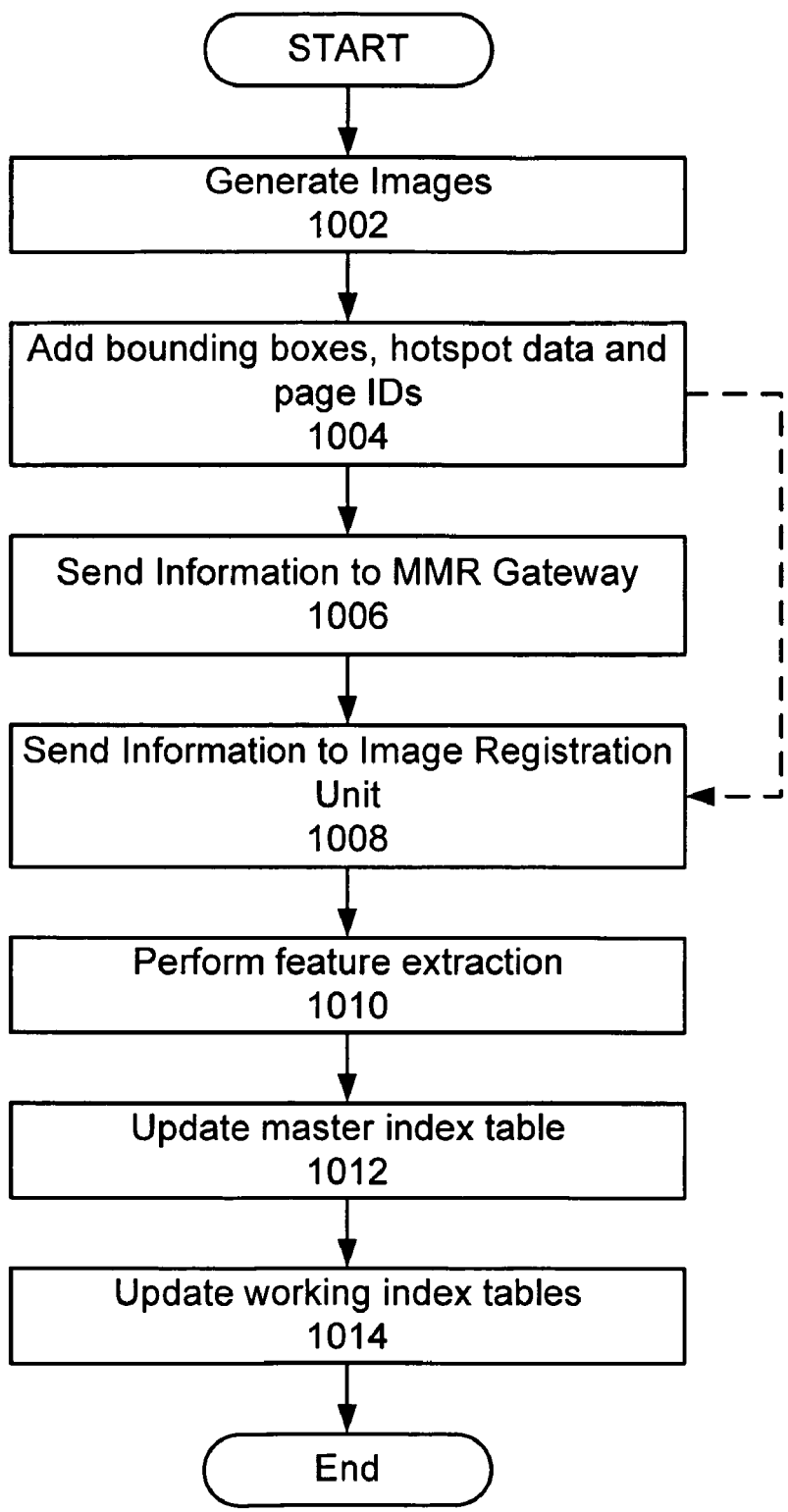
FIG. 10 is a flowchart of a method for registering an image with the MMR matching unit in accordance with embodiments of the present invention.

Referring now to FIG. 10, a method for registration of images will be described. The method begins by generating 1002 images by using conventional publishing software 802. The images are then augmented 1004 with bounding boxes, hotspot data and page identification numbers using the pre-press plug-in for registration and annotation 804. The augmented images are then sent 1006 to the MMR gateway 104. The MMR gateway 104 extracts the hotspot data and adds it to the hotspot database 404. The MMR gateway 104 then sends 1008 the image, page number and bounding boxes to the image registration unit 408. In an alternate embodiment as depicted in FIG. 10 by the dashed line, the augmented images can be sent to the image registration unit 408 without going through the MMR gateway 104. The indexing unit 414 and then performs 1010 feature extraction on the images. Depending on the embodiment, feature extraction may be performed for a single recognition algorithm, multiple different recognition algorithms or the same recognition algorithm on different data sets. The features extracted from step 1010 are then used to update 1012 the master index table(s) 416a-e. Finally, the changes that were applied to the master index table(s) 416a-e are migrated 1014 to working index tables 412a-n of the acquisition unit 406. This method is particularly advantageous because images need only be provided to the image registration unit 408 and the image registration unit 408 automatically updates the master index table 416, and automatically migrates the changes to the working index tables 412 of the acquisition unit 406.

Figure 11A:
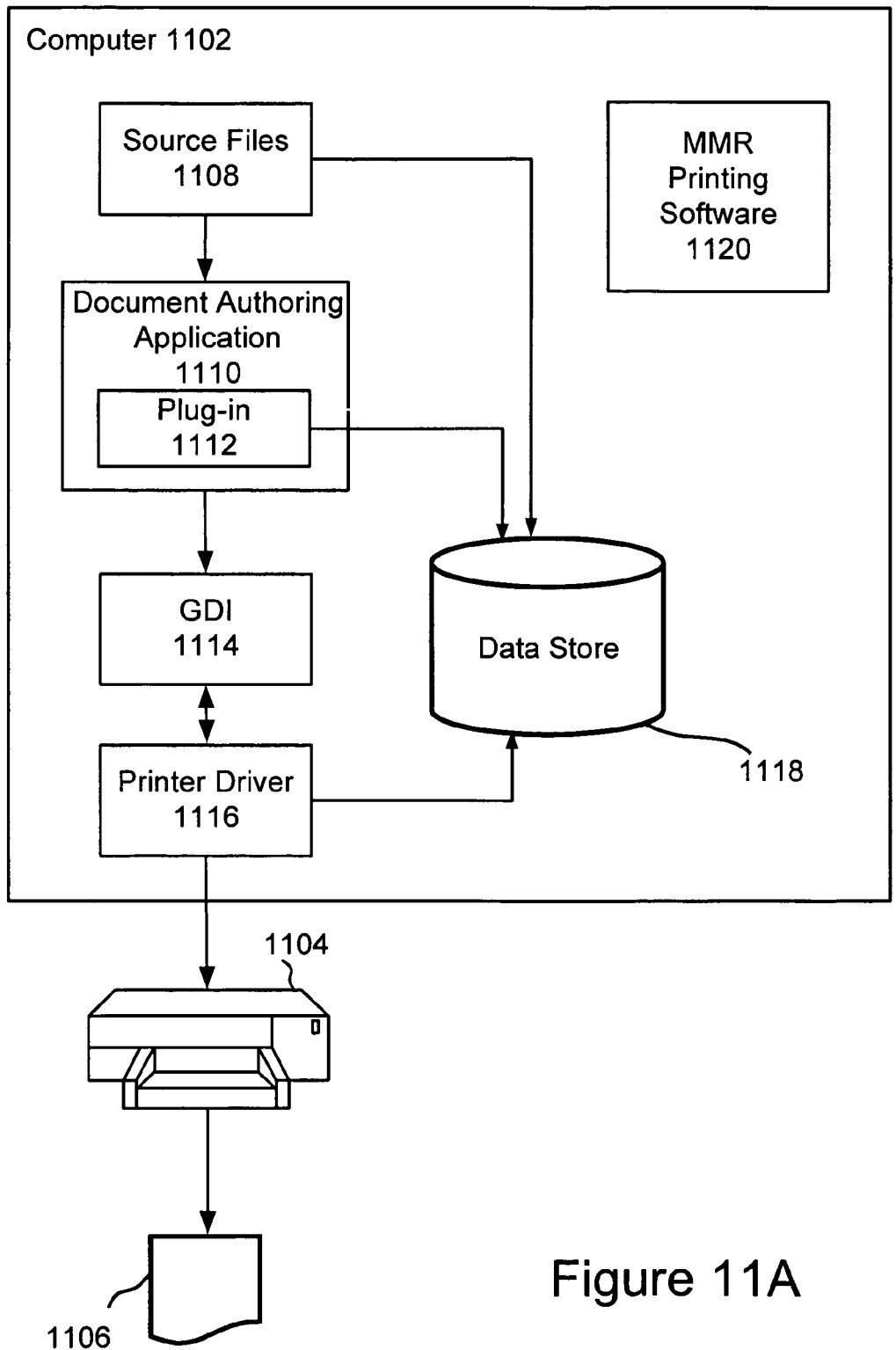
FIG. 11A illustrates a block diagram of MMR components in accordance with one embodiment of the present invention.

FIG. 11A illustrates a block diagram of MMR components in accordance with one embodiment of the present invention. The primary MMR components include a computer 1102 with an associated printer 1 104.

The computer 1102 is any standard desktop, laptop, or networked computer, as is known in the art. In one embodiment, the computer is associated with publisher 108 as described in conjunction with to FIG. 1. Printer 1104 is any standard home, office, or commercial printer, as described herein. Printer 1104 produces printed document 1106, which is a paper document that is formed of one or more printed pages.

The computer 1102 further comprises a variety of components, some or all of which are optional according to various embodiments. In one embodiment, the computer 1102 comprises source files 1108, document authoring application 1110, plug-in 1112, GDI 1114, printer driver 1116, data store 1118, and MMR printing software 1120.

Source files 1108 are representative of any source files that are an electronic representation of a document. Example source files 1108 include hypertext markup language (HTML) files, MICROSOFT® WORD® files, MICROSOFT® POWERPOINT® files, QUARKXPRESS files, simple text files, portable document format (PDF) files, and the like. As described herein, documents received at document authoring application 1110 originate from source files 1108 in many instances. In one embodiment, source files 1108 are stored on the hard drive of computer 1102.

Document authoring application 1110 is an application that provides for authoring and editing of documents. Document authoring application 1110 may be any application that allows for authoring and editing of documents, such as MICROSOFT WORD, ADOBE ACROBAT, Internet Explorer, and Quark Xpress. In one embodiment, the document authoring application 1110 may be used to retrieve documents from the source files 1108.

Plug-in 1112 is a software application that provides an authoring function. Plug-in 1112 may run in document authoring application 1110, or alternatively may be a standalone software application. Plug-in 1112 performs various transformations and other modifications to documents or web pages displayed by document authoring application 1110 according to various embodiments. For example, plug-in 1112 may surround symbolic data, or hotspot, designations with uniquely identifiable fiducial marks in a special, invisible font.

In one embodiment in which the document authoring application 1110 is the Internet Explorer browser, the plug-in 1112 modifies the Document Object Model (DOM) for a web page in the browser by adding SPAN element fiducial marks to the .html document associated with the web page that do not affect the layout of the web page. An example of a fiducial mark 1202 is shown in FIG. 12. Fiducial identification 1204 specifies a fiducial type (b=begin, e=end, t=text, i=image) and a number identifying the associated URL. The position: absolute attribute 1206 ensures that the element does not affect the flow of the document. The text-decoration: none attribute 1208 ensures that the fiducial text does not get underlined. The font-family: 'ExportToPaper Courier new' attribute 1210 specifies a font that is based on the Courier font, but that does not have any glyphs. Thus, the fiducials do not appear on the screen, but still get sent to, and can be detected by, the printer driver 1116. An abbreviated form of the fiducial marks, <SPAN . . . >t0</SPAN>, is used herein. FIGS. 14A and 14B show a link before 1402 and after fiducials are added 1404.

Although this example uses Internet Explorer (browser) as the document authoring application 1110. However, in other embodiments, other document authoring applications 1110 may be used, with similar processes. For example, many such document authoring applications 1110 provide the ability to incorporate custom-designed plug-ins that run in conjunction with the existing software. Such as plug-in could be sued to add instructions that embed font change commands that add "bn" and "en" tags at the beginning and end of each word in the invisible font as described in the Internet Explorer example above. As in the example, the intermediate .xml files would be produced including unique identifiers that could be matched to their locations as provided by the print driver as described herein, to determine the locations of bounding boxes around words.

Plug-in 1112 also may perform other functions, such as creating symbolic hotspot descriptions (symb_hotspot.xml) as described herein.

Printer driver 1116 is software and routines for performing a feature extraction and/or coordinate capture on the printed representation of documents, so that the layout of characters and graphics on the printed pages can be retrieved. The layout, i.e., the two-dimensional arrangement of text on the printed page, may be captured automatically at the time of printing by the printer driver 1116. For example, printer driver 1116 executes all the text and drawing print commands and, in addition, intercepts and records the x,y coordinates and other characteristics of every character and/or image in the printed representation. According to one embodiment, printer driver 1116 includes a Printcapture DLL as described herein, a forwarding Dynamically Linked Library (DLL) that forwards calls of an existing DLL while capturing information from the calls. A more detailed description of the functionality of the print capture DLL is described in reference to FIG. 18. Those skilled in the art will recognize that the printer driver 1116 is coupled to the output of document authoring application 1110 for capture of data.

Data store 1118 is any database known in the art for storing files, modified for use with the methods described herein. For example, according to one embodiment data store 1118 stores source files 1108, symb_hotspot.xml, page_desc.xml, rendered page layouts, imaged documents, hot spot definitions, and feature representations.

MMR printing software 1120 is software and routines that facilitate the MMR printing operations described herein, for example as performed by the components of computer 1102 as previously described. MMR printing software 1120 is described below in greater detail with reference to FIG. 11B.

Figure 11B:
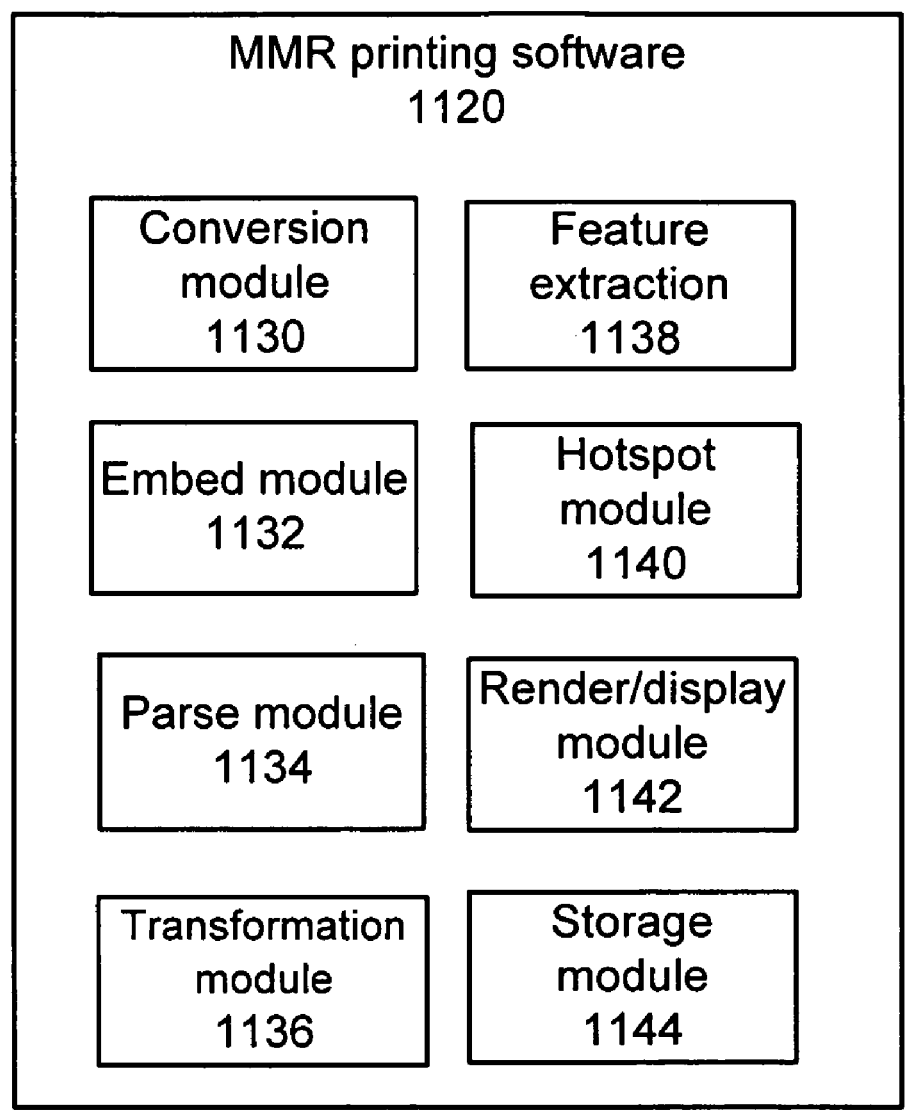
FIG. 11B illustrates a set of software components included in MMR printing software in accordance with one embodiment of the present invention.

FIG. 11B illustrates a set of software components included in MMR printing software 1120 in accordance with one embodiment of the invention. It should be understood that all or some of the MMR printing software 1120 may be included in the computer 1102, mobile device 102, or publisher 108. While the MMR printing software 1120 will now be described as including these different components, those skilled in the art will recognize that the MMR printing software 1120 could have any number of these components from one to all of them. The MMR printing software 1120 includes a conversion module 1130, an embed module 1132, a parse module 1134, a transform module 1136, a feature extraction module 1138, a hotspot module 1140, a render/display module 1142, and a storage module 1144.

Conversion module 1130 is software and routines for conversion of a source document, e.g. from source files 1108, into an imaged document from which a feature representation can be extracted.

Embed module 1132 is software and routines for enabling embedding of fiducial marks, e.g., as described above, corresponding to a designation for a hotspot in an electronic document. In one particular embodiment, the embedded fiducial marks indicate a beginning point for the hotspot and an ending point for the hotspot.

Parse module 1134 is software and routines for enabling parsing an electronic document (that has been sent to the printer 1104) for a fiducial mark indicating a beginning point for a hotspot.

Transformation module 1136 is software and routines for enabling application of a transformation rule to a portion of an electronic document. In one particular embodiment, the portion is a stream of characters between a fiducial mark indicating a beginning point for a hotspot and a fiducial mark indicating an ending point for the hotspot.

Feature extraction module 1138 is software and routines for enabling the extraction of features and capture of coordinates corresponding to a printed representation of a document and a hotspot. Coordinate capture includes tapping, or intercepting, print commands using a forwarding dynamically linked library and parsing the printed representation for a subset of the coordinates corresponding to a hotspot or transformed characters. Feature extraction module 1138 enables the functionality of printer driver 1116 according to one embodiment.

Hotspot module 1140 is software and routines for enabling association of one or more clips with one or more hotspots. Hotspot module 1140 also enables formulation of a hotspot definition by first designating a location for a hotspot within a document and defining a clip to associate with the hotspot.

Render/display module 1142 is software and routines for enabling a document or a printed representation of a document to be rendered or displayed.

Storage module 1144 is software and routines for enabling storage of various files, including a page layout, an imaged document, a hotspot definition, and a feature representation.

The software portions 1130-1144 need not be discrete software modules. The software configuration shown is meant only by way of example; other configurations are contemplated by and within the scope of the present invention, as will be apparent in light of this disclosure.

Figure 13:
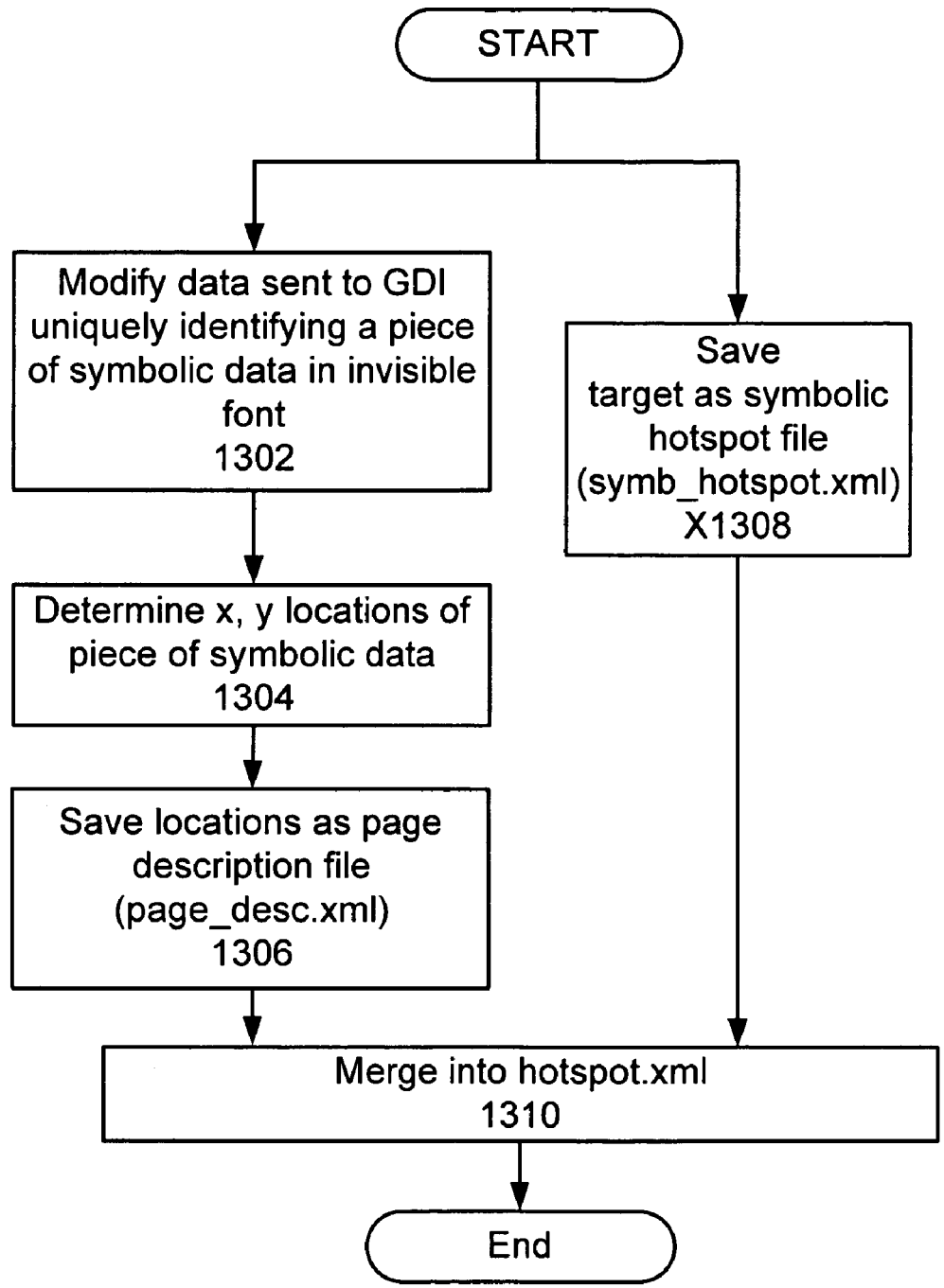
FIG. 13 is a flowchart showing a method of capturing symbolic information about a document in accordance with one embodiment of the present invention.

Referring now to FIG. 13, a flowchart is show for a method of capturing symbolic information about a document in accordance with one embodiment of the present invention. The method begins with the plug-in 1112 to the document authoring application 1110 modifying 1302 the data sent to the GDI uniquely identifying a piece of symbolic data using an invisible font. For example, fiducial marks are inserted surrounding each piece of symbolic data. The marks are in a font that is similar to Courier but has no glyphs, so they are not visible and do not modify the printed document in any way, but can be detected in print commands.

Figures 14C, 15:
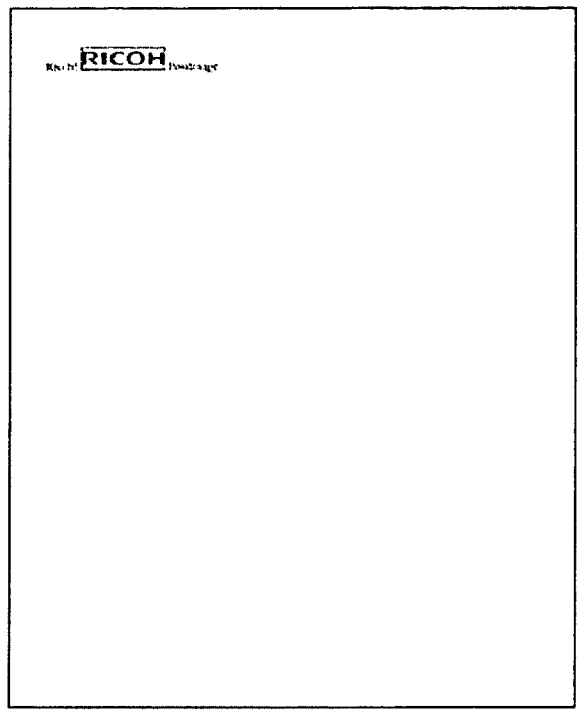
FIG. 14C shows a raster image of the page.
FIG. 15 shows an example of a symbolic hotspot description in accordance with one embodiment of the present invention.

Referring to FIG. 14A, an original HTML page is shown. FIG. 14B shows the same HTML after the fiducial marks have been added. FIG. 14C shows a 24 bpp 600 raster image of the page. In addition, the plug-in 1112 creates 1308 a symbolic hotspot description (symb_hotspot.xml). symb_hotspot.xml is an extensible markup language ("XML") file generated by plug-in 1112 that identifies a hotspot within a document. symb_hotspot.xml identifies the hotspot number and content, and may be stored to data store 1118. An example of a symbolic hotspot description is shown in FIG. 15.

In response to a print command, coordinates corresponding the printed representation and the hotspot are captured. In one embodiment, a printer driver 1116 "taps" text and drawing commands within a print command. The printer driver 1116 executes all the text and drawing commands and, in addition, intercepts and records 1304 the x,y coordinates and other characteristics of every character and/or image in the printed representation. This step is described in greater detail in conjunction with FIG. 18. In the process of capturing the coordinates for the printed representation, the symbolic data locations are easily identified using the embedded fiducial marks in the HTML. For example, when the begin mark is encountered, the x,y location is recorded of all characters until the end mark is found.

The locations are saved 1306 as a page description file (page_desc.xml). page_desc.xml 1304 is an XML file created by the printer driver 1115 to which text-related output is written for function calls that are text related. page_desc.xml 1304 includes coordinate information for a document for all printed text by word and by character, as well as hotspot information, printer port name, browser name, date and time of printing, and dots per inch (dpi) and resolution (res) information. page_desc.xml 1304 is stored, e.g., in data store 1118. FIGS. 16A-16E illustrate in greater detail an example of a page_desc.xml 1304 for the HTML file of FIG. 14A.

Finally, page_desc.xml and symb_hotspot.xml are merged 1310 into hotspot.xml, which is an XML file that is created when a document is printed. hotspot.xml includes hotspot identifier information such as hotspot number, coordinate information, dimension information, and the content of the hotspot. An example of a hotspot.xml file is illustrated in FIG. 17.

Figure 18:
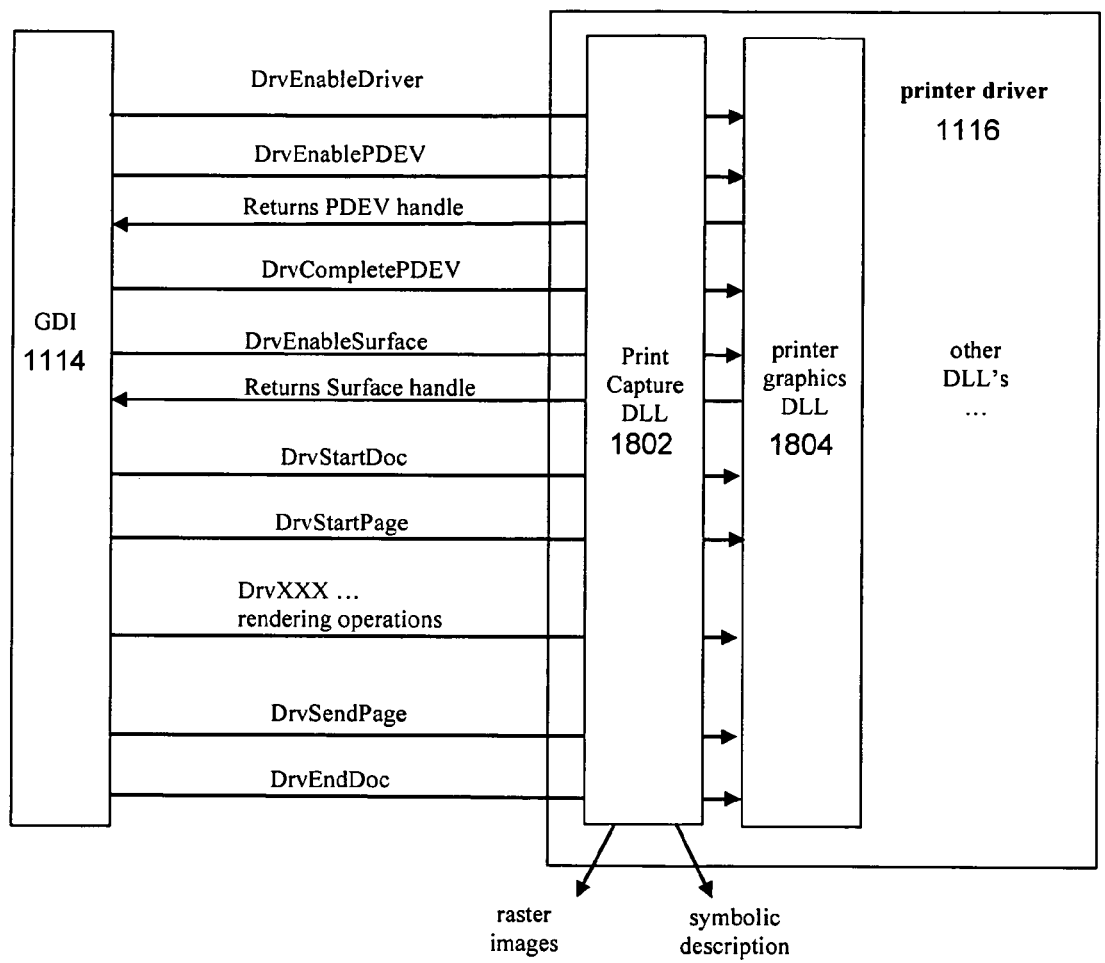
FIG. 18 shows interaction of the GDI with the printer driver when a document is printed in accordance with one embodiment of the present invention.

FIG. 18 shows how the GDI 1114 interacts with the printer driver 1116 when a document is printed. In conventional processing, the printer driver is comprised of a set of dynamically linked libraries (DLLs). The printer graphics dll is the one that receives instructions from the GDI. When an application that prints a document calls the CreateDC function to create a printer device context, the GDI checks to see if the appropriate printer graphics DLL is loaded. If it is not, the GDI loads the DLL and calls the DrvEnableDriver function in the DLL.

Next, the GDI calls the printer graphics DLL's DrvEnablePDEV function so the driver can create a physical device instance and return device characteristics. GDI uses the returned information to create an internal description of the device instance.

The GDI then calls the printer graphics DLL's DrvCompletePDEV function to supply a GDI handle to the device instance. The graphics DLL must use this handle as input to some of the Eng-prefixed callbacks provided by the GDI drawing engine.

After the GDI receives the device instance handle, it then makes a call to the graphics DLL's DrvEnableSurface function, which sets up the surface for drawing, and associates it with the physical device instance.

After this, for each document to be printed, the GDI calls DrvStartDoc in the printer graphics DLL. Then for each physical page, it calls DrvStartPage at the beginning of each page and follows that with a number of Drv-prefixed calls that render text, graphics and bitmap images on the page. At the end of the page, the GDI calls DrvSendPage and DrvEndDoc. A number of other Eng-prefixed commands are also provided.

Note that in FIG. 18 an additional DLL, a Printer Capture DLL 1802 is placed before the normal printer graphics DLL 1804. The Print Capture DLL 1802 is a forwarding dll. This means that a tap has been placed on some incoming DrvXXX calls before (or after) they are forwarded to the printer graphics DLL 1804. The printer graphics DLL 1804 actually implements the functionality for the DrvXXX call. This Print Capture DLL 1802 simply monitors the incoming calls, captures information about them, and forwards the call to the printer graphics DLL 1804. The Print Capture DLL 1802 also executes its own code for some of the DrvXXX calls, if necessary to create the raster images or symbolic description. In our case, the symbolic description (symb_hotspot.xml) is information about objects on the document, such as the x,y location of characters, vector graphics, or bitmap images. Table 1 shows the DrvXXX calls that are executed in the Print Capture DLL 1802.

TABLE 1

| DrvXXX commands implemented in the Print Capture DLL | | |
|---|---|---|
| DrvEnablePDEV | DrvDisablePDEV | DrvEnableSurface |
| DrvDisableSurface | DrvStartDoc | DrvEndDoc |
| DrvStartPage | DrvEndPage | DrvTextOut |
| DrvBitBlt | DrvStretchBlt | DrvCopyBits |
| DrvStretchBltROP | DrvAlphaBlend | DrvTransparentBlt |
| DrvPlgBlt | DrvGradientFill | DrvLineTo |
| DrvFillPath | DrvStrokeAndFillPath | DrvStrokePath |
| DrvDeleteBitmapSURFOBJ | DrvCreateBitmapSURFOBJ | DrvGetBmpDelta |

When the Print Capture DLL 1802 receives a DrvEnablePDEV call, in addition to passing it on to the printer graphics DLL 1804, it creates a PDEVMonitorDoc object. The PDEVMonitorDoc object contains raster images that are written to when certain DrvXXX calls are received and it maintains symbolic descriptions of certain page content, such as the positions of objects on the page. When a command is received by the printer driver that indicates the page should be printed, the Print Capture DLL 1802 calls a function that saves the raster image of the page.

A Printer Device Context (PDEV) encapsulates a target for drawing as well as drawing settings like font, color, etc. In the Print Capture DLL 1802, the function that creates a PDEV also creates the PDEVMonitorDoc. The PDEVMonitorDoc creates memory buffers and attaches them to the associated PDEV as secondary surfaces. Whenever a command (DrvTextOut( ), DrvBitBlt( ), etc. is received by the Print Capture DLL 1802, the command is not only forwarded to the printer graphics DLL 1804, but also performed upon the memory buffers owned by the PDEVMonitorDoc. This means that whatever is being drawn to the printer also gets drawn to a memory buffer on the local computer. When a command is received by the printer driver that indicates the page should be printed, the contents of the memory buffer are compressed and written out in JPG and PNG format.

The Print Capture DLL 1802 includes code for all text drawing functions. This means for applications that use the text-drawing GDI functions coordinate information for all printed text can also be captured. This information is recorded in an XML file that is stored with the JPGs/PNGs of the print operation.

Figure 19:
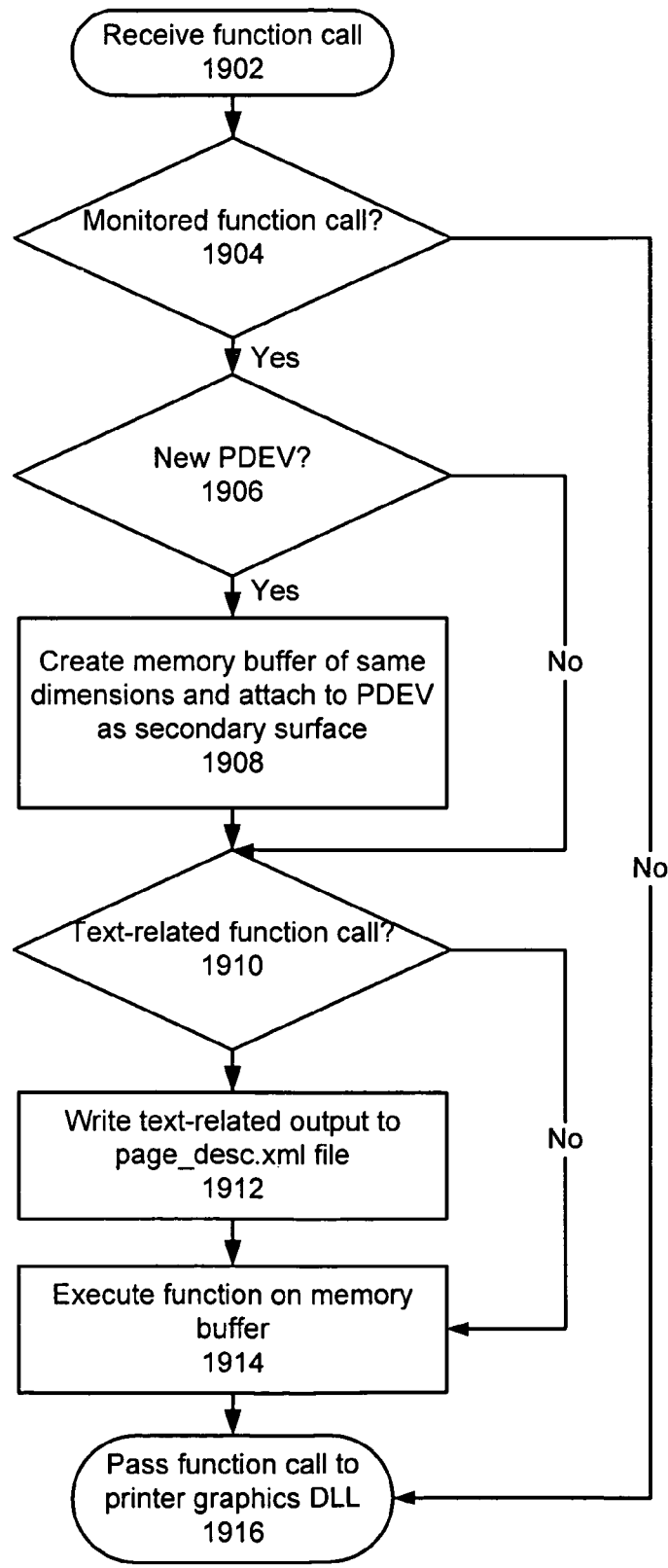
FIG. 19 shows a flowchart of the process used by a print capture dynamically linked library in accordance with one embodiment of the present invention.

FIG. 19 shows a flowchart of the process used by the print capture DLL 1802 in accordance with one embodiment of the present invention. The Print Capture DLL 1802 receives 1902 all function calls directed to the printer driver 1116. It first checks 1904 whether the received call is one of the function calls it monitors. These are functions that affect the appearance of a printed page in some way. If the received call is not a monitored function call, the call bypasses steps 1906-1914, and is forwarded 1916 to pass the function call on to the printer graphics DLL 1804.

If it is a monitored function call, the method next determines 1906 whether the function call specifies a new printer device context. This is determined by checking the PDEV against an internal device context table. A PDEV encapsulates a target for drawing (which could be a printer, a memory buffer, etc.), as previously noted, as well as drawing settings like font, color, etc. All drawing operations (e.g., LineTo( ), DrawText( ), etc) are performed upon a device context. If the PDEV is not new, then a memory buffer already exists that corresponds with the printer DC, and step 1908 is skipped. If the PDEV is new, a memory buffer of the same dimensions is created 1908 and attached to the PDEV as a secondary surface.

The print capture DLL next determines 1910 whether the call is a text-related function call. If it is not, step 1912 is skipped. If the function call is text-related, the text-related output is written 4430 to an xml file, referred to herein as page_desc.xml.

Referring again to FIG. 19, following the determination that the call is not text related, or following writing 1912 the text-related output to page_desc.xml, the print capture DLL 1802 executes 1914 the function call on the memory buffer for the PDEV. Then, all the monitored function calls are passed on to the printer graphics DLL 1804 as if the printer capture DLL 1802 was not present.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer-implemented method of embedding symbolic information in an electronic document, comprising:
    inserting, with a processor, fiducial marks into the electronic document, the fiducial marks comprising characters in a font with no glyphs and the fiducial marks uniquely identifying the symbolic information associated with the electronic document without altering a layout of the electronic document;
    creating a symbolic hotspot file that associates the symbolic information with a target of the symbolic information;
    in response to a print command, sending the electronic document with inserted fiducial marks to a printer driver, the printer driver determining coordinates for the symbolic information based on the coordinates of the fiducial marks; and
    combining the determined coordinates with the symbolic hotspot file to create a merged hotspot file, the merged hotspot file identifying the determined coordinates and the target of the symbolic data.

2. The method of claim 1, wherein the fiducial mark is an invisible font.

3. The method of claim 1, wherein the merged hotspot file further identifies at least one of a hot spot number and hotspot dimension information.

4. The method of claim 1, wherein a plug-in to a document authoring application provides instructions for modifying the data and saving the target.

5. The method of claim 4, wherein the document authoring application is selected from a word processing application, a web browser, and a desktop publisher.

6. The method of claim 1, wherein the symbolic information is a uniform resource locator (URL).

7. A non-transitory computer readable storage medium storing instructions for executing by a processor, the instructions comprising:
    inserting fiducial marks into the electronic document, the fiducial marks comprising characters in a font with no glyphs and the fiducial marks uniquely identifying symbolic information associated with an electronic document without altering a layout of the electronic document;
    creating a symbolic hotspot file that associates the symbolic information with a target of the symbolic information;
    in response to a print command, sending the electronic document with inserted fiducial marks to a printer driver, the printer driver determining coordinates for the symbolic information based on the coordinates of the fiducial marks; and
    combining the determined coordinates with the symbolic hotspot file to create a merged hotspot file, the merged hotspot file identifying the determined coordinates and the target of the symbolic data.

8. The computer readable storage medium of claim 7, wherein the fiducial mark is an invisible font.

9. The computer readable storage medium of claim 7, wherein the merged hotspot file further identifies at least one of a hot spot number and hotspot dimension information.

10. The computer readable storage medium of claim 7, wherein a plug-in to a document authoring application provides instructions for modifying the data and saving the target.

11. The computer readable storage medium of claim 10, wherein the document authoring application is selected from a word processing application, a web browser, and a desktop publisher.

12. The computer readable storage medium of claim 7, wherein the symbolic information is a uniform resource locator (URL).

* * * * *